United States Patent [19]
Nomura et al.

[11] Patent Number: 5,649,188
[45] Date of Patent: Jul. 15, 1997

[54] ELECTRONIC FILING APPARATUS WHICH ALLOWS INFORMATION TO BE RETRIEVED BASED ON A BOX, A DATE, OR A CARD ASSOCIATED WITH THE INFORMATION

[75] Inventors: Keiichi Nomura, Kawasaki; Hirofumi Endo, Fujisawa; Yasuhiro Ii, Yakohama; Yuko Ogasawara, Yokohama; Mitsuhiro Kawai, Atsugi; Yasuyoshi Onoue; Masahiro Kurita, both of Yokohama; Akira Imai, Kawasaki; Mitsuaki Takeuchi, Yokohama, all of Japan

[73] Assignee: Ricoh Company, Ltd., Tokyo, Japan

[21] Appl. No.: 108,403

[22] Filed: Aug. 19, 1993

[30] Foreign Application Priority Data

Aug. 20, 1992 [JP] Japan ................................ 4-244246
Oct. 2, 1992 [JP] Japan ................................ 4-265162

[51] Int. Cl.⁶ .................................................. G06F 17/30
[52] U.S. Cl. .................................. 395/611; 395/607
[58] Field of Search ............................ 395/600, 155, 395/159, 162; 364/419.19

[56] References Cited

U.S. PATENT DOCUMENTS

| | | | |
|---|---|---|---|
| 5,029,112 | 7/1991 | Sakamoto | 395/118 |
| 5,060,135 | 10/1991 | Levine et al. | 395/155 |
| 5,283,864 | 2/1994 | Knowlton | 395/158 |
| 5,305,435 | 4/1994 | Bronson | 395/159 |
| 5,339,412 | 8/1994 | Fueki | 395/600 |
| 5,341,293 | 8/1994 | Vertelney et al. | 364/419.17 |
| 5,347,623 | 9/1994 | Takano et al. | 395/157 |
| 5,363,504 | 11/1994 | Hasuo | 395/600 |
| 5,383,029 | 1/1995 | Kosima | 358/403 |

*Primary Examiner*—Paul V. Kulik
*Assistant Examiner*—John C. Loomis
*Attorney, Agent, or Firm*—Oblon, Spivak, McClelland, Maier & Neustadt, P.C.

[57] ABSTRACT

A system for electronically storing and retrieving information. Information is scanned into the system and a user manually designates that the information is to be sorted using boxes which are like folders, sorted by date, or sorted by a card such as by cards which are arranged alphabetically. When the user manually indicates that the information is to be sorted by box, there is also an automatic sort by date and by card. In this case the card which is used is a temporary sort card which is automatically designated. When the user manually indicates that the sort is other than by box, the information is automatically sorted into a temporary box. After the information is stored and sorted, the information can be retrieved and printed, as desired. The system utilizes a scanner, processor, storage device and printer.

22 Claims, 91 Drawing Sheets

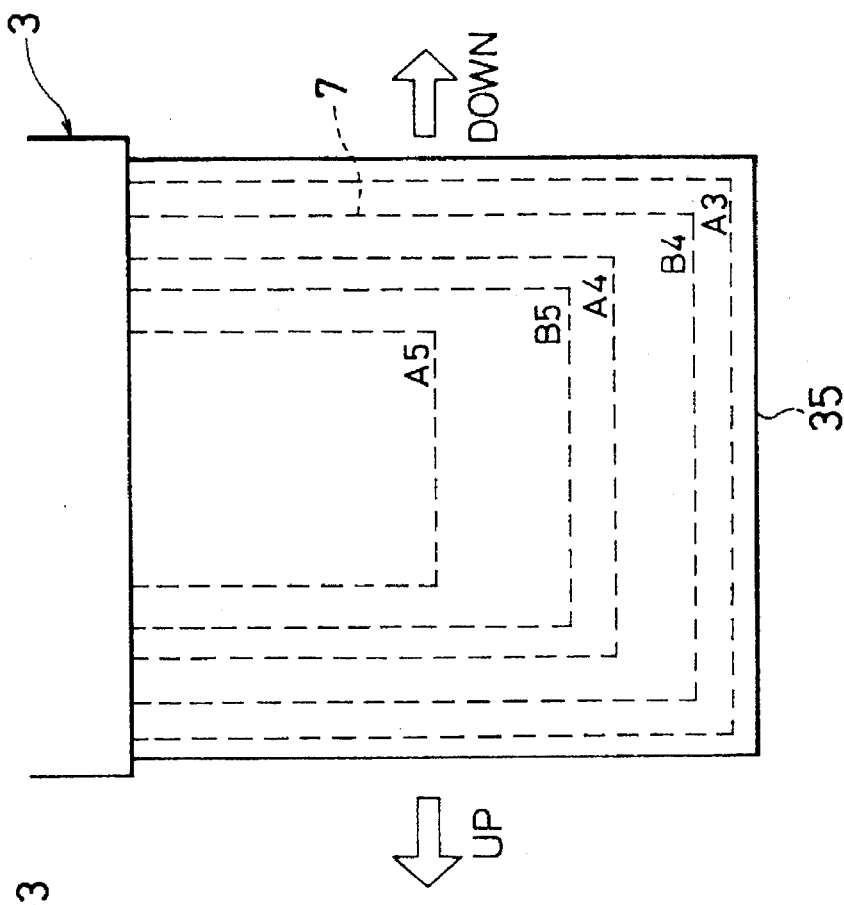
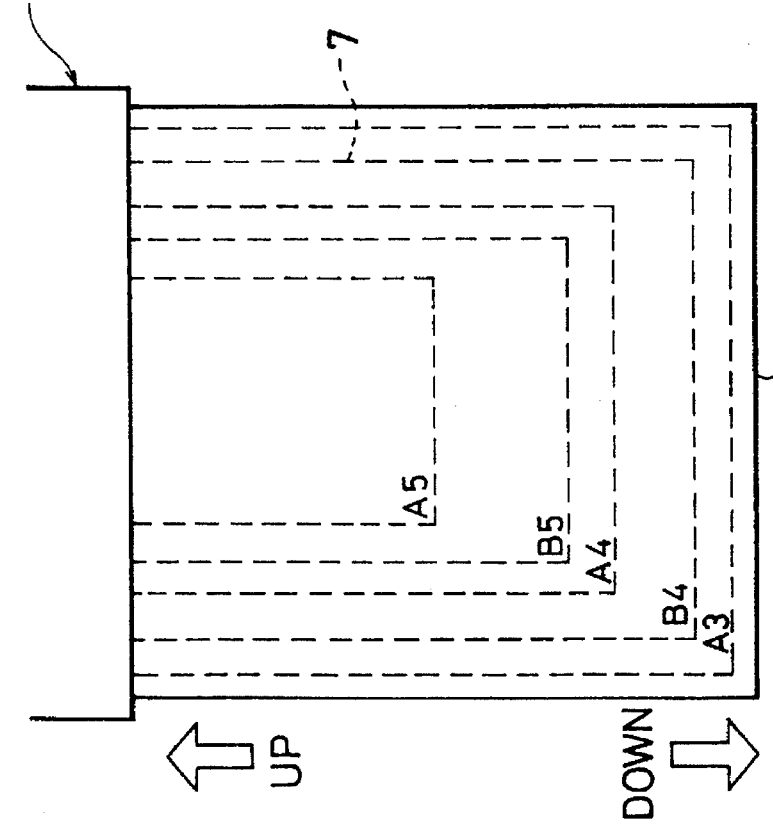

Fig. 10

- A1 — Reg. Doc. — REGISTER CHARACTERS
- A2 — WASTEBASKET ABOUT DELETED DOCUMENT
- A3 — U — UTILITY OPERATION
- A4 — ? — DISPLAY HELP WINDOW
- A5 — TAKE OUT OPTICAL DISK
- A6 — PRINT DOCUMENT AND LIST
- A7 — CHANGE TO INITIAL PICTURE OF BOX
- A8 — CHANGE TO INITIAL PICTURE OF DIARY
- A9 — CHANGE TO INITIAL PICTURE OF CARD

WELCOME TO DF-1!

PLEASE SET OPTICAL DISK WHEN OPERATIONS ARE STARTED.

PLEASE TURN POWER OFF AT ANY TIME IN THIS PICTURE.

PLEASE SELECT [INTRODUCE DF-1] WHEN OPERATOR WANTS TO KNOW SUMMARY OF OPERATIONS.

INTRODUCE DF-1

Fig. 60

| DOCUMENT NO. | REGISTERED DATE | DOCUMENT NAME | BOX NO. | CARD NO. | DIARY DATE |
|---|---|---|---|---|---|
| 1 | 1991.10.10 | A B C | 3 | 0 | 1991.10.10 |
| 2 | 1991.10.10 | F G H | 0 | 2 | 1991.10.10 |
| ... | | | | | |
| 1 0 | 1991.10.31 | L M L | 0 | 0 | 1991.12.31 |
| .. | | | | | |

Fig. 85

| IMAGE FOR RETRIEVAL CONTROL FILE | IMAGE FOR RETRIEVAL FILE 1 | IMAGE FOR RETRIEVAL FILE 2 | IMAGE FOR RETRIEVAL FILE 3 |

Fig. 86
ORIGINAL IMAGE
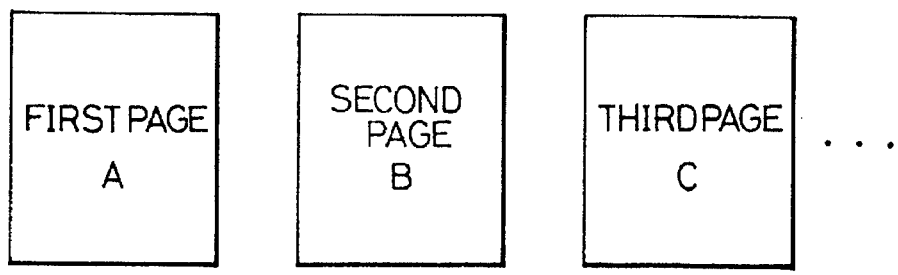
IMAGE FOR RETRIEVAL
DELETE FIRST PAGE
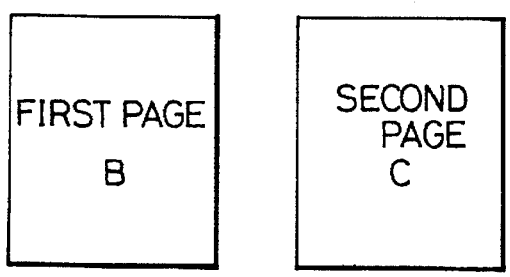
MAKE IMAGE FOR RETRIEVAL
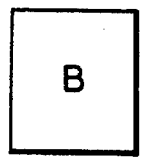

Fig. 87

OBJECT DOCUMENT
1. ESTIMATE OF COMPANY A MARCH 3, '92
2. ESTIMATE OF COMPANY B FEBRUARY 4, '92
3. .
4. .
    .
10. ESTIMATE OF COMPANY J MAY 8, '88

Fig. 90

TEN OBJECT DOCUMENTS

1. ESTIMATE OF COMPANY A
2. ESTIMATE OF COMPANY B
3. _____
4. _____
5. _____
6. _____

ELECTRONIC FILING APPARATUS WHICH ALLOWS INFORMATION TO BE RETRIEVED BASED ON A BOX, A DATE, OR A CARD ASSOCIATED WITH THE INFORMATION

BACKGROUND OF THE INVENTION

1. Field of the Invention

The present invention relates to an electronic filing apparatus for reading various kinds of documents and image information and storing this information by adding information to a memory medium having a large capacity such as a magnetooptic disk, etc.

2. Description of the Related Art

Recently, an electronic filing apparatus has been developed and considerably utilized. This electronic filing apparatus is also called an electronic filing system or an optical filing system. The electronic filing apparatus is used to save space for storing a large amount of documents made or supplied to offices, etc. The electronic filing apparatus is also used to efficiently take out required documents when necessary.

Such an electronic filing apparatus is generally constructed systematically by an image scanner, an apparatus body, a display unit, an input device such as a mouse, and a printer such as a laser printer. The image scanner is used to read at least information of documents and images. The apparatus body has an external memory unit, a controller, etc. The apparatus body sorts the read information of the scanner every document and registers the sorted information to a memory medium such as a magnetooptic disk, etc. The apparatus body further has a function for retrieving the registered information. The display unit displays the read information of the scanner, the retrieved information from the apparatus body, etc. The input device has a keyboard and a pointing device for inputting retrieving information and commands, etc. by an operator. The printer is used to print the retrieved information, etc.

In such a general electronic filing apparatus, the operator must input information for retrieval such as document names, keywords, dates, etc. from a keyboard when document information to be filed are read and registered by the scanner.

Electronic filing apparatuses for adding such retrieving information and easily performing a retrieving operation are also developed. In one of these electronic filing apparatuses, retrieved information such as stamped dates prepared or made in advance are selected and added to the document information. Another electronic filing apparatus can use a plurality of different sorting-retrieving systems of a box type, a keyword type, a tree type, etc.

However, in such sorting-retrieving systems of the general electronic filing apparatuses, an operator must add information such as document names, keywords, stamped dates to the document information. Accordingly, when a large amount of documents are electronically filed, operating efficiency of the operator is reduced.

Further, no sorted information is automatically provided in the electronic filing apparatus which can use the plural different sorting-retrieving systems. Only the same sorting-retrieving system can be used with respect to one memory medium such as one magnetooptic disk, etc. Accordingly, no sorting-retrieving system can be switched to a desirable sorting-retrieving system at any time in processing of data. Further, these sorting-retrieving systems have merits and demerits and are not necessarily used easily.

SUMMARY OF THE INVENTION

It is therefore an object of the present invention to provide an electronic filing system for greatly improving operability of an operator so that documents can be electronically filed easily and efficiently by a method fit for the operator.

In accordance with a first structure of the present invention, the above object can be achieved by an electronic filing apparatus comprising information reading means for reading a document and image information; registering means for sorting the read information provided by the information reading means every document and registering the sorted information to a memory mediu.m; retrieving means for retrieving the registered information; and display means for displaying the read information provided by the information reading means, information to be registered by the registering means, the registered information provided by the registering means, the retrieved information provided by the retrieving means, etc. The electronic filing apparatus further comprises first information control means for sorting the read information provided by the information reading means into many nameable boxes prepared in advance so as to perform the registering and retrieving operations; second information control means for sorting the read information provided by the information reading means by calendar information such as years, months, days, days of the week, etc. so as to perform the registering and retrieving operations; third information control means for sorting the read information provided by the information reading means in accordance with an information card made on the basis of arbitrary image information separately read by the information reading means so as to perform the registering and retrieving operations; and selective means for arbitrarily selecting the first, second and third information control means.

In accordance with a second structure of the present invention, the read information provided by the information reading means is registered irrespective of a selecting state of the selective means by associating the first, second and third information control means with each other.

In accordance with a third structure of the present invention, the second information control means has means for storing the calendar information for a predetermined period and updating a date of the day based on the calendar information every time one day has passed; and means for automatically sorting and registering the read information at the date of the day when no second information control means is selected at a registering time of the read information provided by the information reading means.

In accordance with a fourth structure of the present invention, the First information control means has a temporary sorting box for temporarily sorting information; and means for automatically sorting and registering the read information into the temporary sorting box when no first information control means is selected at a registering time of the read information provided by the information reading means.

In accordance with a fifth structure of the present invention, the third information control means has a temporary sorting information card for temporarily sorting information; and means for automatically sorting and registering the read information to the temporary sorting information card when no third information control means is selected at a registering time of the read information provided by the information reading means.

In accordance with a sixth structure of the present invention, the first information control means includes means for displaying each of the boxes on a screen of the display means in a figurative pattern having a predetermined shape, and means for changing a modificative pattern added to the figurative pattern in accordance with the number of documents sorted into each of the boxes.

In accordance with a seventh structure of the present invention, the modificative pattern added to the figurative pattern shows a shadow of a basic pattern, a document thickness or the number of overlapped documents, and the modificative pattern is added to the figurative pattern without changing a display position of the basic pattern.

In accordance with an eighth structure of the present invention, the second information control means includes means for displaying the calendar information on a screen of the display means in a table form constituting each of date columns, and means for displaying a different number of bar patterns within each of the date columns in accordance with the number of documents sorted every date.

In accordance with a ninth structure of the present invention, the information control means in the eighth structure further has means for displaying a mark indicative of a schedule of a conference, a business trip, etc. in each of the date columns.

In accordance with a tenth structure of the present invention, the third information control means includes means for displaying the information card on a screen of the display means in a constant rectangular pattern having image information, and means for adding a different number of clip patterns to the rectangular pattern in accordance with the number of documents sorted to each information card.

In accordance with an eleventh structure of the present invention, the registering means or the information control means in each of the above electronic filing apparatuses has means for displaying a reduced image on a first or designated page of the document read by the information reading means in a window on the screen of the display means when information of this document is registered.

In accordance with a twelfth structure of the present invention, the registering means or the information control means has list display means for listing and displaying a reduced image on a first or designated page of a desirable document sorted and registered to a sorting divisional section on the screen of the display means when this sorting divisional section is designated in retrieval of information of the desirable document.

In accordance with a thirteenth structure of the present invention, the list display means has page turning means for sequentially switching and displaying the reduced image every predetermined number when no reduced image on one page of each of all documents sorted into the designated sorting divisional section can be displayed in one picture on the screen of the display means.

In accordance with a fourteenth structure of the present invention, the page turning means sequentially switches and displays automatically the reduced image on one page of each of all the documents sorted into the designated sorting divisional section on the screen of the display means every predetermined number; and the page turning means has means for gradually increasing a switching speed of the reduced image display while one button of a mouse for inputting various kinds of operational commands is pushed, and interrupting the display switch when another button of the mouse is pushed.

In accordance with a fifteenth structure of the present invention, the list display means has additional means for adding a modificative pattern showing a shadow, a document thickness or the number of overlapped document sheets to a contour portion of the reduced image on one page in accordance with the number of pages of each of the documents sorted into the designated sorting divisional section.

In accordance with a sixteenth structure of the present invention, the additional means adds the modificative pattern showing a shadow, a document thickness or the number of overlapped document sheets changed according to the number of pages of each of the documents to the contour portion without changing a display position oF the reduced image on one page.

In accordance with a seventeenth structure of the present invention, the sorting divisional section is constructed by one of a box, calendar information and an information card.

In accordance with an eighteenth structure of the present invention, the retrieving means or the information control means has document image display means For displaying a document image. When one of reduced images on one pages of documents listed and displayed on the screen of the display means is selected, the document image display means displays a document image on each of pages oF a document having information on this selected page at an approximately equal magnification, or displays an enlarged document image on each of the pages of the document. The document image display means displays this document image from a First page in a page order.

In accordance with a nineteenth structure of the present invention, the document image display means displays a document image on each of pages of a document having information on the selected page at an approximately equal magnification, or displays an enlarged document image on each of the pages of the document. The document image display means displays this document image from a first page in a page order by automatically switching the document image. The document image display means has means for gradually increasing a switching speed of the document image display while one button of a mouse for inputting various kinds of operational commands is pushed, and interrupting the display switch when another button of the mouse is pushed.

In accordance with a twentieth structure of the present invention, the electronic filing apparatus further comprises progressing means connected to the mouse which has means for generating moving data of a mouse cursor by rotating a track ball and has a pair of buttons for inputting selecting and canceling commands of operations and functions of the electronic filing apparatus. The progressing means starts all operations of the electronic filing apparatus by displaying the mouse cursor and patterns of icons, characters, buttons or keys for selecting various kinds of operations and functions on the screen of the display means using the respective constructional means, and selectively designating any one of the patterns by the mouse.

In accordance with a twenty-first structure of the present invention, the electronic filing apparatus further comprises second display means for displaying a help icon having a specific mark on the screen of the display means at any time. When this help icon is selectively designated by the mouse, this second display means displays explanatory information relative to operations of the electronic filing apparatus at this time in a window on the screen of the display means.

In accordance with a twenty-second structure of the present invention, the memory medium is constructed by a magnetooptic disk.

In accordance with a twenty-third structure of the present invention, the electronic filing apparatus further comprises sequential display means for sequentially displaying a series of images similar to those at a real operating time on the screen of the display means together with a movement of the mouse cursor to show operating procedures and functions of the electronic filing apparatus. Image data for display and program data of this sequential display means are stored and held in the built-in memory medium.

In accordance with a twenty-fourth structure of the present invention, the electronic filing apparatus further comprises means for printing the read information provided by the information reading means, information to be registered by the registering means, the registered information provided by the registering means, the retrieved information provided by the retrieving means, and the displayed information provided by the display means.

As mentioned above, in the electronic filing apparatus of the present invention, operability of an operator is greatly improved. Any operator can arbitrarily select a method for electronically filing documents and fit for the operator so that the documents can be filed simply and efficiently.

Namely, the electronic filing apparatus of the present invention has a box sorting-retrieving system using first information control means, a calendar or diary sorting-retrieving system using second information control means, and a card sorting-retrieving system using third information control means. These three sorting-retrieving systems are arbitrarily selected by an operator at any time. Thus, when read information is registered, the read information can be sorted and then retrieved.

The operator can also sort the read information by a sorting-retrieving method selected when the read information is registered. Further, the sorted information is automatically added, or the read information is temporarily sorted by a sorting-retrieving method unselected by the operator. Accordingly, these information can be processed without any problems when another sorting-retrieving system is selected later.

Further, when a box is displayed, the number of sorted documents can be displayed by the thickness of a figurative pattern of the box or the number of overlapped boxes. When calendar information is displayed, the number of sorted documents can be displayed by the number of bar patterns within a date column of the calendar information, When a card is displayed, the number of sorted documents can be displayed by the number of clip patterns added to a card pattern or modificative patterns replaced with the clip patterns. Accordingly, an operator can know the number of documents sorted every sorting divisional section so that it is convenient for the operator to operate the electronic filing apparatus.

When document information read by information reading means is registered, a reduced image on a first or designated page of this document can be displayed in a window on the screen of a display means. Thus, it is possible to confirm an image listed and displayed when this document is retrieved.

When the registered document information is retrieved and one of sorting divisional sections such as a box, a date column, an information card, etc. is designated, a reduced image on a first or designated page of each of documents sorted and registered to this sorting divisional section is listed and displayed on the screen of the display means. Accordingly, it is possible to easily and rapidly find a desirable document.

When no reduced image on the first page of each of all the documents sorted to the designated sorting divisional section can be displayed as one picture on the screen, it is possible to switch and display reduced images such that pages of the documents are sequentially turned every predetermined number. At this time, while one button of a mouse is pushed, a switching speed of the above reduced images can be gradually increased. In contrast to this, when another button of the mouse is pushed, a switching operation of the above reduced images can be interrupted.

Further, a modificative pattern showing a shadow, a document thickness or the number of overlapped document sheets can be added to a contour portion of the reduced image on the first page of each of the above listed and displayed documents. Thus, it is possible to show the number of pages of each of the documents.

When any one of reduced images on one pages of the documents listed and displayed on the screen is selected, a document image on each of the pages of a document having information on this selected page is displayed at an approximately equal magnification or is enlarged. This document image is displayed from a first page in a page order. Accordingly, an operator can confirm all pages of a retrieved document and can also read the contents of a document image on a required page of the retrieved document.

In this case, while one button of the mouse is pushed, the switching speed of a document image on a displayed page can be gradually increased. In contrast to this, when another button of the mouse is pushed, a switching operation of the document image on the displayed page can be interrupted.

No keyboard is required in this electronic filing apparatus. Further, all operations of the electronic filing apparatus can be started and performed by simply connecting the mouse to the electronic filing apparatus and selectively designating patterns of icons, characters, buttons or keys for selecting various kinds of operations and functions displayed on the screen by a mouse cursor.

A help icon having a specific mark is displayed in a displayed picture at any time. When this help icon is selectively designated by the mouse, explanatory information relative to operations at this time is displayed in a window on the screen. Accordingly, an operator can perform operations in accordance with this explanatory information even when no operator can understand a method for operating the electronic filing apparatus in use. Therefore, it is not necessary to find an instruction manual, etc. and read a required explanatory description of this instruction manual.

Further, a series of images similar to those at a real operating time can be sequentially displayed on the display screen together with a movement of the mouse cursor so as to show operating procedures and functions of this electronic filing apparatus. Accordingly, it is very convenient for a user to know functions and operations in demonstration and at a delivering time of the electronic filing apparatus. Further, the user can know operating methods and functions of this electronic filing apparatus while the user see displayed pictures without reading an instruction manual of the electronic filing apparatus.

If a compact magnetooptic disk is used as a memory medium of this electronic filing apparatus, information of many documents can be stored to the compact disk. When the electronic filing apparatus is commonly used for plural persons, it is convenient for each of the persons to have a personal memory medium such as a personal magnetooptic disk, etc.

When a printer such as a laser printer is connected to the electronic filing apparatus, it is possible to print all of read information, information to be registered, registered information, retrieved information, information displayed on the screen, etc. in accordance with necessity.

Further objects and advantages of the present invention will be apparent from the following description of the preferred embodiments of the present invention as illustrated in the accompanying drawings.

BRIEF DESCRIPTION OF THE DRAWINGS

FIGS. 6a and 6b are explanatory views each showing a set position of a document sheet fed to a scanner 3 shown in FIG. 3 every size of the document sheet;

FIG. 10 is an explanatory view of icons displayed in the initial picture of each of FIGS. 7 to 9;

FIG. 60 is an explanatory view showing a constructional example of registered document information;

FIG. 85 is an explanatory view showing another constructional example of the image file;

FIG. 86 is an explanatory view showing a change in image for retrieval when images on plural pages are set to one document and an image on a first page is set to an image for retrieval and is then deleted;

FIG. 87 is a view showing a general display example of document retrieving results;

FIG. 88 is an explanatory view showing an image storing state in which an image is stored to a magnetooptic disk in the electronic filing apparatus of the present invention;

FIG. 90 is a view showing another display example of the document retrieving results.

DESCRIPTION OF THE PREFERRED EMBODIMENTS

The preferred embodiments of an electronic filing apparatus in the present invention will next be described in detail with reference to the accompanying drawings.

Hard Construction in Embodiments

The hard construction of an electronic filing apparatus in the present invention will next be described.

Figure 3:
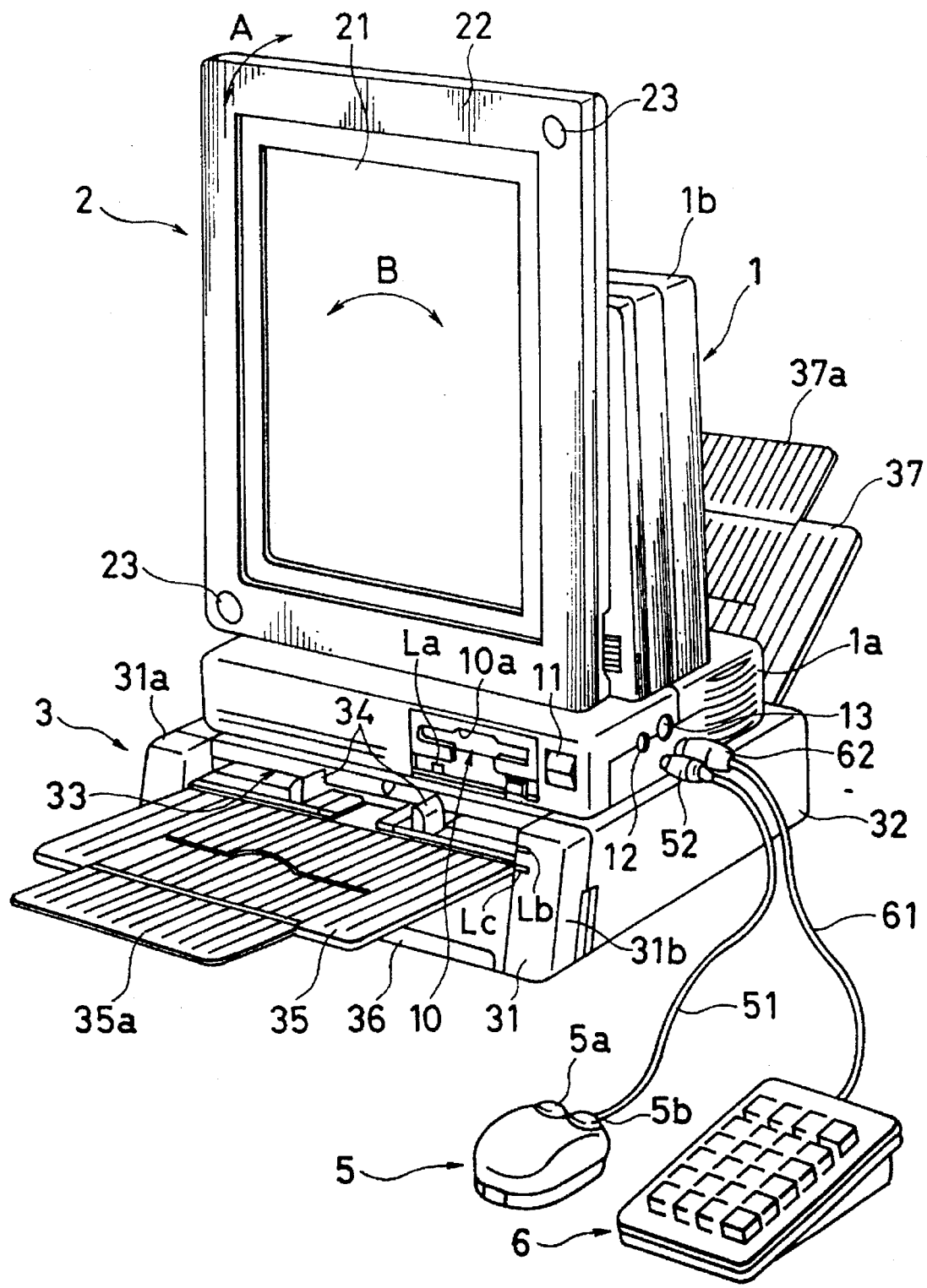
FIG. 3 is a perspective view of an electronic filing apparatus in accordance with one embodiment of the present invention.

FIG. 3 is a perspective view of an electronic filing apparatus in accordance with one embodiment of the present invention in a state in which the electronic filing apparatus can be used.

This electronic filing apparatus is constructed by an apparatus body 1, a liquid crystal display 2 having a large screen, a sheet scanner 3 of a sheet reading type, a mouse 5 or a key pad 6 as a pointing device. The liquid crystal display is simply called a display or a display unit in the foliowinE description. A printer such as a laser printer, etc. is connected to the electronic filing apparatus in accordance with necessity. However, this printer is not necessarily arranged such that the printer is adjacent to the electronic filing apparatus. The printer can be commonly used for other devices. Accordingly, this printer is not illustrated in FIG. 3.

This apparatus body 1 is constructed by a horizontal portion 1a and a vertical portion 1b. The horizontal portion 1a has a flat box shape and is arranged on an upper face of the scanner 3. The vertical portion 1b vertically rises on the horizontal portion 1a. The horizontal portion and the vertical portion 1b are fixed to each other in an inverse T-shape.

A magnetooptic disk drive unit 10 is disposed within the horizontal portion 1a. A magnetooptic disk insertion port 10a and an operating lamp La are disposed on a front face of the horizontal portion 1a. Reference numeral 11 designates a power switch.

A connector 12 for mouse connection and a connector 13 for keypad connection are disposed on a right-hand side face of the horizontal portion 1a in FIG. 3. A plug 52 is disposed at an end tip of an interface cable 51 of the mouse 5 having a left-hand button 5a and a right-hand button 5b, and can be inserted and attached to the connector 12. A plug 62 is disposed at an end tip of an interface cable 61 of the keypad 6 and can be inserted and attached to the connector 13. A large-sized key board used in a normal word processor, etc. can be also connected to the connector 13. One of the mouse 5 and the keypad 6 may be connected to one of the connectors and only the mouse 5 is normally used.

The display unit 2 is constructed by a display screen 21 and a frame portion 22 therearound. A rear central portion of the display unit 2 is supported and attached onto a front face of the vertical portion 1b of the apparatus body 1 such that the display unit 2 can be inclined and moved. Thus, the display unit 2 can be inclined in the direction of an arrow A. Further, the display unit 2 can be rotated 90° in the direction of an arrow B so that a longitudinal screen shown in FIG. 3 is switched to a transversal screen. A pair of recessed portions 23, 23 are disposed in the vicinity of diagonal points of the frame portion 22. These recessed portions 23 are formed to easily move the display unit 2 by engaging an operator's thumb with each of these recessed portions when the display unit 2 is inclined and rotated.

The apparatus body 1 also has a control circuit including a microcomputer, an image processing circuit, an image memory, a hard disk unit, etc. to sort information read by the scanner 3 every document and register the read information to a magnetooptic disk and retrieve and display the registered information by the display unit 2.

The scanner 3 is constructed by an inner case S1 having a flat box shape and an outer case 32 having an opened front face. A sheet insertion port 33, a conveying mechanism of a sheet such as a paper sheet inserted into this sheet insertion port 33, and an image reading means are stored within the inner case 31. The image reading means is constructed by a line image sensor, a drive circuit for operating this line image sensor, etc. The outer case 32 is slidably fitted onto the inner case 31 such that the inner case 31 is moved forward and backward like a drawer. The outer case 32 supports the apparatus body 1 arranged thereon.

A conveying path of the paper sheet can be opened in a state in which the inner case 31 is pulled out of the outer case 32 on this side.

A pair of paper guides 34, 34 are slidably disposed in a width direction on this side of the sheet insertion port 33 of the inner case 31. The paper guides 34 restrict both side ends of a set paper sheet in its width direction. The width direction of the paper sheet is set to a horizontal direction as right-hand and left-hand directions in FIG. 3.

A sheetlike document is arranged on a paper feed tray 35. The paper feed tray 35 is detachably disposed on a front face of the sheet insertion port 33 of the inner case 31 on this side thereof. The paper feed tray 35 is stored into a paper feed tray storing portion 36 when no paper feed tray 35 is used. The paper feed tray storing portion 36 is disposed along a lower face of the inner case 31. The paper feed tray 35 has an auxiliary tray 35a which can be folded and extended. The auxiliary tray 35a is used by extending this tray as shown in FIG. 3 when an elongated document is set. When no scanner is used, the auxiliary tray 35a is folded and the paper feed tray 35 is detached from the inner case 31. Thus, the paper feed tray 35 can be inserted and stored into the paper feed tray storing portion 36.

A paper discharging tray 37 for discharging a read sheet is detachably disposed in an upper rear end portion of the outer case 32. The paper discharging tray 37 also has an auxiliary tray 37a which can be folded and extended.

The inner case 31 has columnar end blocks 31a, 31b in both side front end portions thereof. A power lamp Lb and a misfeed display lamp Lc are disposed in the right-hand end block 31b.

In this embodiment, the liquid crystal display is used as a display unit and preferably has a white large screen. However, the present invention is not limited to this display unit. For example, an electronic display using electroluminescence, a plasma display, a flat CRT display, etc. can be used when these displays are thin.

Further, the scanner is constructed by a double case structure in which the inner case can be drawn out of the outer case. However, an integral case structure may be used and formed in a flat box shape. In this case, an upper cover capable of opening a sheet conveying path is disposed on an upper face of the integral case structure such that the upper cover can be opened and closed. When a jammed paper sheet is taken out and the electronic filing apparatus is maintained and checked, the apparatus body is detached from the scanner to open the upper cover so that the electronic filing apparatus can be easily maintained and checked. Such an integral case structure may be used when the electronic filing apparatus is compact.

Figure 4:
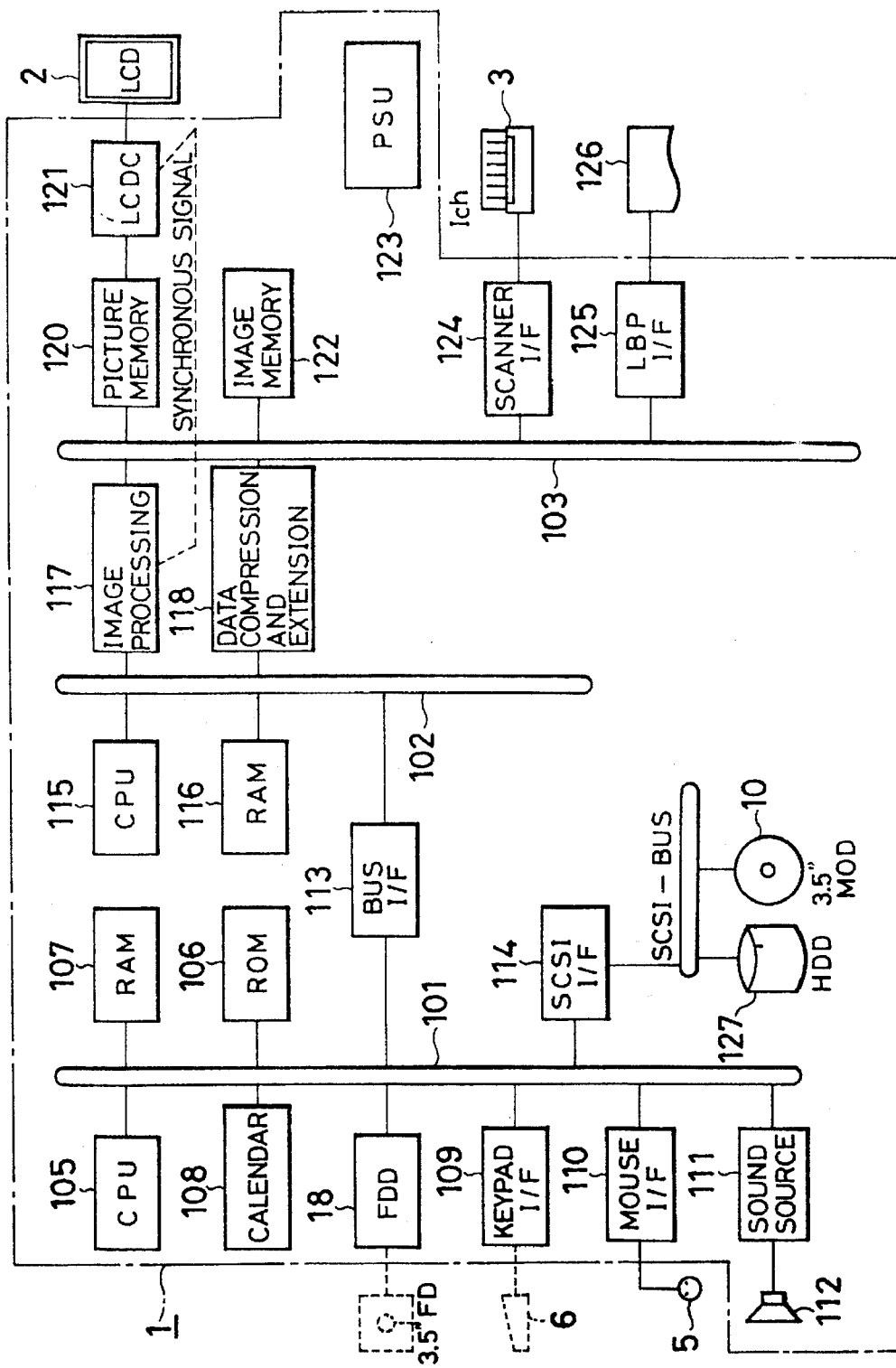
FIG. 4 is a block diagram showing the internal structure of a body of the electronic filing apparatus shown in FIG. 3.

FIG. 4 is a block diagram showing an entire structure of this electronic filing apparatus. An internal structure of the apparatus body 1 will be mainly described next with reference to FIG. 4. Constructional portions similar to those in FIG. 3 are designated by the same reference numerals.

Four buses composed of buses 101, 102, 103 and an SCSI bus 104 are disposed within the body 1 of this electronic filing apparatus.

The bus 101 is a bus controlled by a CPU 105 for generally controlling an entire operating system of the electronic filing apparatus. A ROM 106, a RAM 107, a calendar IC 108, a floppy disk drive unit (FDD) 18, a key pad I/F(interface) 109, a mouse I/F 110, a sound source circuit 111 for producing a sound from a speaker 112, etc. are connected to this bus 101. This bus 101 is connected to an ICU bus 102 through a bus I/F 113 and is connected to the SCSI bus 104 through an SCSI I/F 114.

Since the sound source circuit 111 and the speaker 112 are disposed, it is possible to produce various kinds of sounds relative to operations of the electronic filing apparatus. For example, it is possible to produce an error sound at the time of an error in operation, a melody sound at an input waiting time, etc., a page turning sound at a page turning time, and a paper tearing sound when information is abandoned and a sheet of paper about this information is thrown away into a garbage box. However, these sounds are not necessarily required.

The bus 102 is a bus controlled by a CPU 115. A RAM 116, an image processing circuit 117 and a data compressing-extending circuit 118 are connectted to the bus 102. The bus 102 is also connected to the bus 101 through the bus I/F 113.

Output sides of the above image processing circuit 117 and the data compressing-extending circuit 118 are connected to the bus 108. A picture image memory 120 and an image memory 122 for storing various kinds of image data are also connected to the bus 103. The picture image memory 120 stores an image displayed by the liquid crystal display (LCD) 2 by an LCD controller 121. A scanner I/F 124 for connecting the above sheet scanner 3 and an LBP I/F 125 for connecting a laser printer (LBP) 128 for size A4 are also connected to the bus 103.

The above magnetooptic disk driver (MOD) 10 and a hard disk driver (HDD) 127 as a built-in memory are connected to the SCSI bus 104.

Reference numeral 128 designates a power source unit (PSU) for supplying a suitable direct current voltage to each of these constructional portions.

Figure 5:
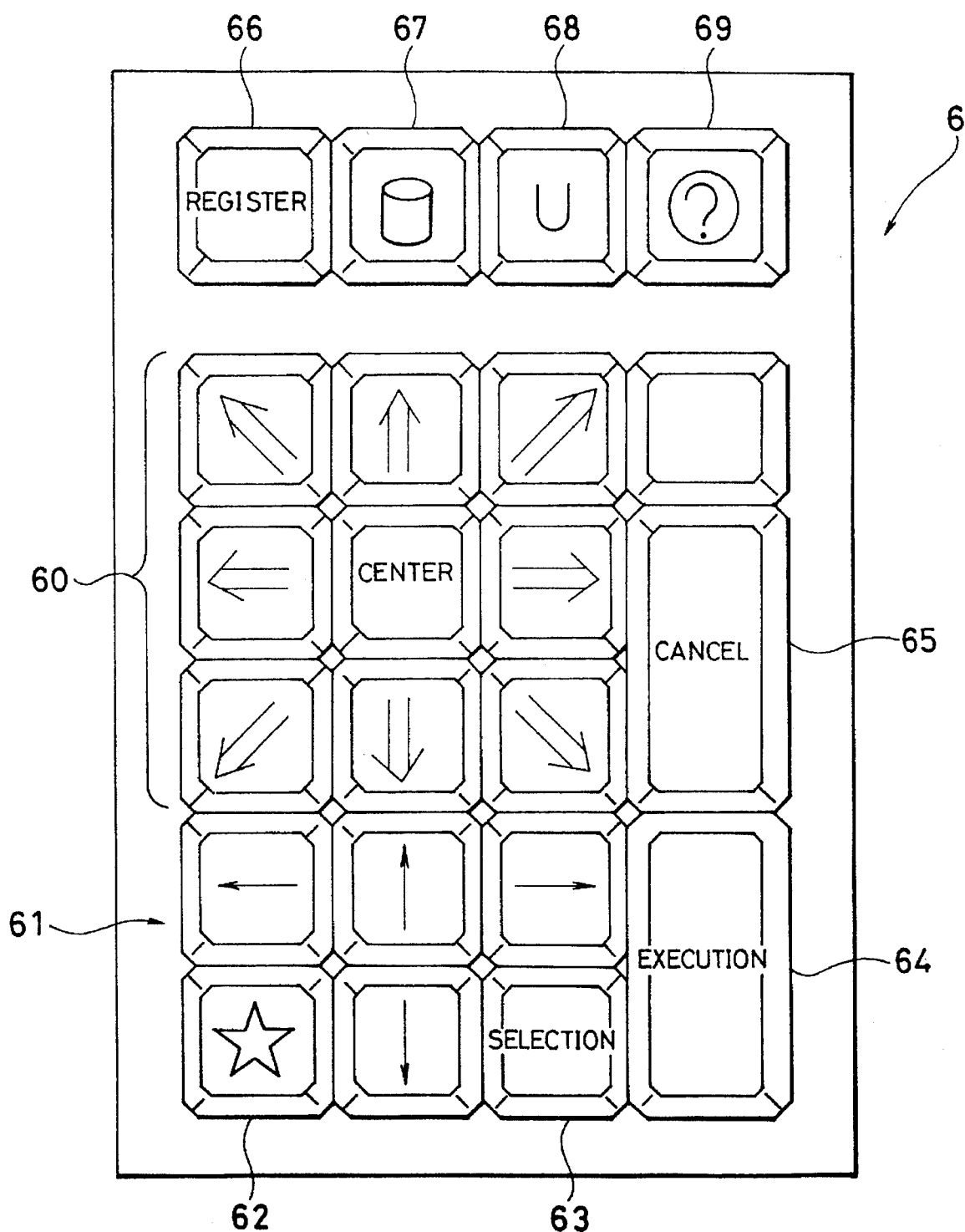
FIG. 5 is a plan view of the key pad 6 shown in FIG. 3.

FIG. 5 is a plan view showing the key pad 6 illustrated in FIG. 3. In FIG. 5, a key group 80 is used to move a mouse cursor in an arrow direction at a high speed. When a central key is pushed, the mouse cursor is moved to the center of a screen. A key group 61 is used to move the mouse cursor in an arrow direction at a constant speed. A key 62 is used to perform a nine-point scrolling operation by simultaneously pushing this key 62 and any key in the key group 60. A selective key 63 is used to select an icon and a button in conformity with the mouse cursor. The selective key 63 has the same function as the left-hand button 5a of the mouse. An execution key 64 for executing an operation of the electronic filing apparatus functions when a button for "execution" is displayed in a window.

A cancel key 65 for canceling an operation of the electronic filing apparatus functions when a button for "cancel" is displayed in a window. Similar to click of the right-hand button 5b of the mouse, a processing operation of the electronic filing apparatus is interrupted when this cancel key 65 is pushed. A key 66 indicates a registering operation of the electronic filing apparatus. A key 67 is used when a document list in the garbage box is displayed. A key 68 is used when a utility operation is started. A key 69 is used when a help window described later is displayed. An operation similar to that of the mouse 5 can be performed even when the key pad 6 is used.

Each of FIGS. 6a and 6b shows the relation between a sheet size, a set position and a vertical direction of a paper document sheet 7 when the document sheet 7 as an original read on the paper feed tray 35 of the scanner 3 shown in FIG. 3 is set. FIG. 6a shows a case in which the original is longitudinally elongated. FIG. 6b shows a case in whioh the original is transversally elongated. A broken line shows a contour of the original in the set position every sheet size. Each of sheet sizes A5 to A3 is additionally described in FIGS. 6a and 6b.

Summary of Functions of this Electronic Filing Apparatus

Functions of this electronic filing apparatus will be summarized as follows.

Figure 1:
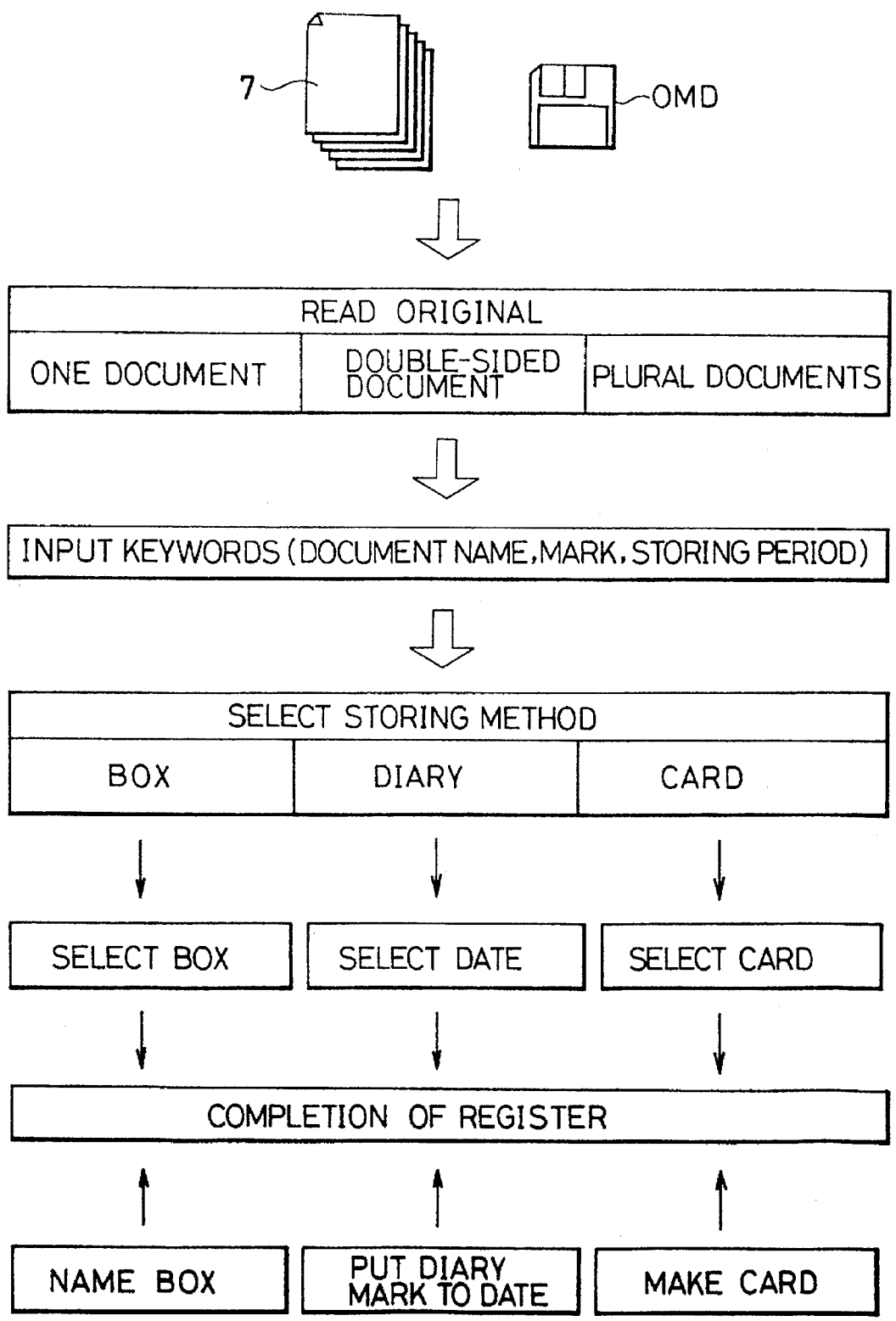
FIG. 1 is an explanatory view showing procedures of a registering operation of an electronic filing apparatus of the present invention.

FIG. 1 is an explanatory view showing the procedures of a registering operation of the electronic filing apparatus in the present invention. As clearly seen from FIG. 1, three kinds of sorting systems of a box, a diary and a card can be arbitrarily selected in the electronic filling apparatus. As shown in Table 1, these three sorting systems function in association with each other.

TABLE 1

|  | box | diary | card |
| --- | --- | --- | --- |
| sort by box | manual designation | automatic designation (when registered) | automatic designation (temporary sort) |
| sort by diary | automatic designation (temporary sort) | manual designation | automatic designation (temporary sort) |
| sort by card | automatic designation (temporary sort) | automatic designation (when registered) | manual designation |

When one of the three sorting systems is selected, a box, a diary or a card for sorting document information is manually designated. However, the document information is also sorted automatically in another sorting system.

The box constitutes a first information control means for sorting document information read by the scanner 3 into many boxes which are prepared in advance and can be named. This first information control means then registers and retrieves this sorted document information.

The diary constitutes a second information control means for sorting the read document information in accordance with calendar information such as years, months, days, days of the week, etc. The second information control means then registers and retrieves this sorted document information.

The card constitutes a third information control means for sorting the read document information by making this read document information correspond to an information card made on the basis of arbitrary image information separately read by the scanner 3. The third information control means then registers and retrieves this sorted document information. These first, second and third information control means can be arbitrarily selected at any time.

The above second information control means as a diary stores calendar information for a predetermined period and updates a date of the day based on the calendar information every time one day has passed. When "sort by diary" is not selected in registration of the read document information, a sorting method of the diary is automatically designated at the date of the day as shown in Table 1 and the document information is registered at this date.

The first information control means as a box has a box for temporary sort in which document information is temporarily sorted. When "sort by box" is not selected in registration of the read document information, this box for temporary sort is automatically designated as a sorting method of the box as shown in Table 1 and the document information is registered into this box for temporary sort.

The third information control means as a card has an information card for temporary sort in which document information is temporarily sorted. When "sort by card" is not selected in registration of the read document information, this information card for temporary sort is automatically designated as a sorting method of the card as shown in Table 1 and the document information is registered to this information card.

In FIG. 1, when document information is registered by the electronic filing apparatus, a magnetooptic disk OMD is mounted to the magnetooptic disk drive unit 10 shown in FIG. 3. Then, an original 7 to be read is set on the scanner 3.

Methods for reading the original 7 are different from each other according to whether this original is constructed by one document, a double-sided document or plural documents. Accordingly, a reading operation of the original is started by designating one of these reading methods. A key word used for keyword retrieval, a document name, a mark, a storing period, etc. can be inputted to the read document in accordance with necessity. However, these contents are not necessarily inputted to the read document.

Thereafter, the above sorting method of a box, a diary or a card for storing document information is selected in accordance with a use purpose, etc. When the box is selected, a box for sort is selected and registered. When the diary is selected, a date for sort is selected and registered. When the card is selected, a card for sort is selected and registered. At this time, the box, the diary or the card is automatically designated as a sorting method to sort document information when no sorting method is selected as mentioned above. A document number and a registered date are necessarily described.

When the document information is sorted by the box, the diary or the card, the document information is apparently stored to this sorting box, diary or card. However, in reality, no storing place of the document information is changed, but only information for sort is added to the stored document information. Accordingly, this sorting method can be freely changed even after the document information has been registered. Further, each of boxes can be named and a diary mark described later can be added to a date and a new card can be made.

In the above three kinds of sorting systems, the box is suitable for the sorting of document information from every document kind. The diary is suitable for sorting of the document information by making, publishing, receiving, reporting dates of documents including months, days of the week, weeks, etc. The card is suitable for sorting of the document information every individual person and interested person by registering name cards, staff member certificates, etc. as information cards. However, the same sorting system may be used in accordance with a user's choice.

Figure 2:
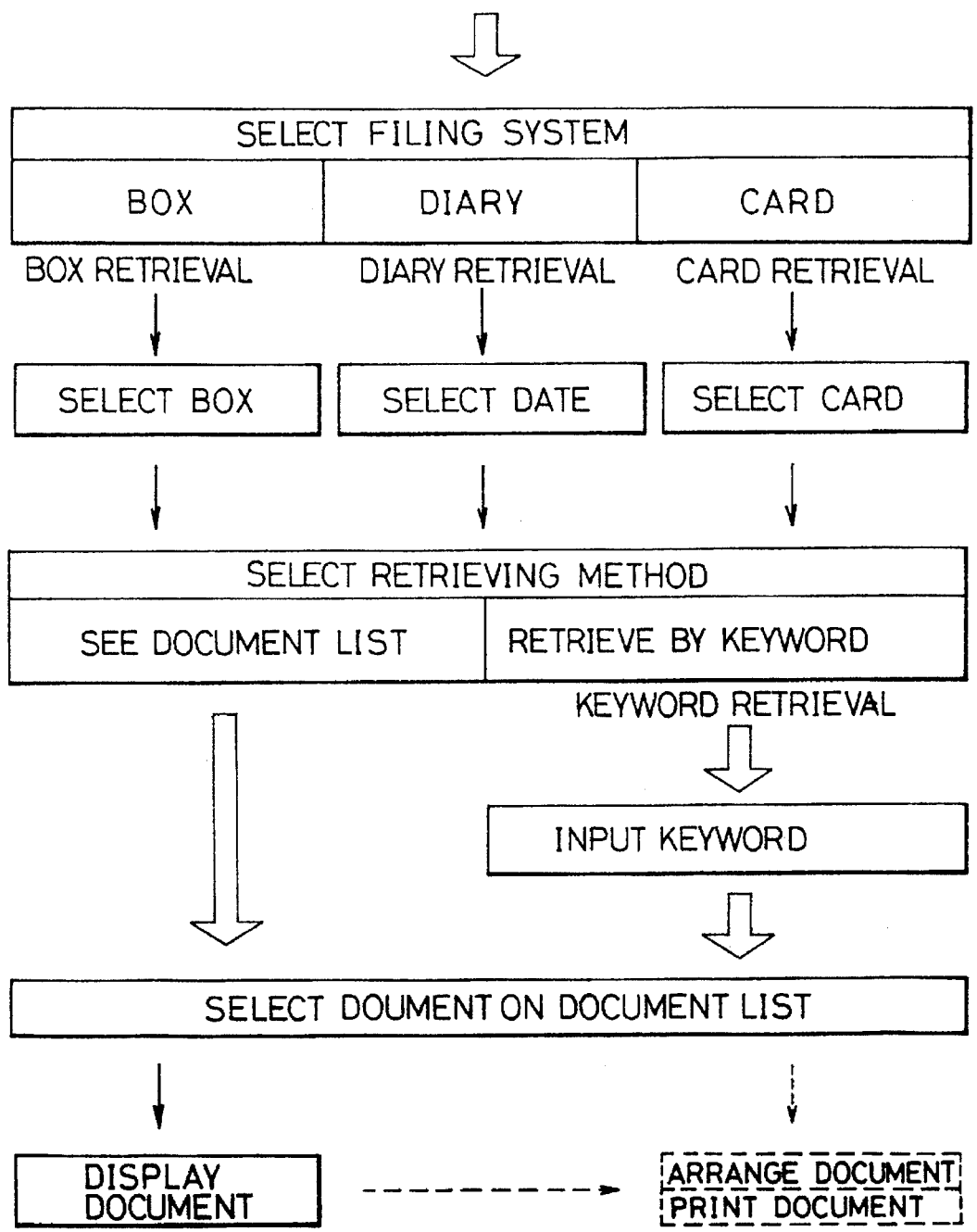
FIG. 2 is an explanatory view showing procedures of a retrieving operation of the electronic filing apparatus of the present invention.

FIG. 2 is an explanatory view showing the procedures of a retrieving operation of the electronic filing apparatus in the present invention. At a retrieving time, a magnetooptic disk OMD registering a retrieved document is mounted onto the electronic filing apparatus. Then, the same filing system as the sorting system of a box, a diary or a card at a registering time is selected.

In the case of box retrieval, any box displayed on the screen is designated and selected. If the case of diary retrieval, a calendar date displayed on the screen is designated and selected. In the case of card retrieval, any card displayed on the screen is designated and selected.

Next, "see by document list" or "retrieve by keyword" is selected as a retrieving method. In the case of "see by document list", an image on one page of each of documents sorted into designated sorting divisional sections of boxes, etc. is listed and displayed as a reduced image. In contrast to this, in the case of "retrieve by keyword", when a keyword is inputted, images on pages of all documents having this keyword are listed and displayed as reduced images.

If any one of these listed and displayed documents is designated, it is possible to display images on all pages of this designated document. In this case, a reduced image on each of pages of the designated document is first listed and displayed. When any page of these pages is further designated, only an image on this designated page may be displayed at an approximately equal magnification.

Thus, retrieved document information can be arranged and printed by a printer.

Registering, retrieving, displaying, arranging, printing and utility operations of this electronic filing apparatus constituting main operations thereof will next be explained briefly.

As mentioned above, the registering opera%ion is an operation for registering and storing document information in a magnetooptic disk. In this registering operation, the document information is read by the scanner and is sorted and registered by a box, a diary or a card.

The retrieving operation is an operation for searching object information from the document information registered to the magnetooptic disk. In this retrieving operation, the object information is searched from a document list display of a box, a diary, a card, etc. The object information can be also searched by using a keyword. No retrieving system using a keyword constitutes the features of the present invention. Therefore, this retrieving system is omitted in the following description.

The displaying operation is an operation for displaying the document information read by the scanner 3, information for registering this document information, registered information, the retrieved document information, etc. on the screen 21 of the display unit 2. In this displaying operation, a doubled image display, a reduced image display, a rotational display, etc. can be also performed in addition to an equal magnification display. Further, when information of a transversally elongated document is displayed, the display screen 21 of the display unit 2 can be rotated and transversally arranged.

In the arranging operation, it is possible to change and delete a sorting method of the document information stored to the magnetooptic disk and a keyword, and edit the document information in page unit. In this editing, pages of the document can be partially deleted and can be newly added.

The printing operation is an operation for printing information displayed on the screen and retrieved information by designating the number of printed copies and a page range. In this printing operation, it is also possible to print a list of registered documents.

In the utility operation, the sound volume of a chime ringing in an operation of the electronic filing apparatus is adjusted and the time of a clock displayed on the screen is adjusted and set to be in conformity with the real time. Further, it is possible to set sorting and retrieving systems of a box, a diary and a card first displayed on the screen by setting the magnetooptic disk.

Explanation of Functions and Operations Based on Screen Display

Functions and operations of this electronic filing apparatus will next be explained with reference to examples of various kinds of pictures displayed on the display screen 21 of the display unit 2 shown in FIG. 3.

When a magnetooptic disk is set to the electronic filing apparatus and power is supplied to this electronic filing apparatus, an initial picture is displayed. This initial picture is provided in accordance with a default sorting-retrieving system of a box, a diary or a card set by utility in advance.

Figure 7:
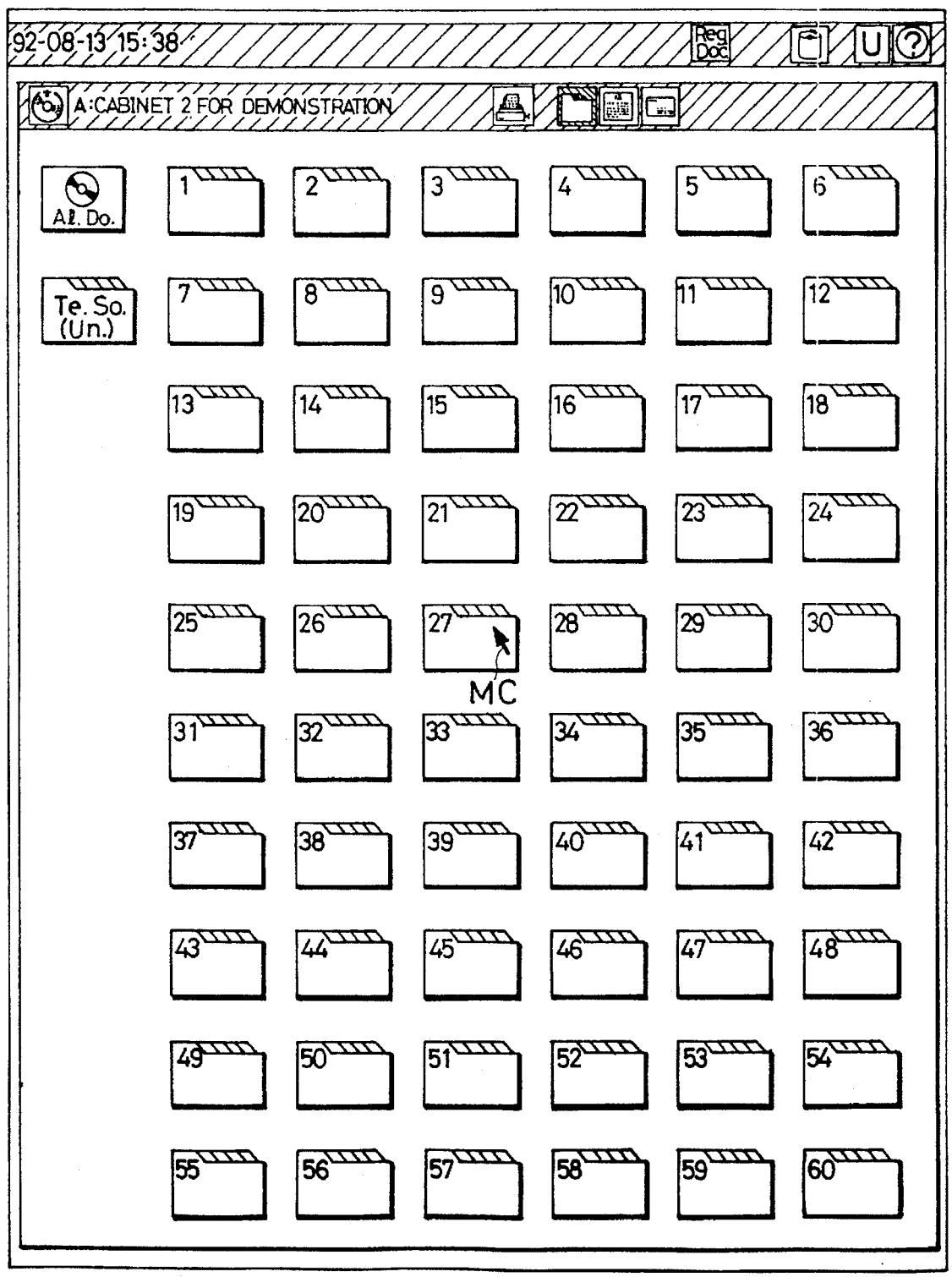
FIG. 7 is a view showing one example of an initial picture of boxes in this embodiment.

FIG. 7 shows one example of the initial picture of a box. In this picture, 60 boxes for sorting are named from 1 to 60 and one box for temporary sort is also provided. The 60 boxes and the one box for the temporary sort are arranged in line and are displayed in a figurative pattern having the same box shape. Further, a pattern for selecting all documents is displayed at an upper left-hand corner. Each of these patterns is shaded on right-hand and lower sides thereof to show that each of these patterns can be selected by a mouse cursor.

In FIG. 7, Reg. Doc., Te. So. (Un.), and A1. Do. are abbreviated forms of "register document", "temporary sort (unsorted)", and "all documents", respectively.

Figure 8:
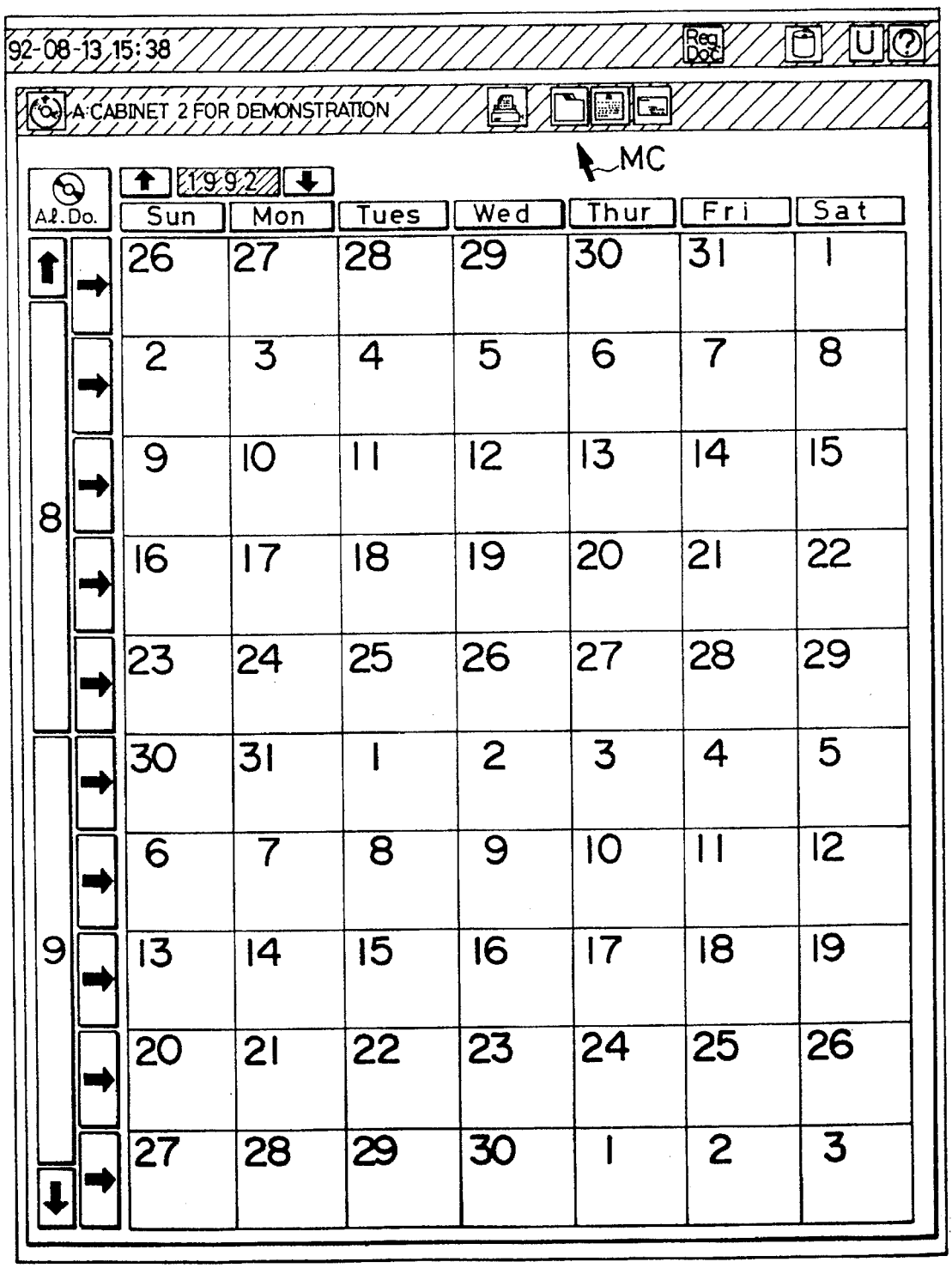
FIG. 8 is a view showing one example of an initial picture of a diary in this embodiment.

FIG. 8 shows one example of the initial picture of a diary. In this initial picture, calendar information of 70 days including this month and the next month is displayed in a table form constituting each of date columns. Further, a pattern for selecting all documents is displayed at an upper left-hand corner.

Each of the date columns, a year on each of the date columns, each of days of the week from Sunday to Saturday, a left-hand month, and each of weeks displayed by transversal arrows can be selected by the mouse cursor MC. The year and the month can be sequentially returned by selecting an arrow directed upward and can be sequentially forwarded by selecting an arrow directed downward.

In FIG. 8, A1. Do. and Reg. Doc. are abbreviated forms of "all documents" and "register document", respectively.

Figure 9:
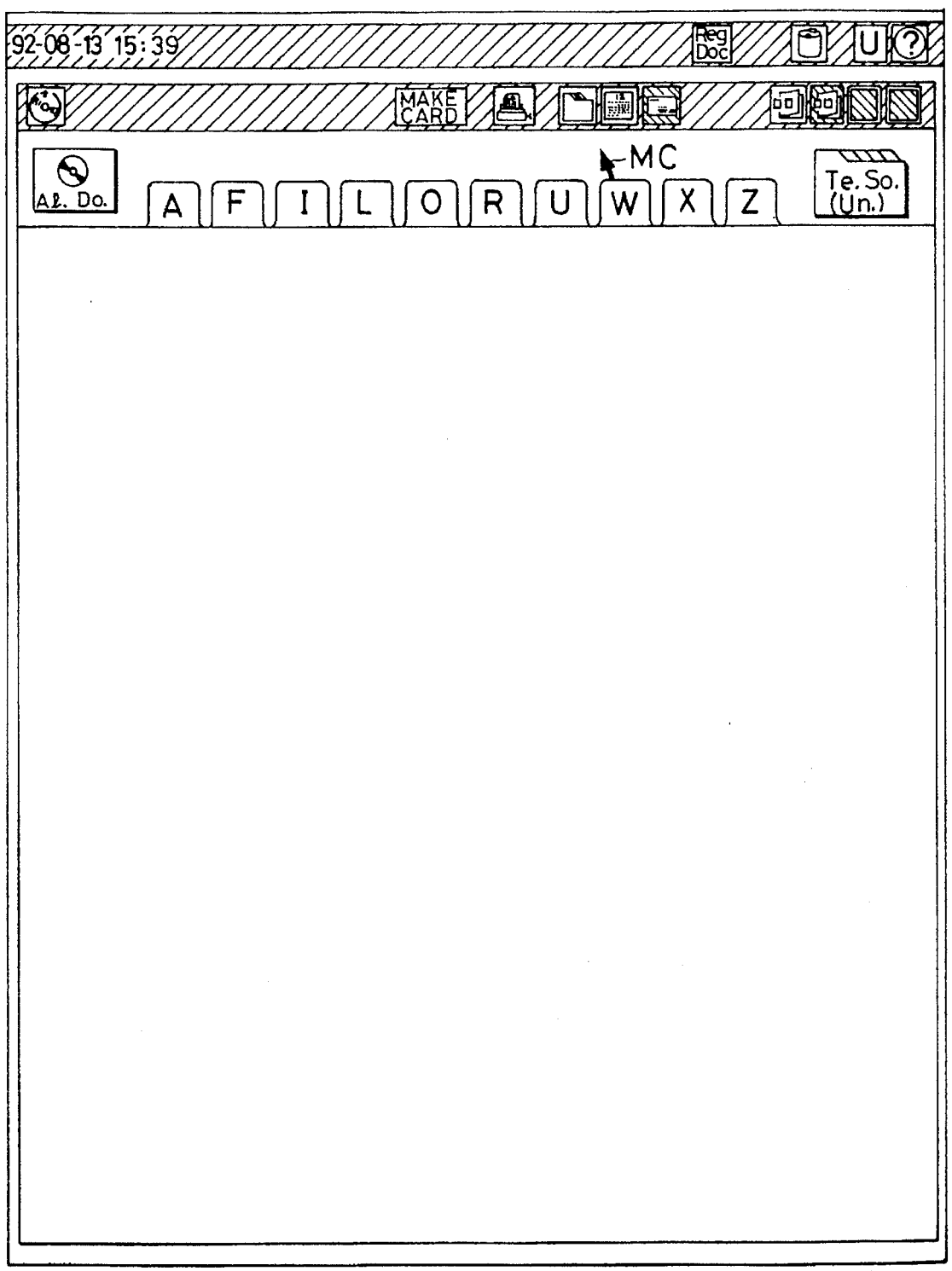
FIG. 9 is a view showing one example of an initial picture of a card in this embodiment.

FIG. 9 shows one example of the initial picture of a card. Ten headers for sorting cards in accordance with characters "A" to "Z" are displayed in an upper portion of this picture. One card for temporary sort is disposed on the right-hand side of the ten headers to temporarily sort document information. In this example, a pattern of this box for temporary sort is equal to the box pattern. Further, a pattern for selecting all documents is displayed on the left-hand side. The header characters can be changed by using different alphabets.

In FIG. 9, A1. Do., Te. So. (Un.), and Reg. Doc. are abbreviated forms of "all documents", "temporary sort (unsorted)" and "register document", respectively.

FIG. 10 is an explanatory view showing icons displayed in these initial pictures. These icons are constructed sequentially from above by icons for selection of "register document" A1, "wastebasket" A2, "utility" A3, "help" A4, "eject" A5, "print" A6, "box" A7, "diary" A8, and "card" A9. These icons are shown by figurative patterns except for "register document"

The icons of "register document", "wastebasket", "utility", and "help" are respectively displayed on a right-hand side within a black band of an uppermost portion of each of the initial pictures. A year, a month, a day of the week, and a time at present are displayed on a left-hand side within this black band.

The icon of "eject" is displayed in a left-hand end portion within a black band on an lower side of the year, etc. A magnetooptic disk can be taken out only when this icon of "eject" is displayed. The icons of "print", "box", "diary" and "card" are displayed from a central portion of this black band to a right-hand side thereof. When these icons are selected, these icons are inverted in black and white colors and are switched on and off.

In FIG. 10, Reg. Doc. is an abbreviated form of "register document"

Accordingly, in the initial picture of boxes shown in FIG. 7, the icon of "box" is displayed by inverting this icon in black and white colors and switching this icon on and off. In the initial picture of a diary shown in FIG. 8, the icon of "diary" is displayed by inverting this icon in black and white colors and switching this icon on and off. In the initial picture of a card shown in FIG. 9, the icon of "card" is displayed by inverting this icon in black and white colors and switching this icon on and off.

Figure 11:
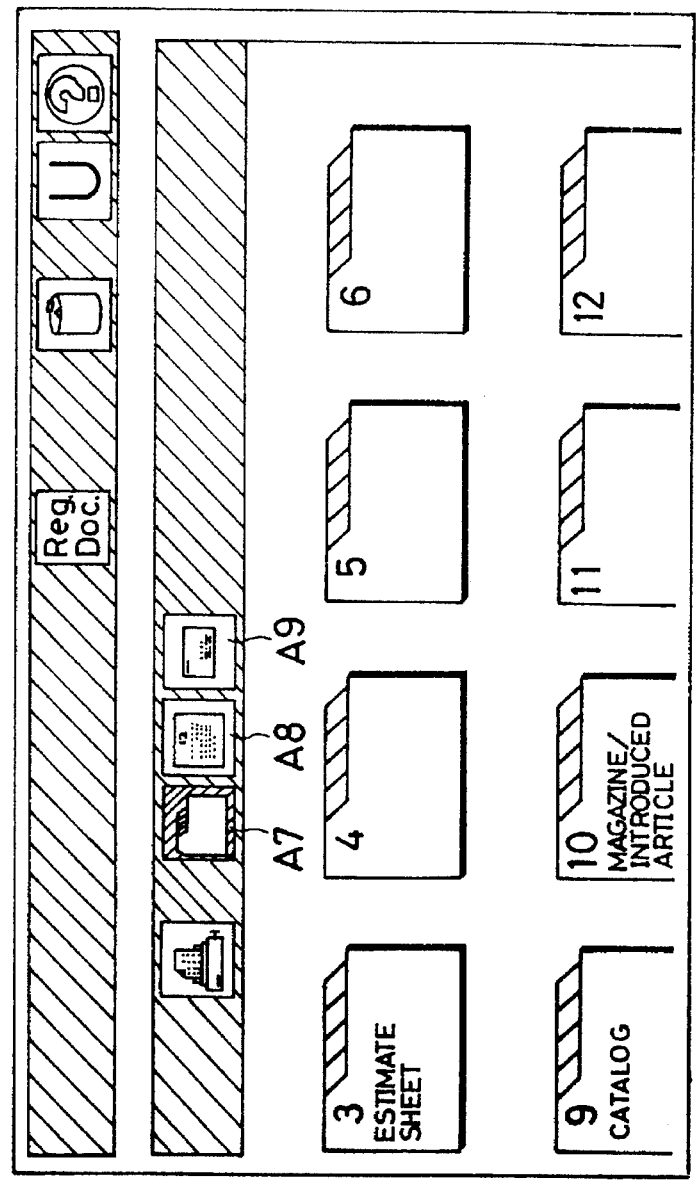
FIG. 11 is an explanatory view of icons selected when sorting-retrieving methods of a box, a diary and a card are changed.

FIG. 11 is an explanatory view of icon selection when the sorting-retrieving systems of a box, a diary and a card are changed. In a state in which a picture of boxes is displayed as shown in FIG. 11, this picture is changed to the picture of a diary if the icon of "diary" A8 is selected. In contrast to this, if the icon of "card" A9 is selected, this picture is changed to the picture of a card. In a state in which the picture of a diary or a card is displayed, this picture is changed to the picture of a box if the icon of "box" A7 is selected.

The sorting-retrieving systems are also switched by this change in display. The sorting-retrieving systems can be changed at any time when the initial pictures are displayed and the above pictures of the icons for selection are displayed. When the sorting-retrieving systems are changed, all contents selected before this change are canceled.

In FIG. 11, Reg. Doc. is an abbreviated form of "register document".

A method for using the mouse 5 shown in FIG. 3 will next be explained briefly.

Each of the above-mentioned icons and buttons described later can be selected by using the mouse 5. These buttons show a series of characters for selecting functions displayed in a window and surrounded by a frame. All functions of the electronic filing apparatus can be used by repeatedly selecting an object function from icons and buttons displayed on the screen by using the mouse 5.

As can be seen from the initial pictures shown in FIGS. 7 to 9, the mouse cursor MC is displayed by a small arrow on the screen and is moved on the screen in conformity with a movement of the mouse 5.

One push of the left-hand button 5a of the mouse 5 is called "left-hand click". The "left-hand click" is used to mainly select an icon and a button. Namely, if the mouse 5 is moved to conform the mouse cursor MC to object icon and button and the "left-hand click" is executed, the icon and button are completely selected. Push of the right-hand button 5b of the mouse 5 is called "right-hand click". The "right-hand click" is used when a processing operation of the electronic filing apparatus is interrupted.

A window will next be described briefly. A frame displayed on the screen is called a window. When this window is displayed, it is possible to select only buttons displayed within this window and a help icon displayed at a right-hand end of a black band in an uppermost portion of a picture. When plural windows are displayed, a finally displayed window is an object to be operated.

The windows are constructed by a pop-up command window, a message window, a help window, a soft keyboard window, a ten-key window, etc.

The pop-up command window is a displayed window overlapping an icon, a button, a date, a document, etc. after the icon, the button, the date, the document, etc. are selected. An operation to be next performed is selected from buttons within this pop-up command window.

The message window is a window for displaying messages for informing operational commands and a systematic operating state on the screen. For example, these messages are constructed by "please wait for a minute", "please select registered box", etc. The help window is an on-line help window for displaying explanatory information of an operation on the screen when a help icon shown by a figure of "?" is selected. The on-line help window will be described later.

The soft keyboard window is a window displayed when it is necessary to input characters of a document name, a box name, a keyword, etc. during an operation of the electronic filing apparatus. In this soft keyboard window, various kinds of character keys and functional keys are selectively displayed such that Japanese hiragana and katakana characters, Chinese characters, English characters, numerical characters and symbols can be inputted. The Chinese characters are inputted by Japanese kana-Chinese character conversion or punctuation codes. Further, an editing area for displaying the inputted characters is disposed in this soft keyboard window.

When the mouse cursor is moved to be in conformity with a character key within this soft keyboard window and the "left-hand click" is executed, this character is displayed in the editing area. When an execution key is clicked on the left-hand side, this character in the editing area is displayed in a column to which this character must be inputted.

The ten-key window is a kind of the soft keyboard window and is displayed when it is necessary to input a numeric value. Only ten keys, a clear key, the execution key and a cancel key are selectively displayed and an editing area for these keys is also disposed. An inputting operation of these keys is similar to that in the case of the above soft keyboard window.

<Register of Documents>

Documents are registered in three registering methods. In a first registering method, one document obtained by single-sided printing is registered. In this first registering method, this document may have many pages. In a second registering method, an original obtained by double-sided printing is fed to a scanner by an original automatic document feeder (ADF) and images on one sides of sheets of the original are read together and are registered in a page order so that a double-sided document is registered. In a third registering method, a plurality of documents are continuously read by inserting sheets of partition paper between the documents and are respectively registered as individual documents. In this embodiment, one typical document register will be explained.

Figure 12:
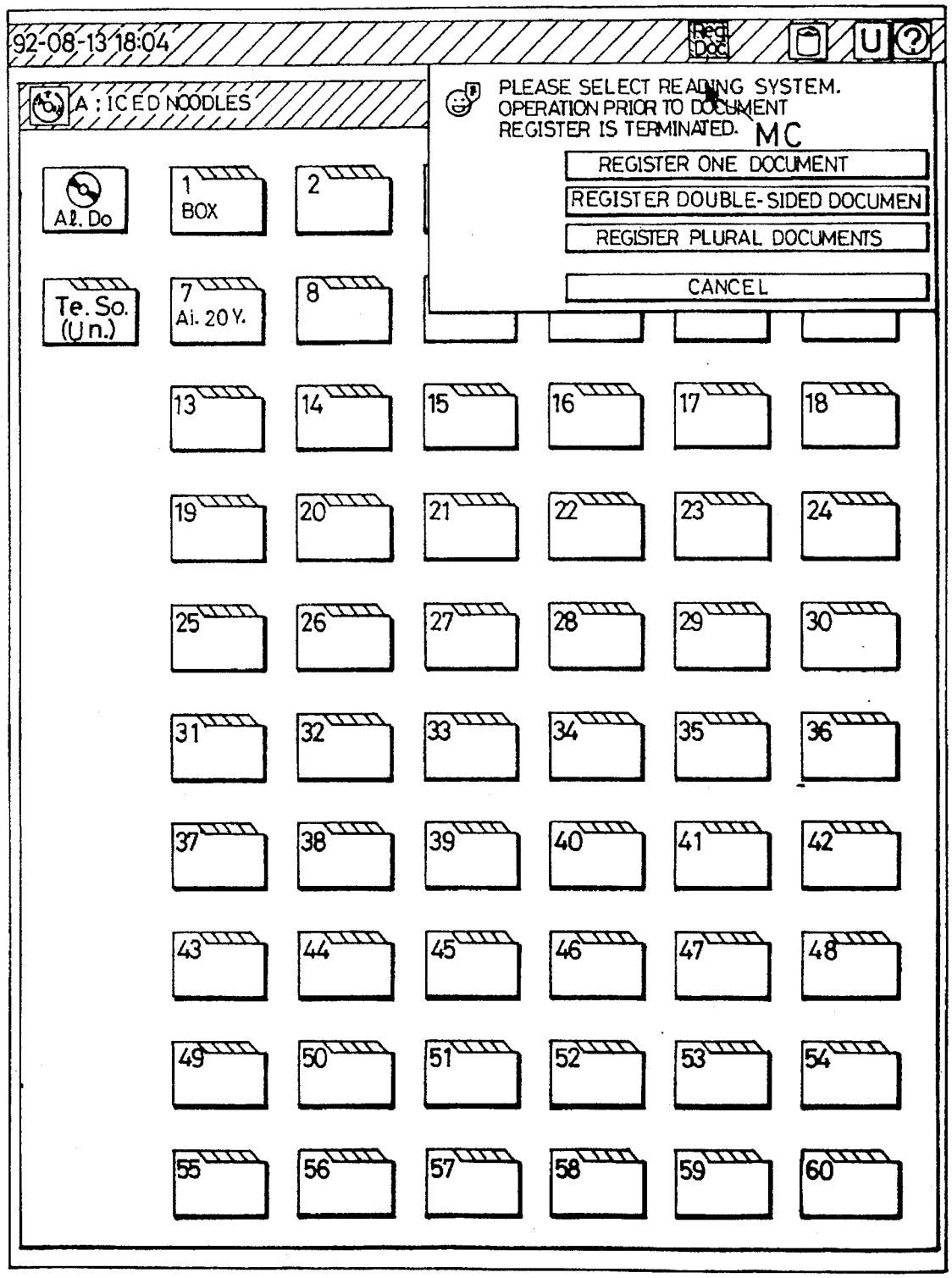
FIG. 12 is a view showing one example of a selective picture of an information reading system of the scanner in which a pop-up command window is displayed.

An icon of "register document" is selected in a default initial picture or an initial picture in which a sorting-retrieving system shown in this default initial picture is changed to another sorting-retrieving system. For example, when the icon of "register document" is selected in the initial picture of boxes shown in FIG. 7, the icon of "register document" is inverted in color and displayed as shown in FIG. 12. Then, a pop-up command window is displayed in an upper right-hand portion of the screen.

In FIG. 12, Reg. Doc. and A1. Do. are abbreviated forms of "register document" and "all documents", respectively. Te. So. (Un.) and Ai. 20. Y. are abbreviated forms of "temporary sort (unsorted)" and "aim at 2000 yens", respectively.

Therefore, the mouse cursor MC is moved to be in conformity with one of buttons for "register one document", "register double-sided document", and "register plural documents" in accordance with registered documents. Then, this one of the buttons is selected. When a button for "cancel" is selected, it is returned to the original picture shown in FIG. 7.

Figure 13:
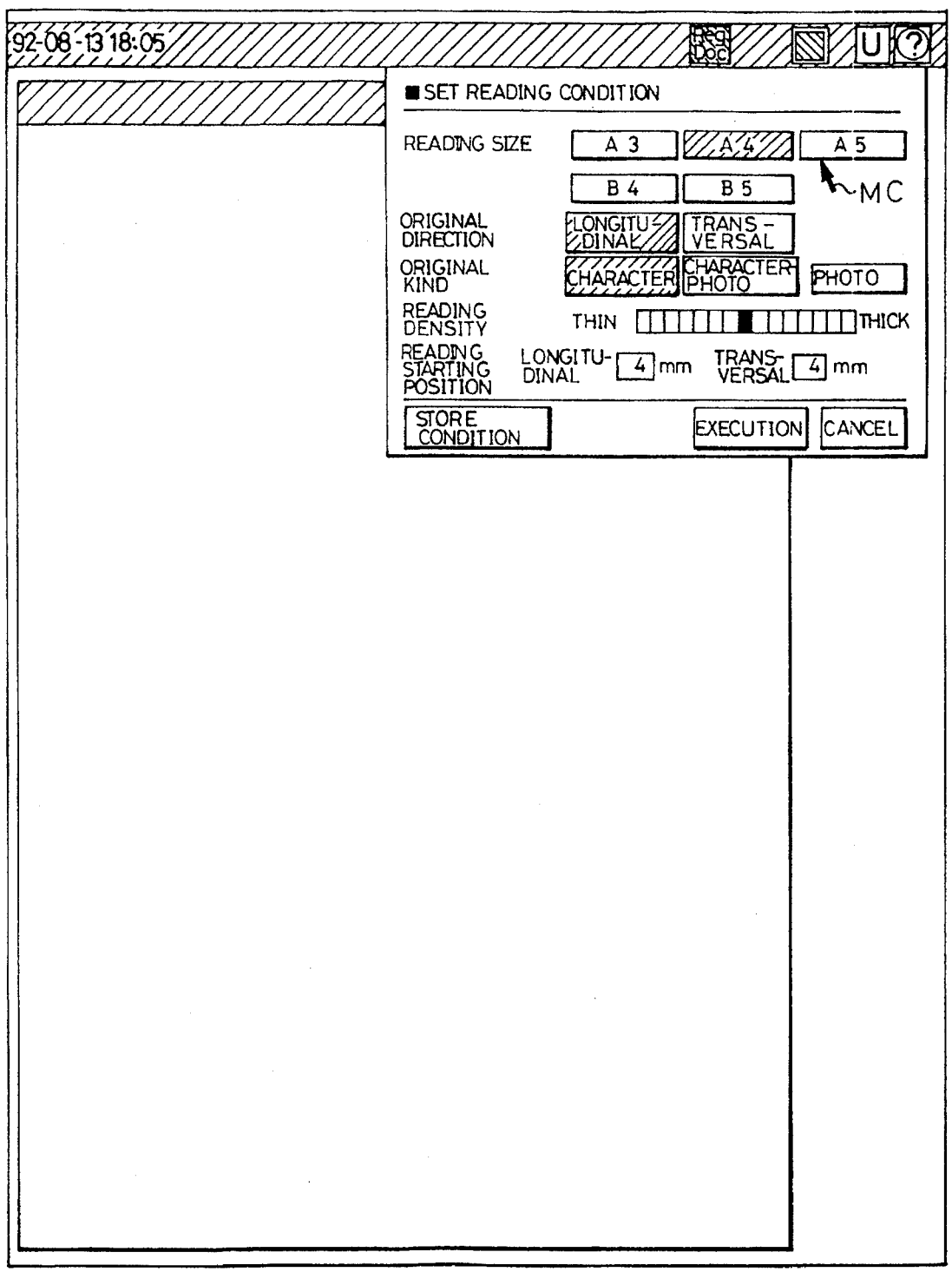
FIG. 13 is a view showing one example of a picture for setting a reading condition of an original.

In this embodiment, "register one document" is selected. Accordingly, a picture shown in FIG. 13 is displayed on the screen and a window for setting a reading condition of the original is displayed in an upper right-hand portion of this picture. A button inverted and displayed in black and white colors is set at the present time.

Then, the pair of sheet guides 34, 34 of the scanner 3 shown in FIG. 3 are positioned in conformity with a size of the document or original to be registered. As shown in FIG. 6, the original is set in a state in which a read face of the original is located on a lower face in a predetermined position in accordance with the original size. Thereafter, the reading condition is set in accordance with the original.

For example, the reading condition is constructed by a read paper size, an original feeding direction, an original kind, a reading density and a reading starting position. For example, the read paper size is set to A3 to B5 and no buttons for A3 and B4 can be selected in a system for paper size A4. The original feeding direction is set according to whether the original extends in a longitudinal or transversal direction. The original kind is set in accordance with characters, photographs, or a mixture of characters and photographs. The reading starting position is inputted in a ten-key window.

When this reading condition is set and a button for "store condition" is then selected, the set reading condition is stored into a cabinet. Thus, the same reading condition is displayed in the next registering operation so that it is not necessary to set this reading condition every registering operation.

Figure 14:
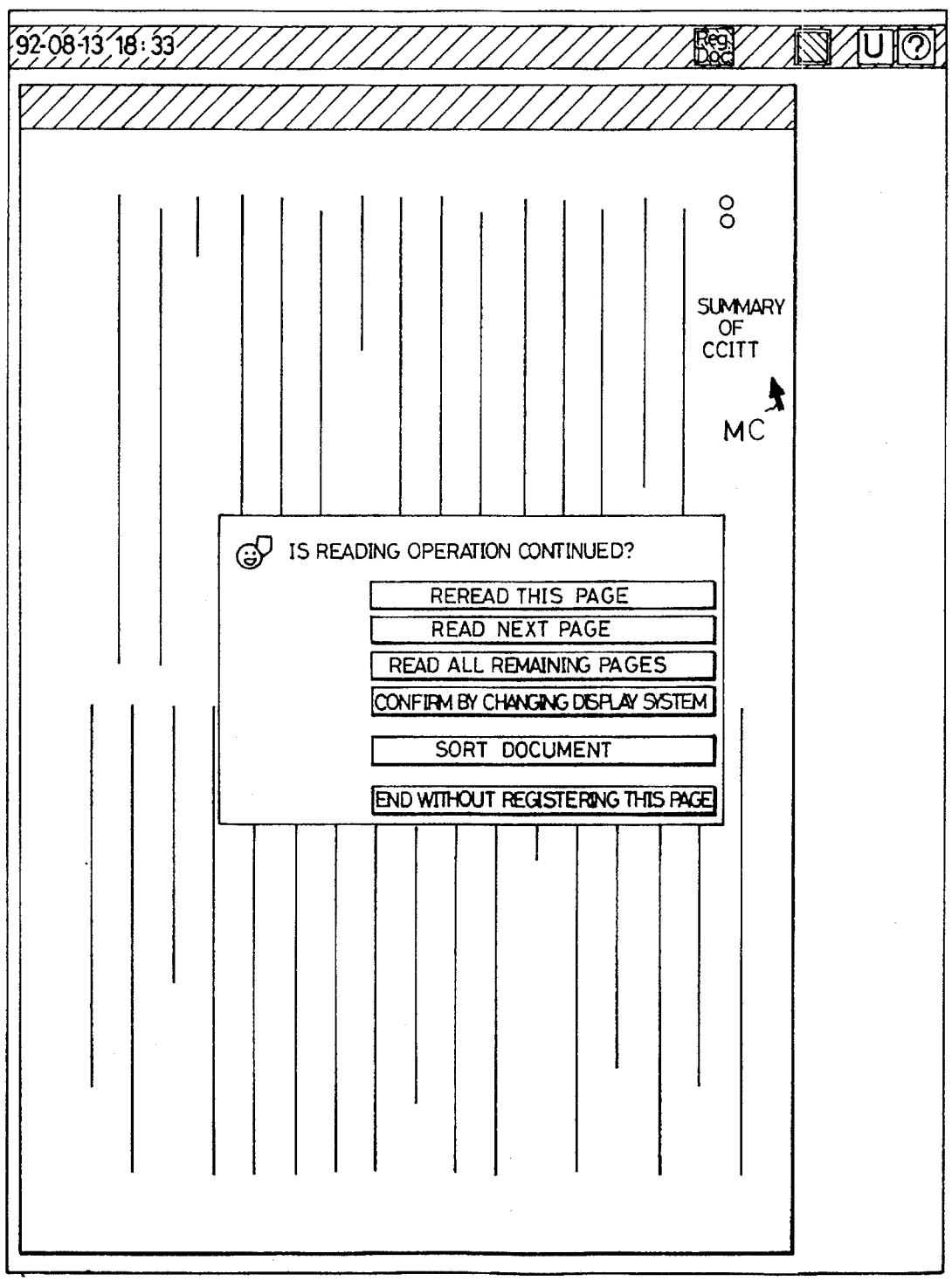
FIG. 14 is a view showing one example of a picture provided when an image on a first page of the original is read.

When a button for "execution" is then selected, the original is read by the scanner 3 from a first page. Thus, as shown in FIG. 14, image information of the original is displayed on the screen at an approximately equal magnification. Further, a pop-up command window is displayed in a central portion of the screen.

Buttons for "reread this page", "read next page", "read all remaining pages", "confirm by changing display systems", "sort document", and "end without registering this page" are respectively displayed within this pop-up command window.

If the image information of a displayed document is confirmed and acceptable and the button for "read all remaining pages" is then selected, the original set to the scanner 3 is read on all pages thereof in the reading condition set at the present time.

In contrast to this, when the button for "reread this page" is selected, the original is read again on a displayed page by changing the reading condition. When the button for "read next page" is selected, the original is read on the next page by changing the reading condition. Therefore, it is returned to the picture shown in FIG. 13. In contrast to this, when the button for "confirm by changing display systems" is selected, the read original is confirmed in an image confirming window.

Figure 15:
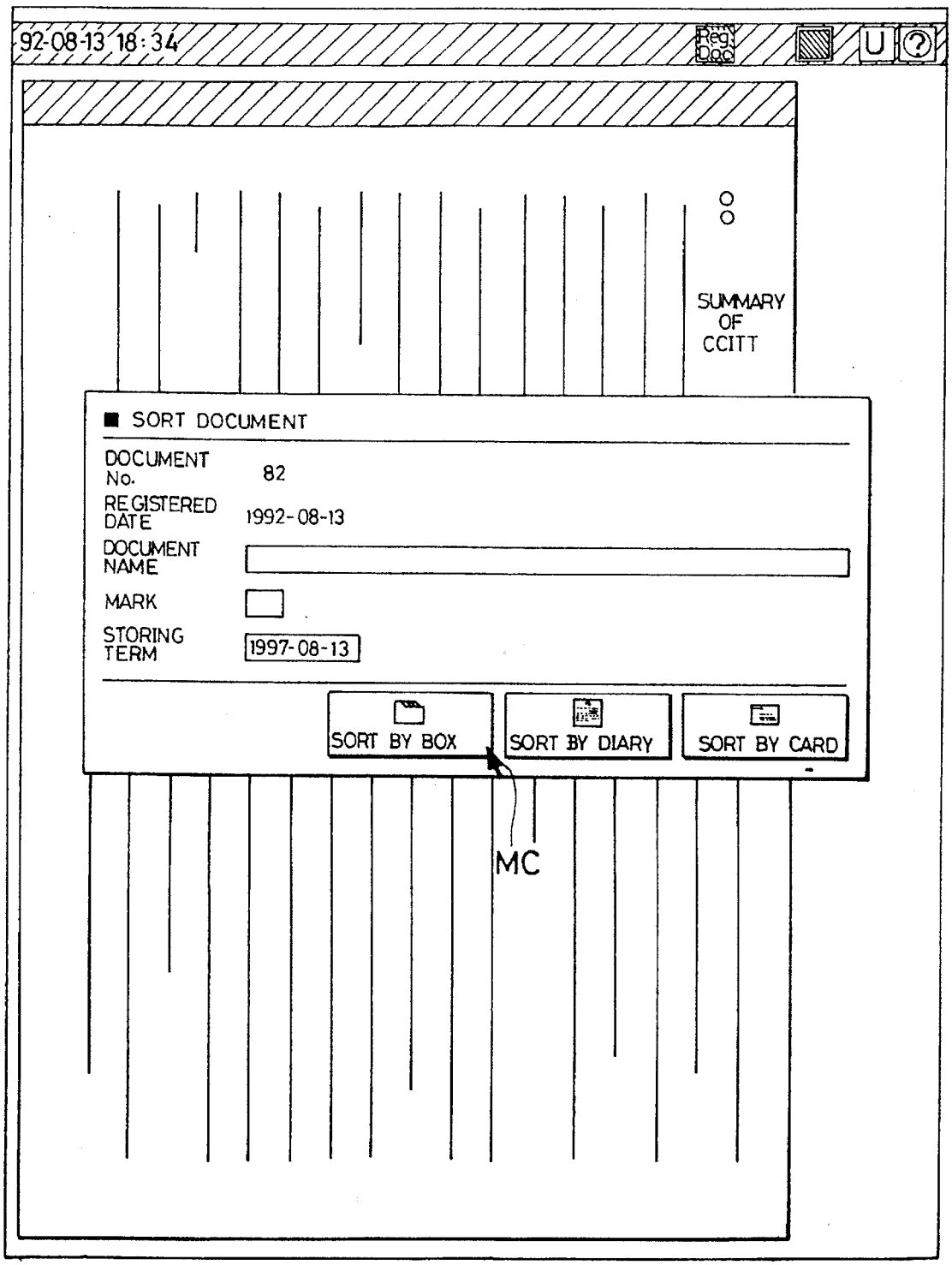
FIG. 15 is a view showing one example of a selective picture of a sorting method displayed when "sort document" is selected in FIG. 14.

In contrast to this, when the button for "sort document" is selected, the reading operation of the original is completed and the present picture is changed to a display picture for sorting documents shown in FIG. 15. When the button for "end without registering this page" is selected after the original has been read on a first page, a registering operation of the original is interrupted and the displayed picture is returned to a picture displayed when the cabinet is set. When this button for "end without registering this page" is selected after the original has been read on second or subseguent pages, the reading operation is interrupted and the displayed picture is changed to a display picture shown in FIG. 15. At this time, no image of the original on a finally read page is registered as a document.

When the original has been completely read on the remaining pages and the button for "sort document" within the window of FIG. 14 is then selected, a window for sorting documents is displayed in a central portion of the screen as shown in FIG. 15. If the original is constructed by only one sheet, this window for sorting documents is displayed in the central portion of the screen shown in FIG. 15 when the original has been completely read on a first page and the button for "sort document" within the window of FIG. 14 is then selected.

In FIG. 13, Reg. Doc., Se. Re. Co., and Org. Dir. are abbreviated forms of "register document", "set reading condition" and "original direction", respectively.

Log., Tran., and Org. Ki are "longitudinal", "transversal" and "original kind", respectively. Char., cha-pho., and Pho. are abbreviated forms of "character", "character-photo" and "Photo", respectively.

Re. Den., Thi. and Tik. are abbreviated forms of "reading density", "thin", and "Thick", respectively.

Re. St. Po., St. Con. and Exe. are abbreviated forms of "reading starting position", "store condition" and "execution".

Can. is an abbreviated form of "cancel".

In FIG. 14, Reg. Doc. is an abbreviated form of "register document".

In FIG. 15, Reg. Doc. is an abbreviated form of "register document".

Information of a document number and a registered date are automatically inputted to the electronic filing apparatus. A document name, a mark, a storing period of the document are inputted to the electronic filing apparatus if necessary, but may not be inputted to the electronic filing apparatus. The document name is inputted to the electronic filing apparatus by a soft keyboard displayed when a column of the document name is selected. The mark is inputted to the electronic filing apparatus by a mark menu window shown in FIG. 18 and displayed when a column of this mark is selected.

Twenty-five kinds of document marks commonly used for a diary mark inputted to the date column of a calendar are prepared in the mark menu window and can be selectively inputted in accordance with document kinds, use purposes, etco In the mark menu window, it is possible to delete and make marks in addition to the selection of the marks.

Figure 17:
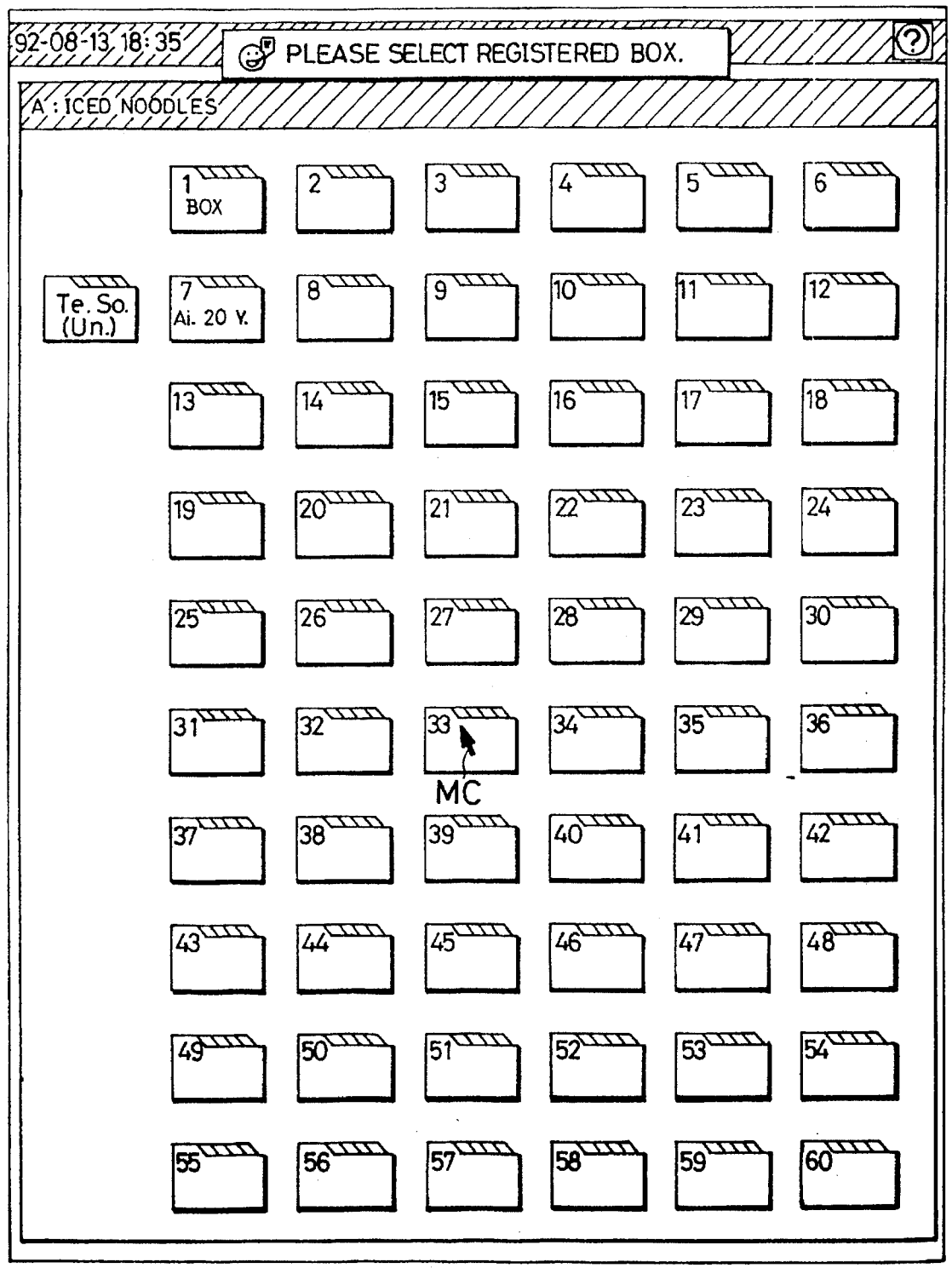
FIG. 17 is a view showing one example of a selective picture for register and sort when "sort by box" is selected in FIG. 15.
Figure 21:
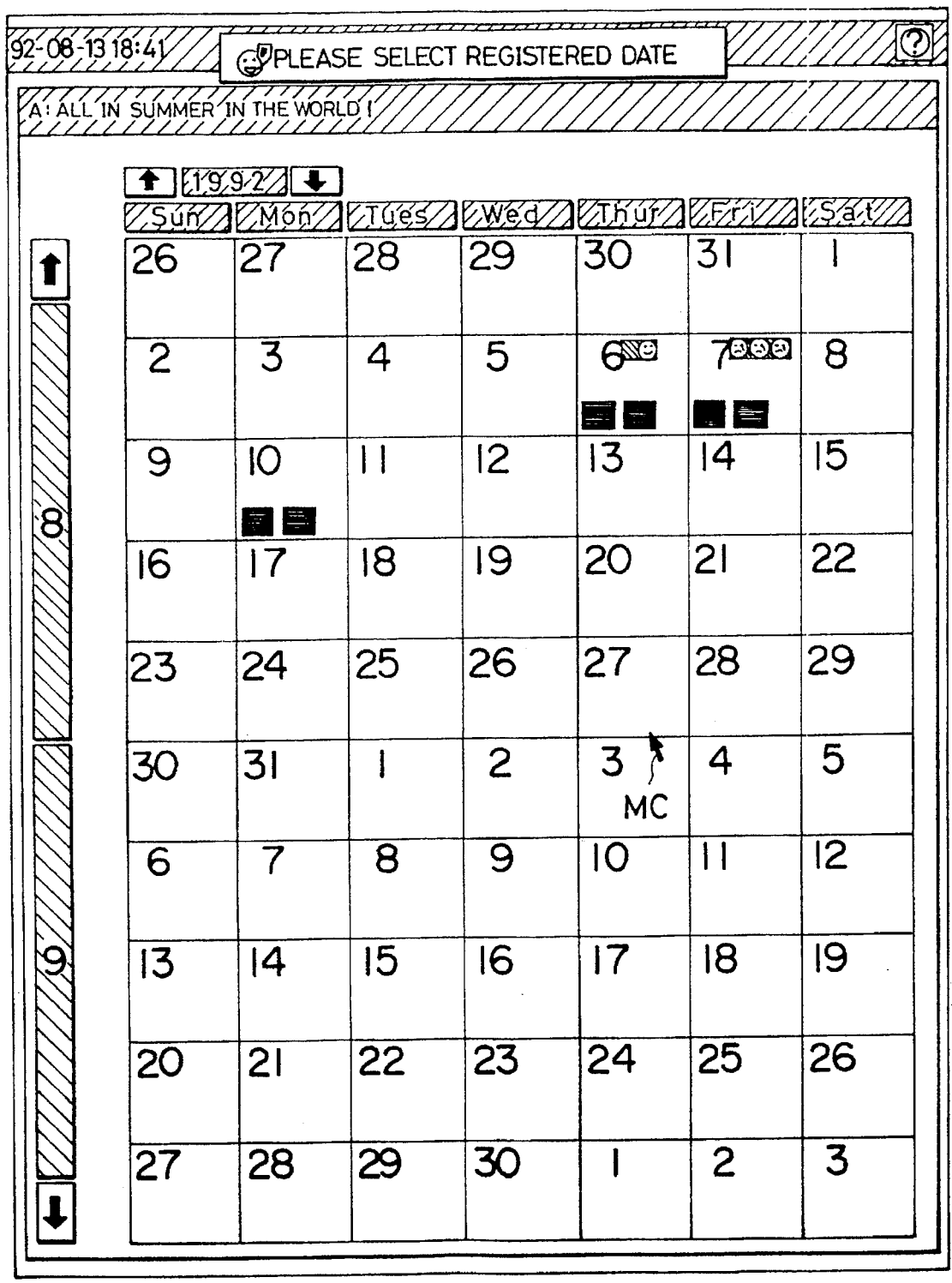
FIG. 21 is a view showing one example of a selective picture for register provided when "sort by diary" is selected in FIG. 15.
Figure 23:
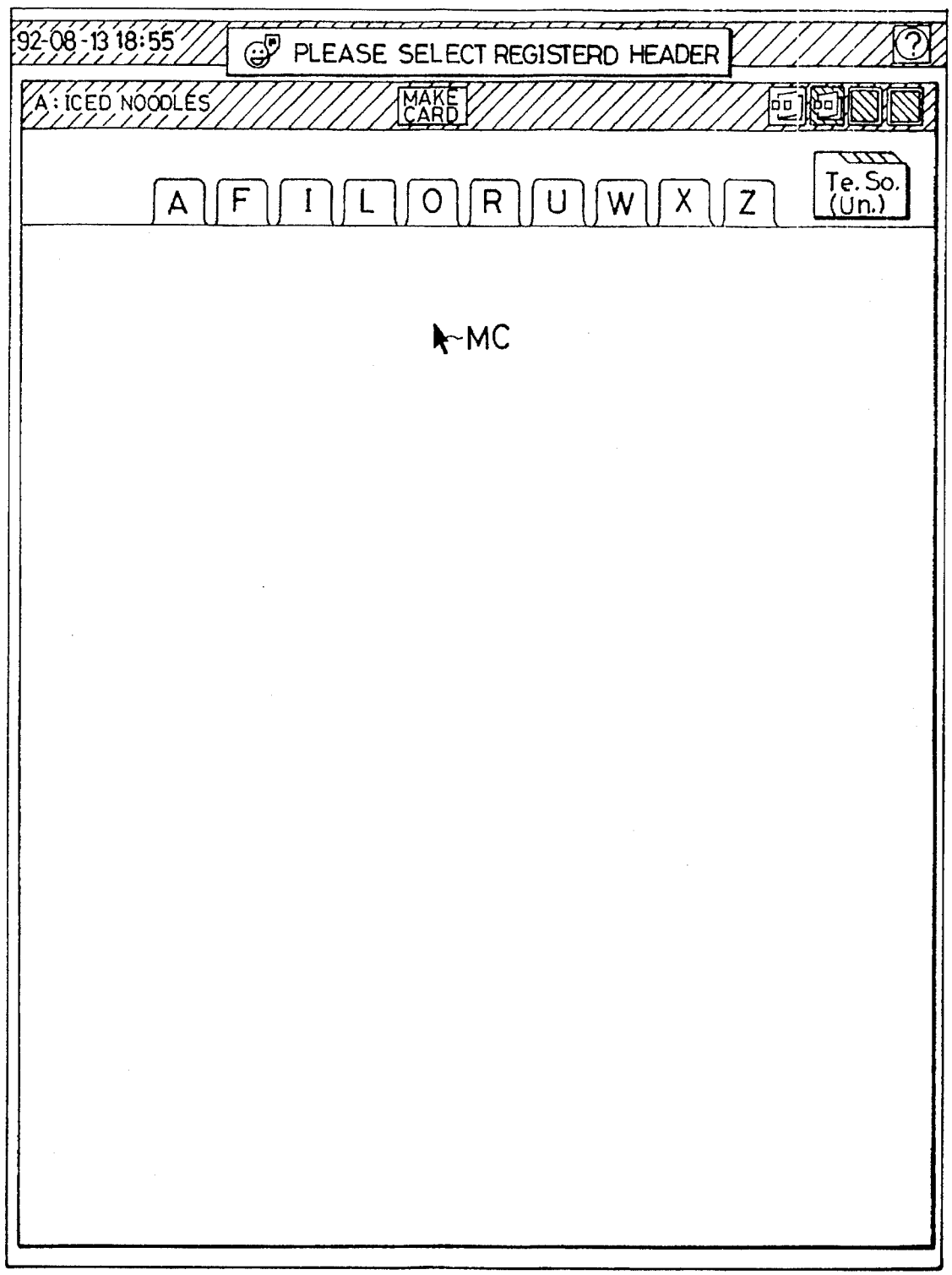
FIG. 23 is a view showing one example of a header selective picture provided when "sort by card" is selected in FIG. 15.

In FIG. 15, a box, a diary or a card is designated as a sorting system. When "sort by box" is selected, a picture shown in FIG. 17 is displayed on the screen. When "sort by diary" is selected, a picture shown in FIG. 21 is displayed on the screen. When "sort by card" is selected, a picture shown in FIG. 23 is displayed on the screen.

Figure 18:
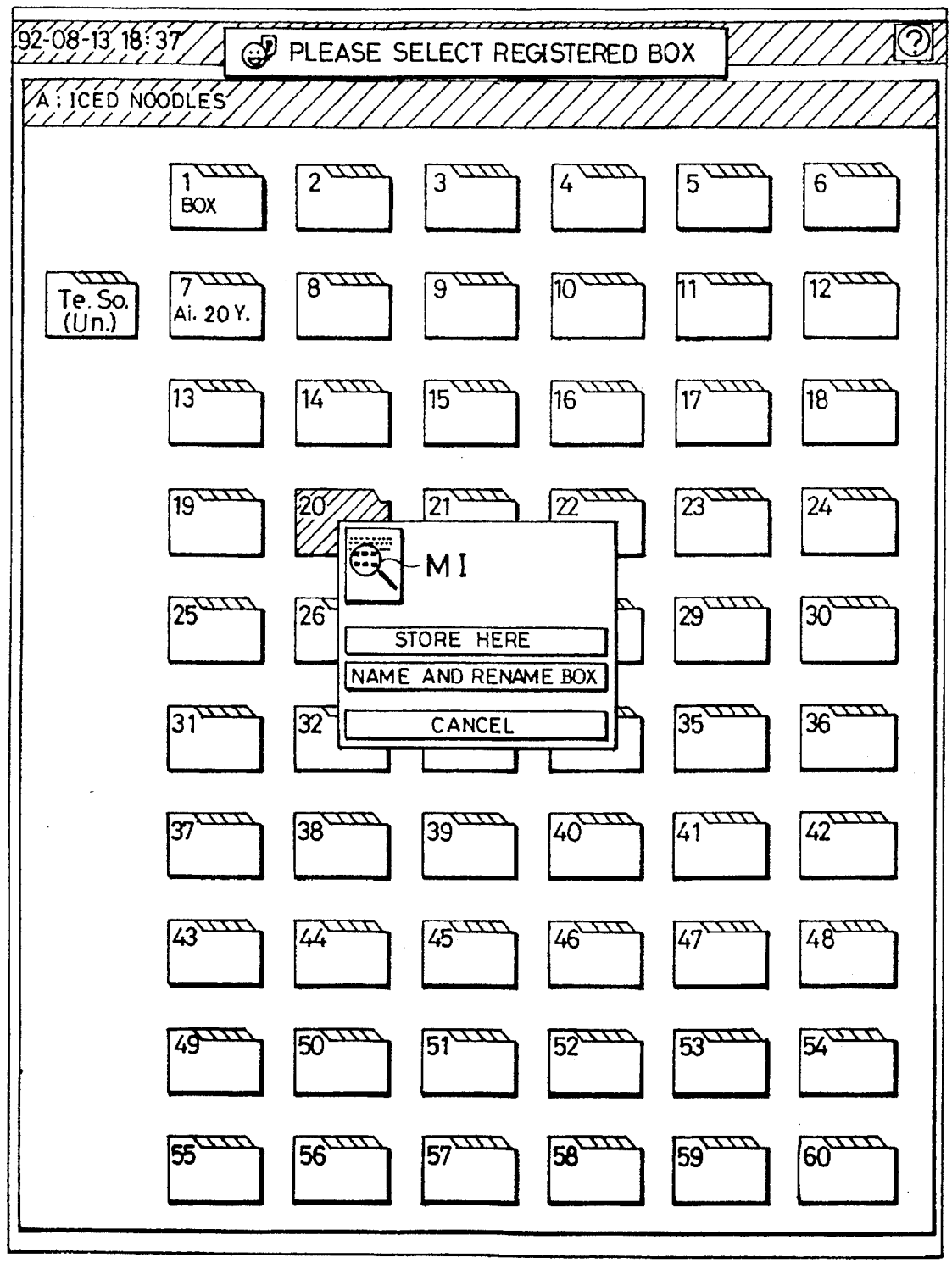
FIG. 18 is a view showing one example of a picture provided when a registered box is designated in FIG. 17.

A message window of "please select registered box" is displayed in an uppermost portion of the picture of "sort by box" in FIG. 17. Therefore, a registered box is selected by the mouse cursor MC. For example, when a twentieth box is selected, a pattern of this twentieth box is inverted in color and is displayed as shown in FIG. 18. Further, a box confirming window is displayed such that the box confirming window partially overlaps this box pattern.

In FIG. 17, Te. So. (Un.) and Ai. 20. Y. are abbreviated forms of "temporary sort (unsorted)" and "aim at 2000 yens", respectively.

In FIG. 18, Te. So. (Un.) and Ai. 20. Y. are abbreviated forms of "temporary sort (unsorted)" and "aim at 2000 yens", respectively.

Buttons for "store here", "name and rename box" and "cancel", and an icon MI of "magnifying glass" are displayed within this box confirming window.

When "store here" is selected, read document information is sorted into the selected box as the twentieth box and a registering operation of the document information is completed. It is then returned to a picture displayed when the icon of "register document" is selected. In this example, this displayed picture is the picture shown in FIG. 12.

In contrast to this, when "name and rename box" is selected, the above-mentioned soft keyboard window is displayed and a series of characters is inputted to the selected box so that the selected box can be named. For example, a seventh box displayed in FIG. 12 is named as "aim at 2000 yens".

When "cancel" is selected, it is returned to the picture shown in FIG. 17 and a registered box can be reselected.

Figure 19:
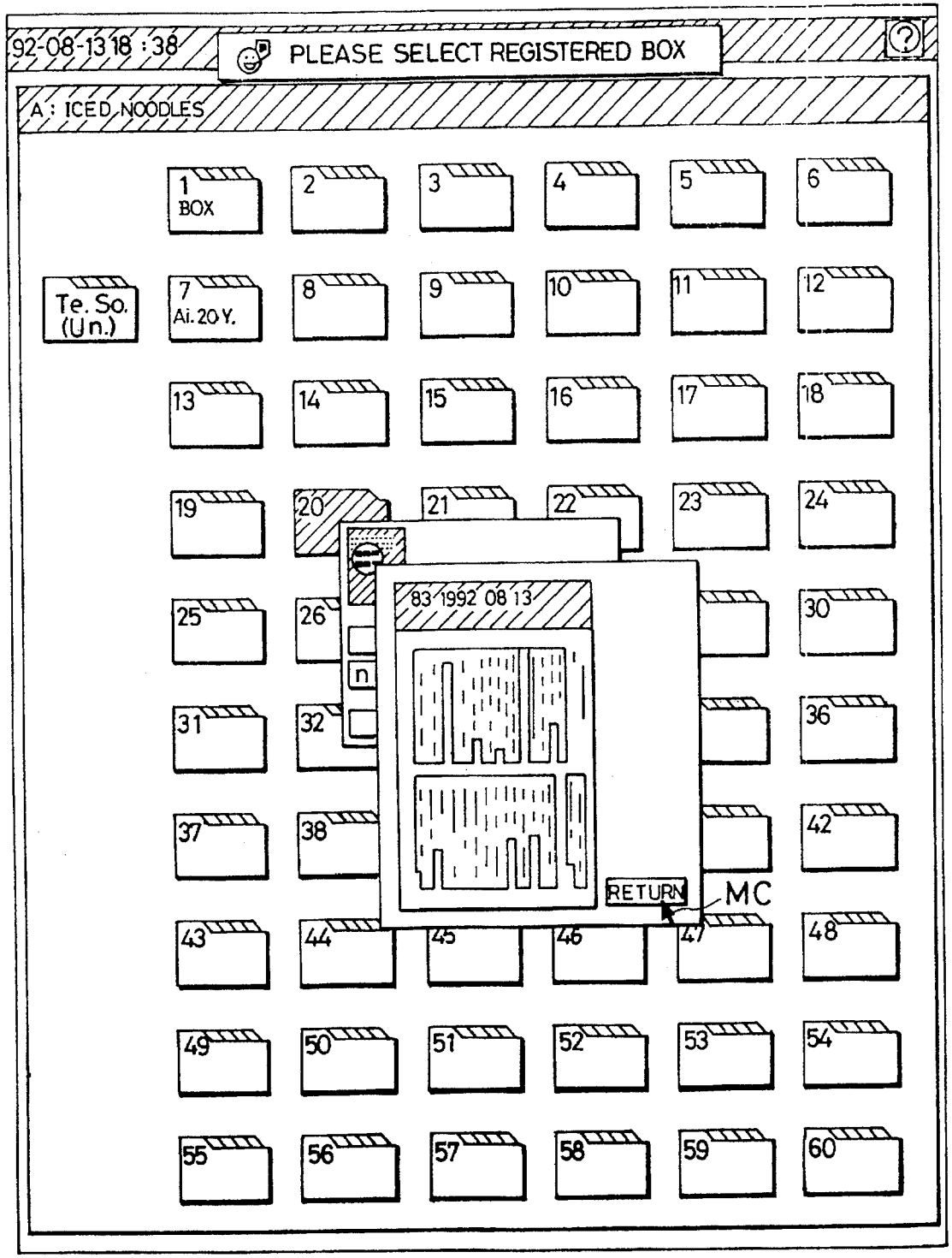
FIG. 19 is a view showing a display example of a reduced image window provided when a magnifying glass icon is designated within a box command window in FIG. 18.

When the icon MI of "magnifying glass" is selected in the box confirming window, a reduced image on a first page of the read document information is displayed as shown in FIG. 19. This reduced image is an image displayed on a document list at a retrieving time. A header formed in the shape of a black band is disposed in an upper portion of this reduced image. A document number and a registered date are inverted in color and are displayed in this header. If document name and mark are inputted to this header, the document name and mark are also inverted in color and are displayed in this header. In this example, only the document number and the registered date are displayed in this header.

In FIG. 19, Te. So. (Un.) and Ai. 20. Y. are abbreviated forms of "temporary sort (unsorted)" and "aim at 2000 yens", respectively.

When this display is confirmed and a button for "return" is then selected, it is returned to the box confirming window shown in FIG. 18. The same operation can be also performed with respect to a diary confirming window and a card confirming window described later.

Figure 20:
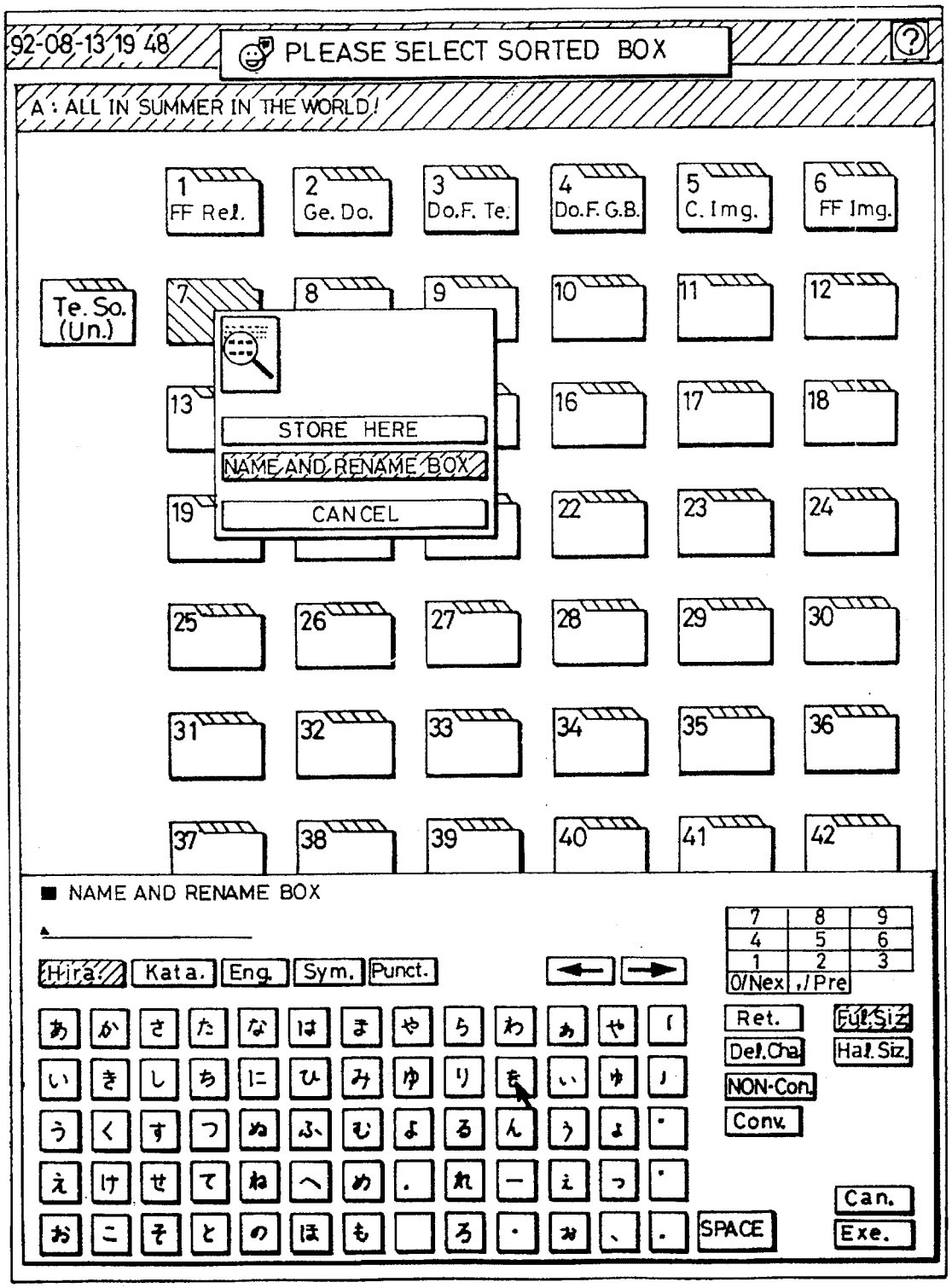
FIG. 20 is a view showing one example of a picture provided when "name and rename box" is selected in FIG. 18.

FIG. 20 shows an example of a picture provided when a box is named and renamed. The picture in this example is displayed when "name and rename box" is selected within the box confirming window after a seventh box has been selected. A soft keyboard window is displayed in a lower portion of this picture. A series of characters of a box name is inputted to an editing column by selecting character keys within this soft keyboard window. If a button for "execution" is then selected, this box name is displayed within this seventh box.

In the picture displayed in FIG. 20, first to sixth boxes are already named. When these boxes are renamed, a box renaming operation is similar to the above box naming operation.

In FIG. 20, Hira., Kata., and Eng. are abbreviated forms of "hiragana", "katakana" and "English", respectively.

Sym., Punct. and Nex. are abbreviated forms of "symbols", "punctuation" and 'next', respectively.

Pre., Ret., and Ful. Siz. are abbreviated forms of "previous", "retreat", and "full size", respectively.

Del. Cha., Hal. Siz., and Non-con. are abbreviated forms of "delete character", "half size", and "non-conversion", respectively.

Can. and Exe. are abbreviated forms of "cancel", and "execution", respectively.

Figure 22:
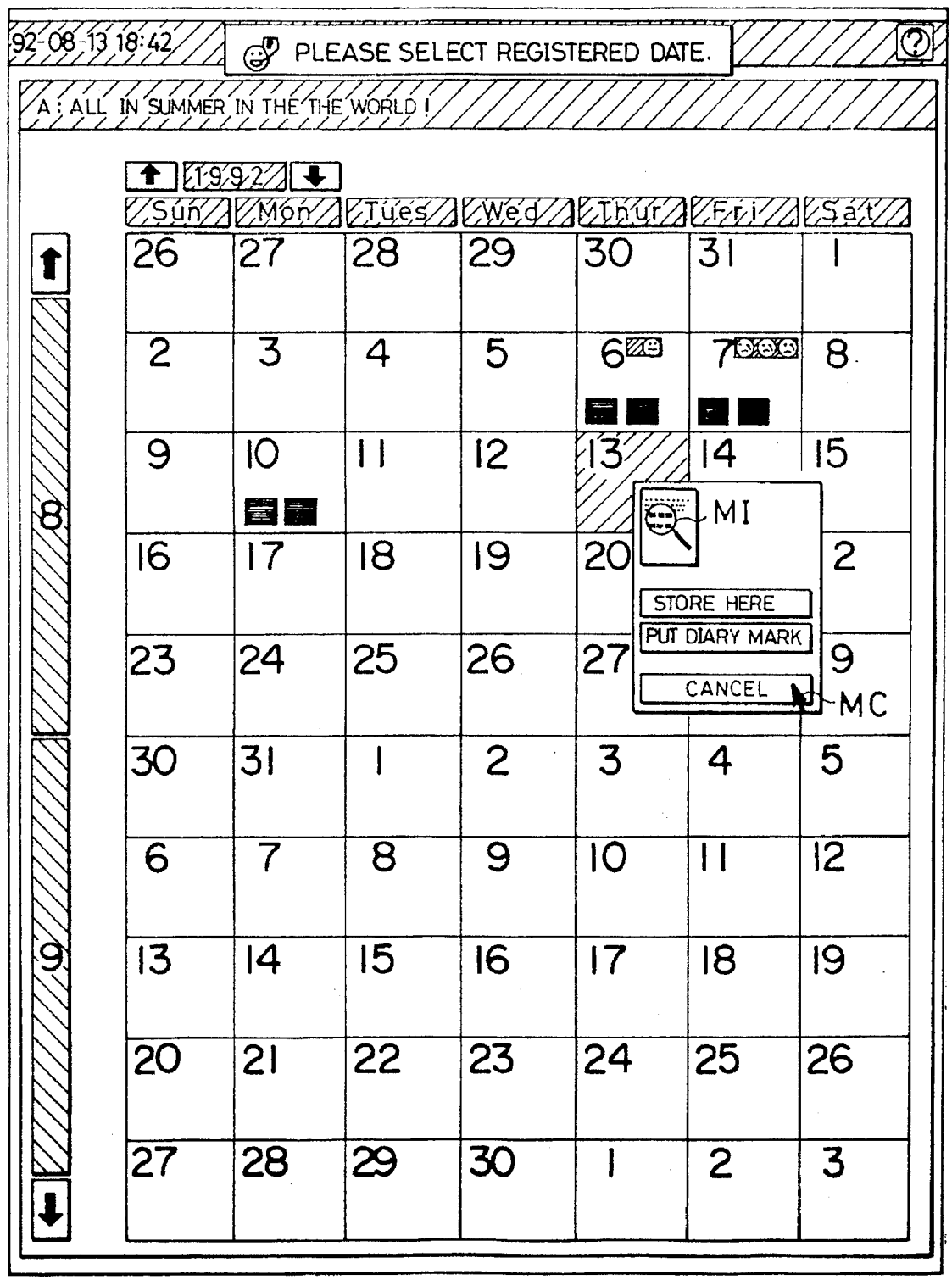
FIG. 22 is a view showing one example of a picture provided when a date to be registered is designated in FIG. 21.

When document information is sorted by a diary, "sort by diary" is selected in the picture of FIG. 15 so that a picture shown in FIG. 21 is displayed on the screen. A message window of "please select registered date" is displayed in an uppermost portion of this picture. Accordingly, an operator can select only a date column to be registered. The operator cannot select columns of "year", "month" and "day of the week" inverted in color and displayed. For example, when a registered date column of August 13 is selected, this date column is inverted in color and is displayed as shown in FIG. 22. Further, a diary confirming window is displayed such that this diary confirming window partially overlaps this date column.

Figure 16:
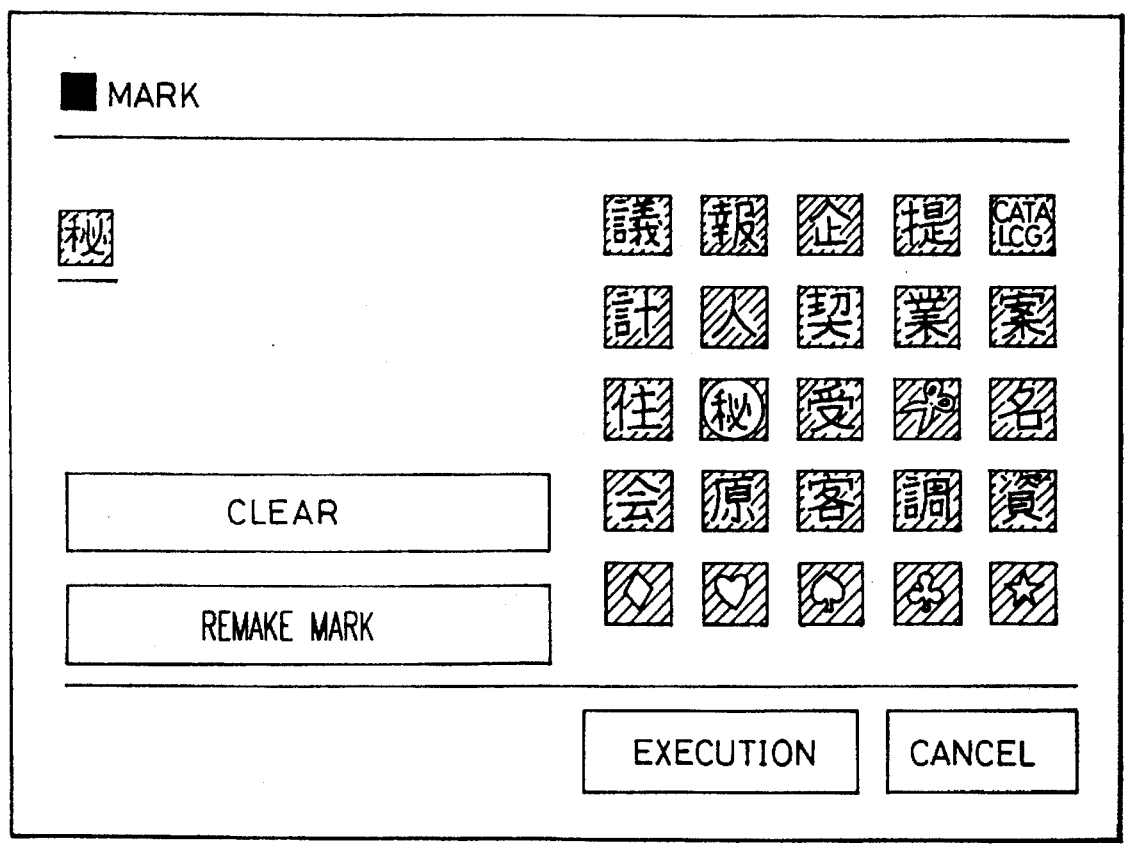
FIG. 16 is a view showing one example of a mark menu window for setting a document mark (commonly used for a diary mark) when a document is registered.

Subsequent operations and works are approximately equal to those in the above case of the box confirming window. When "put diary mark" is selected, the mark menu window shown in FIG. 16 is displayed and a desirable diary mark can be put in a selected date column. For example, the diary mark shows a conference, a guest, etc.

The diary mark is put in each of some date columns such as August 6 and August 7 in FIGS. 21 and 22. A bar pattern showing the number of sorted and registered documents is displayed in a date column in which document information is sorted and registered. The bar pattern will be described later.

Figure 24:
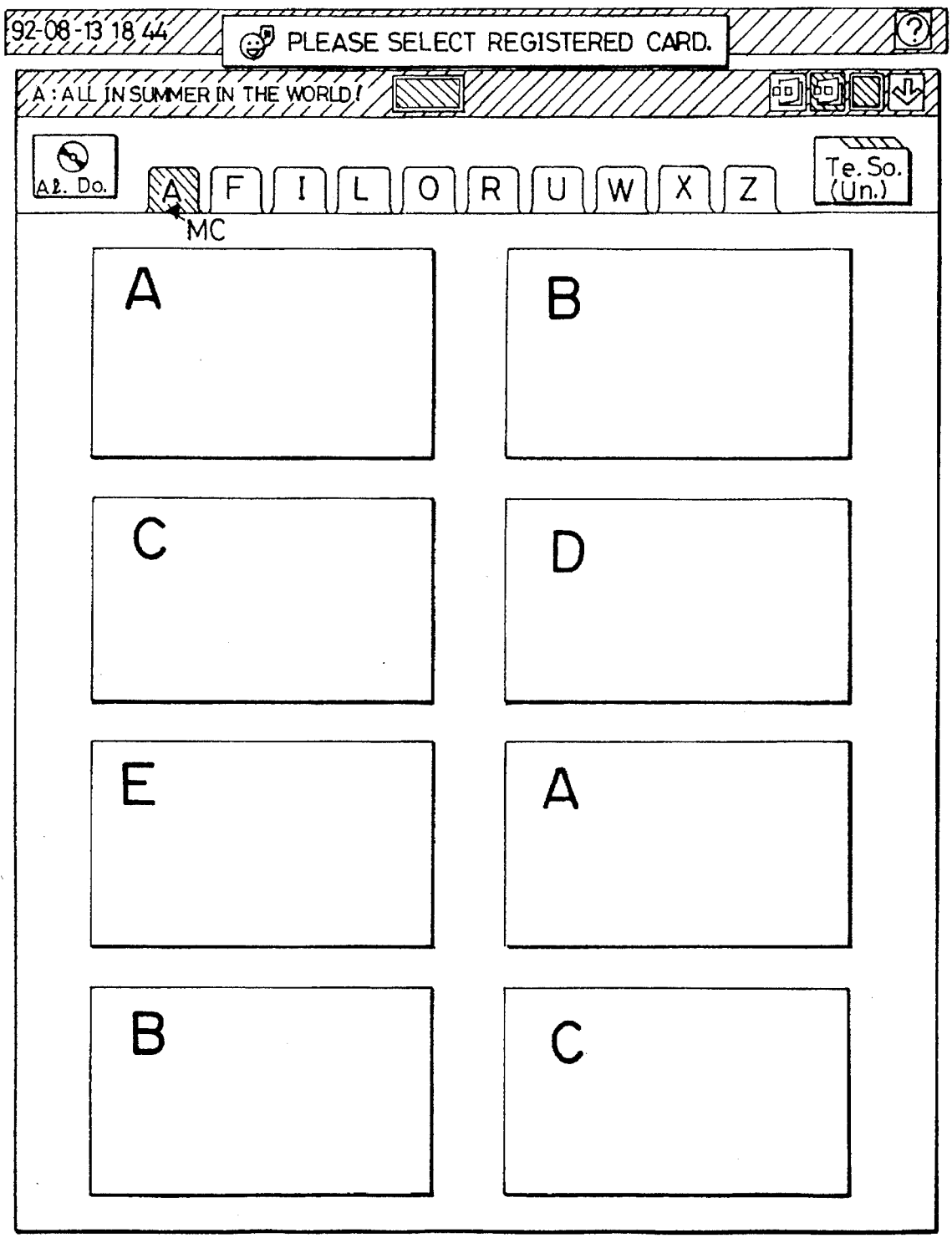
FIG. 24 is a view showing one example of a picture provided when a header is selectively designated in FIG. 23.

When document information is sorted by a card, "sort by card" is selected in FIG. 15 so that a picture shown in FIG. 23 is displayed on the screen. A header of a card for sort is first selected. For example, when a header "A" is selected, eight cards including the header "A" are sequentially turned up manually or automatically as shown in FIG. 24 so that displays of these eight cards are switched. A card turning-up function is similar to that in another case described later. Accordingly, an explanation about this function is omitted in the following description.

Figure 25:
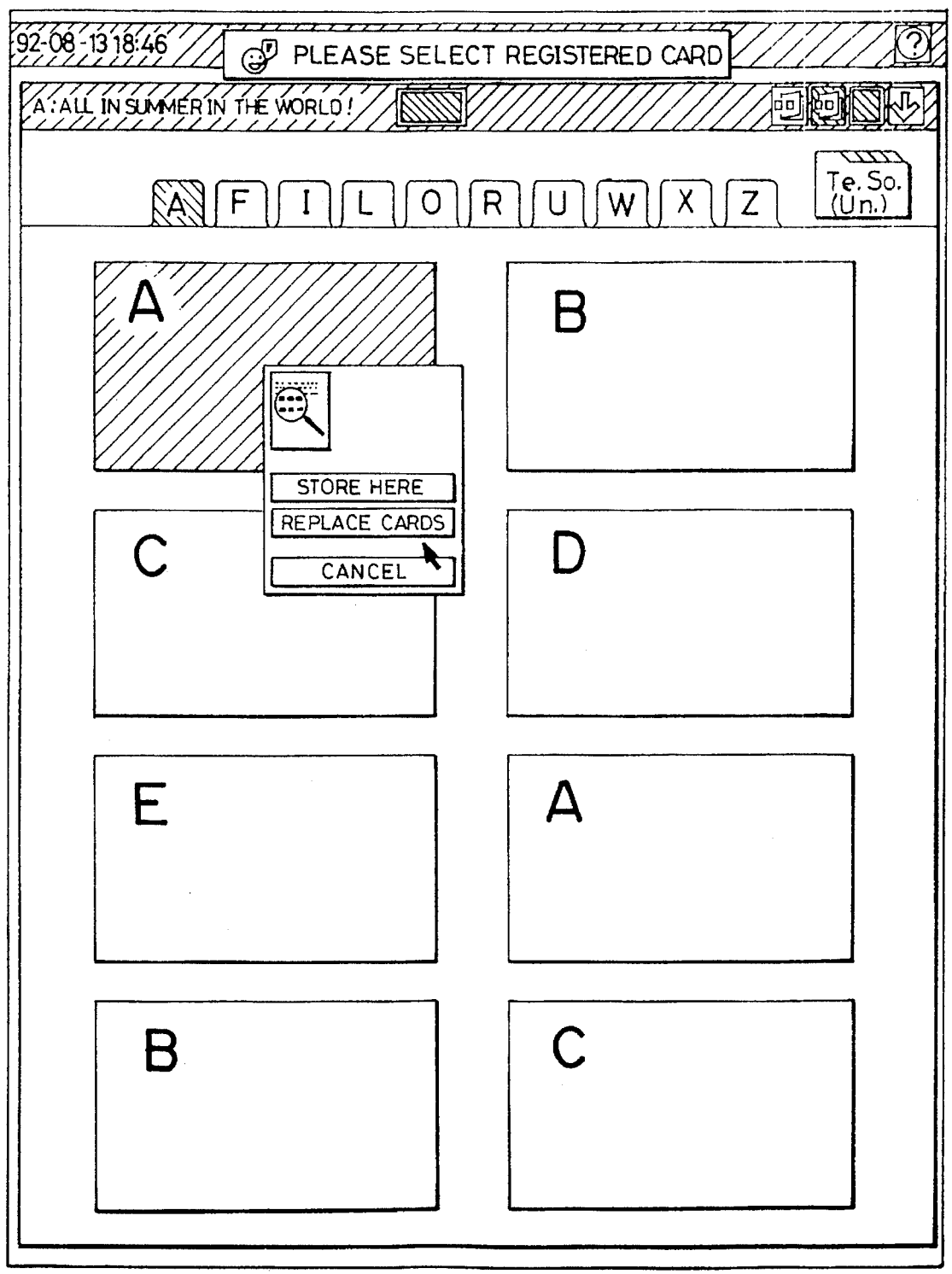
FIG. 25 is a view showing one example of a picture provided when a card to be registered is selected in FIG. 24.

When a desirable card is displayed, the card turning-up operation is stopped and this card is selected. For example, when an uppermost left-hand card having the header "A" is selected in the picture of FIG. 24, a display of this card is inverted in color as shown in FIG. 25. Then, a card confirming window is displayed such that this card confirming window partially overlaps this card. Subsequent operations and words are approximately similar to those in the above case of the box confirming window. In this case, when "replace cards" is selected, it is possible to replace this card with another card. This replacing operation is similar to that in a card making case described next.

In FIG. 23, Te. So. (Un.) is an abbreviated form of "temporary sort (unsorted)".

In FIG. 24, Te. So. (Un.) is an abbreviated form of "temporary sort (unsorted)".

In FIG. 25, Te. So. (Un.) is an abbreviated form of "temporary sort (unsorted)".

When a card is made, an icon of "make card" is selected in the picture shown in FIG. 23. This icon can be selected even when a card initial picture is displayed at a document retrieving time described later and documents are arranged. When this icon is selected, a window for setting a reading condition of the card is displayed as shown in FIG. 26.

Figure 26:
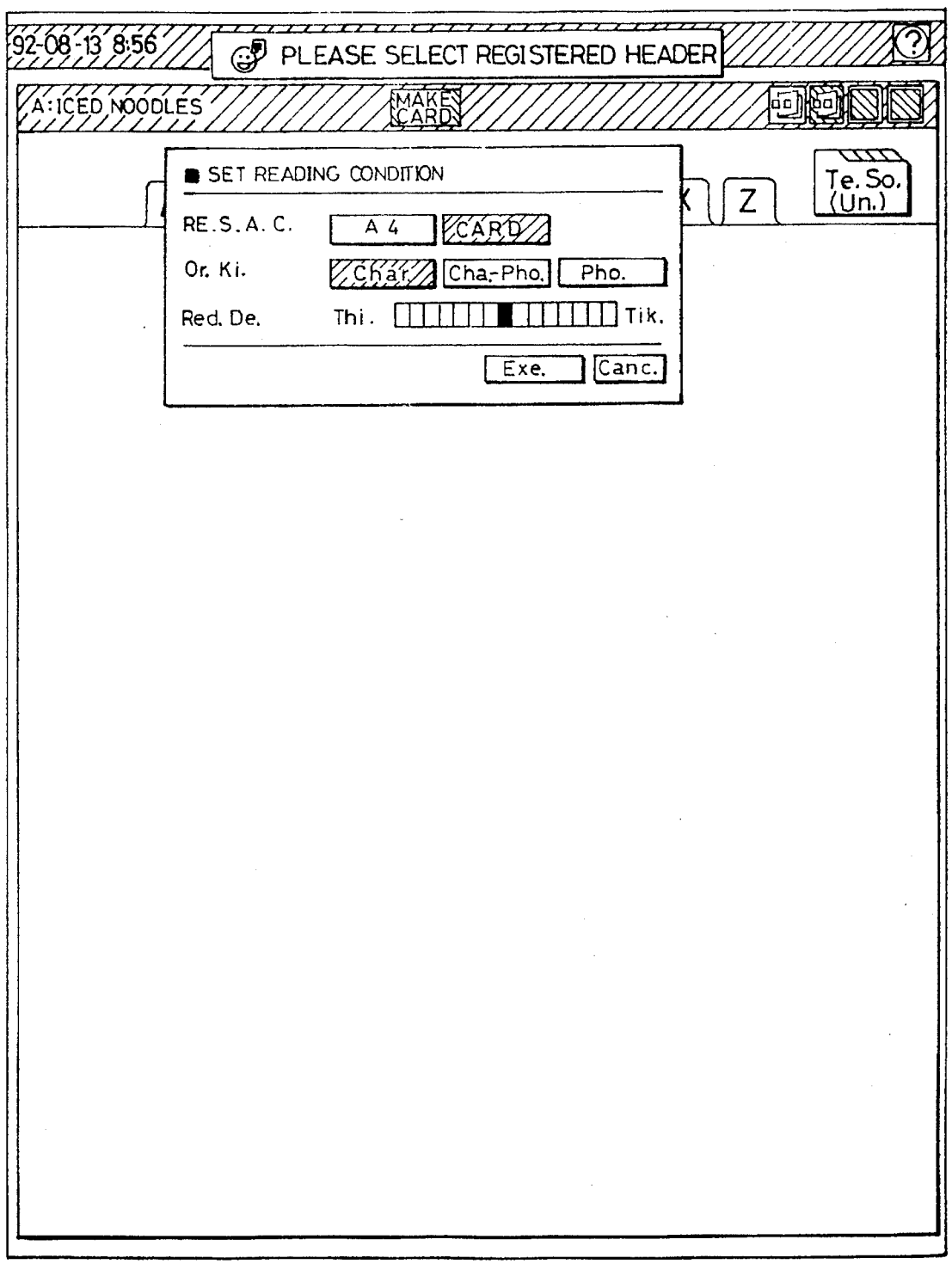
FIG. 26 is a view showing one example of a picture for setting a card reading condition provided when a card is newly set or replaced.

The abbreviated forms shown in FIG. 26 are respectively defined as follows.

Re. S. A. C. - - - reading size A4 card

Or. Ki. - - - original kind

Char. - - - character

Cha. -Pho. - - - character-photo

Red. De. - - - reading density

Thi. - - - thin

Tik. - - - thick

Exe. - - - execution

Canc. - - - cancel

Te. So. (Un.) - - - temporary sort (unsorted)

Art original for making the card is then set to the scanner. This original has a size A4 or a name card size. Similar to the operation for setting the document reading condition in the window shown in FIG. 13, an original reading size, an original kind and a reading density are set and a button for "execution" is then selected.

Figure 27:
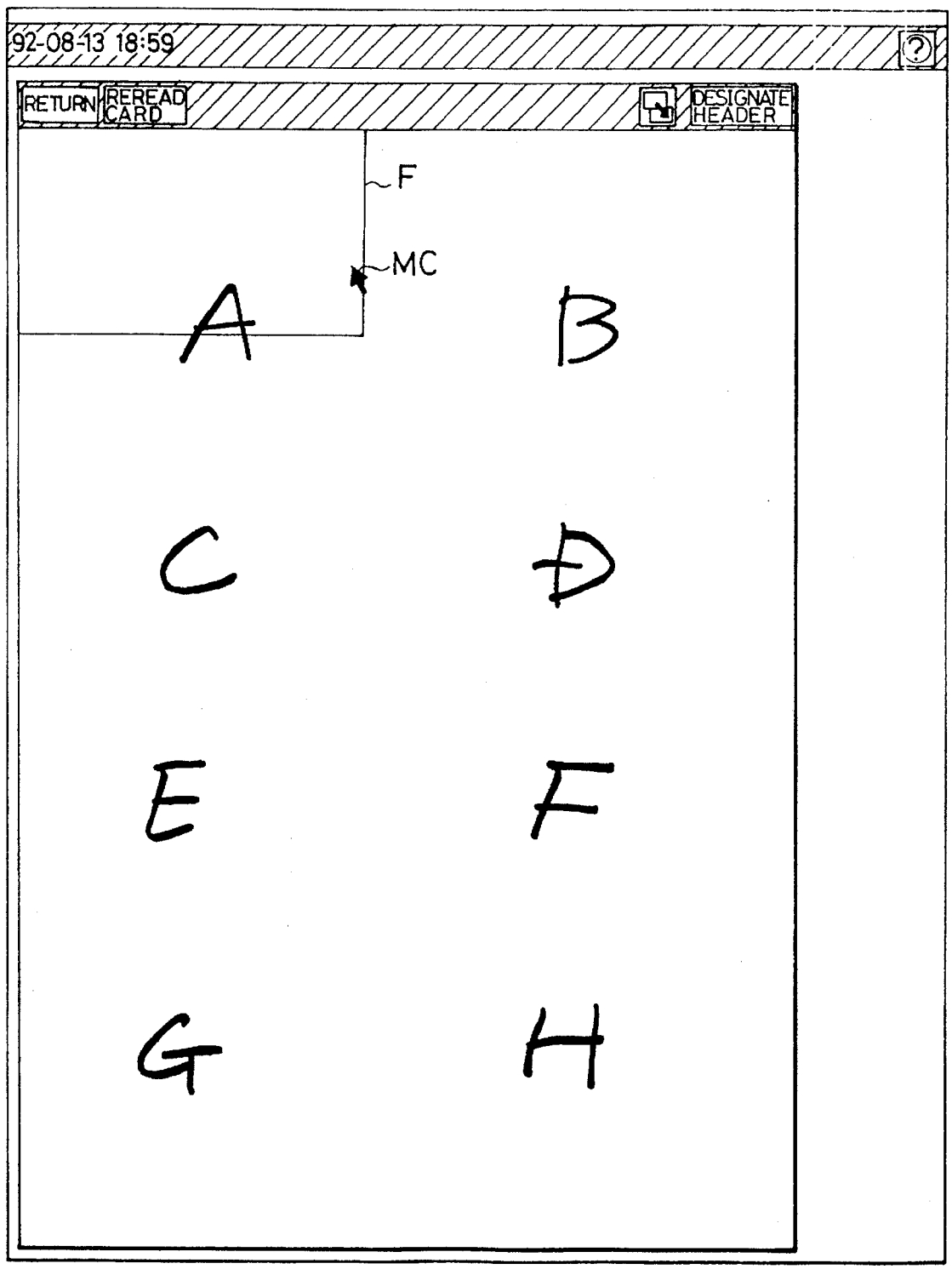
FIG. 27 is a view showing one example of a picture provided after "execution" is selected in FIG. 26 and image information of an original for the card is read by the scanner.

Thus, the original is read, and an image of the read original and a frame F showing a cutting-out position of this image are displayed as shown in FIG. 27. Icons of "return" and "reread card" are displayed in an upper left-hand end portion of the picture of FIG. 27. Icons of "move frame" and "designate header" are displayed in an upper right-hand end portion of this picture.

Figure 28:
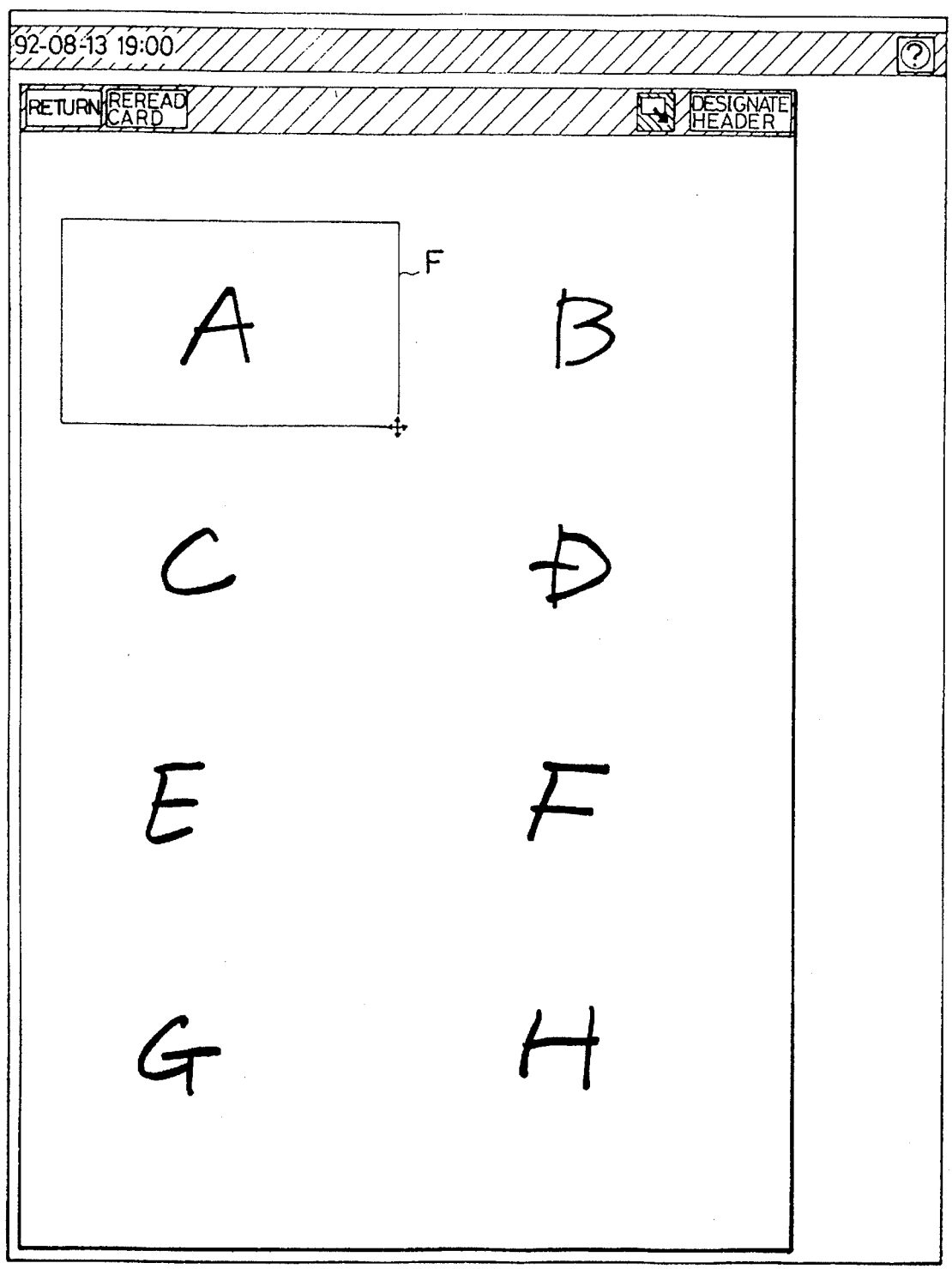
FIG. 28 is a view showing an example of a picture provided when a picture frame is moved and conformed to a cutting-out portion in which the frame is cut out as a card within the picture of FIG. 27.

When the icon of "move frame" is selected and the mouse is moved, the frame F displayed in FIG. 27 is moved to a position surrounding a desirable image used for a card as shown in FIG. 28. If the mouse is then clicked on the left-hand side, the frame F is fixed.

When no original is clearly read, the icon of "reread card" is selected in the picture of FIG. 27 so that it is returned to the picture of FIG. 26. The reading condition is then changed to another reading condition and the original is read once again in this changed reading condition.

Figure 29:
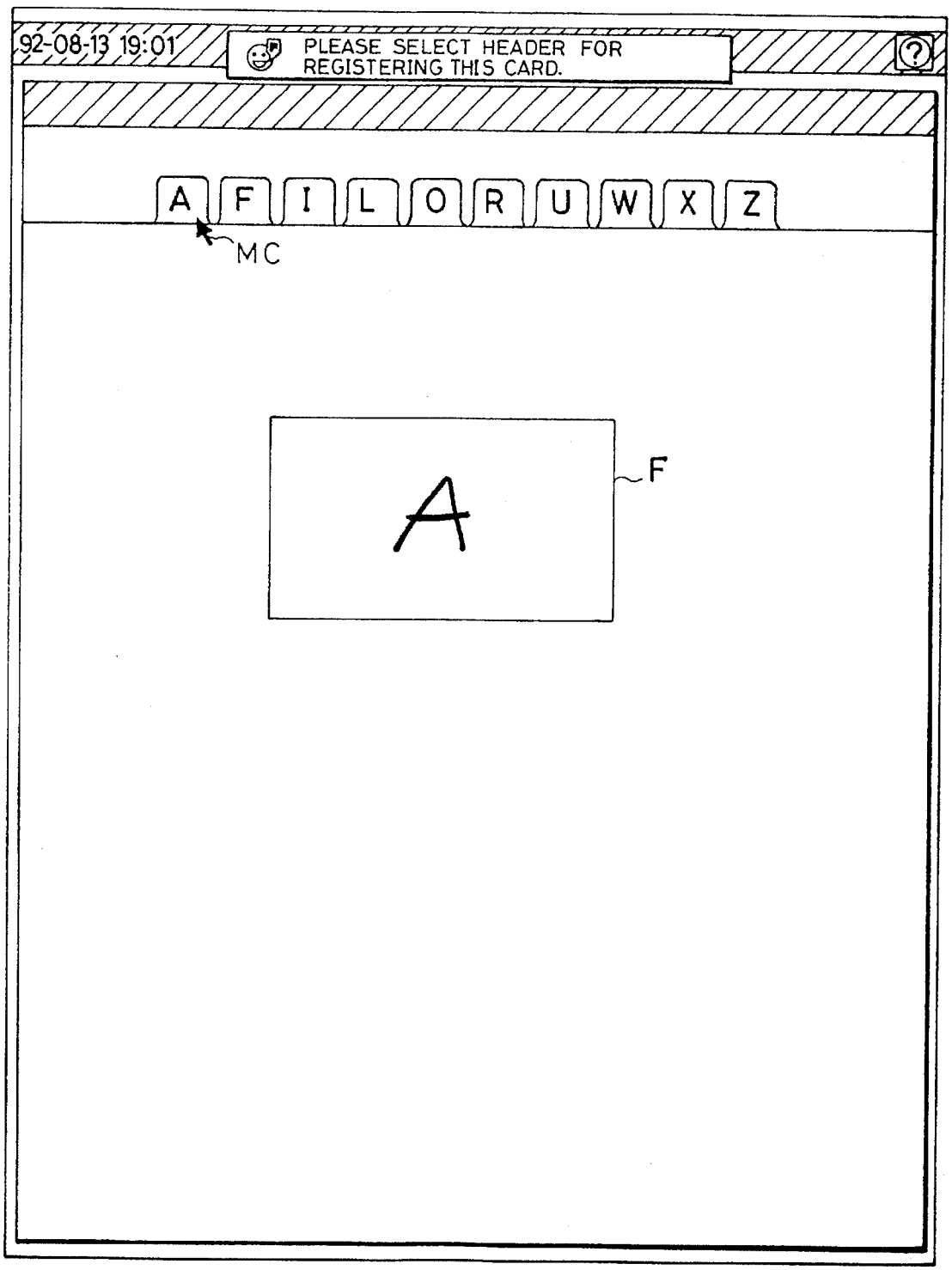
FIG. 29 is a view showing one example of picture for selecting a header when the cutting-out portion of the picture frame as a card is registered.

When the icon of "designate header" is selected after the frame F has been fixed in the picture of FIG. 28, only an image within the frame F is cut out and displayed as shown in FIG. 29 so that no image outside this frame is removed therefrom. Then, a message window of "please select header for registering this card" is displayed on the screen.

Figure 30:
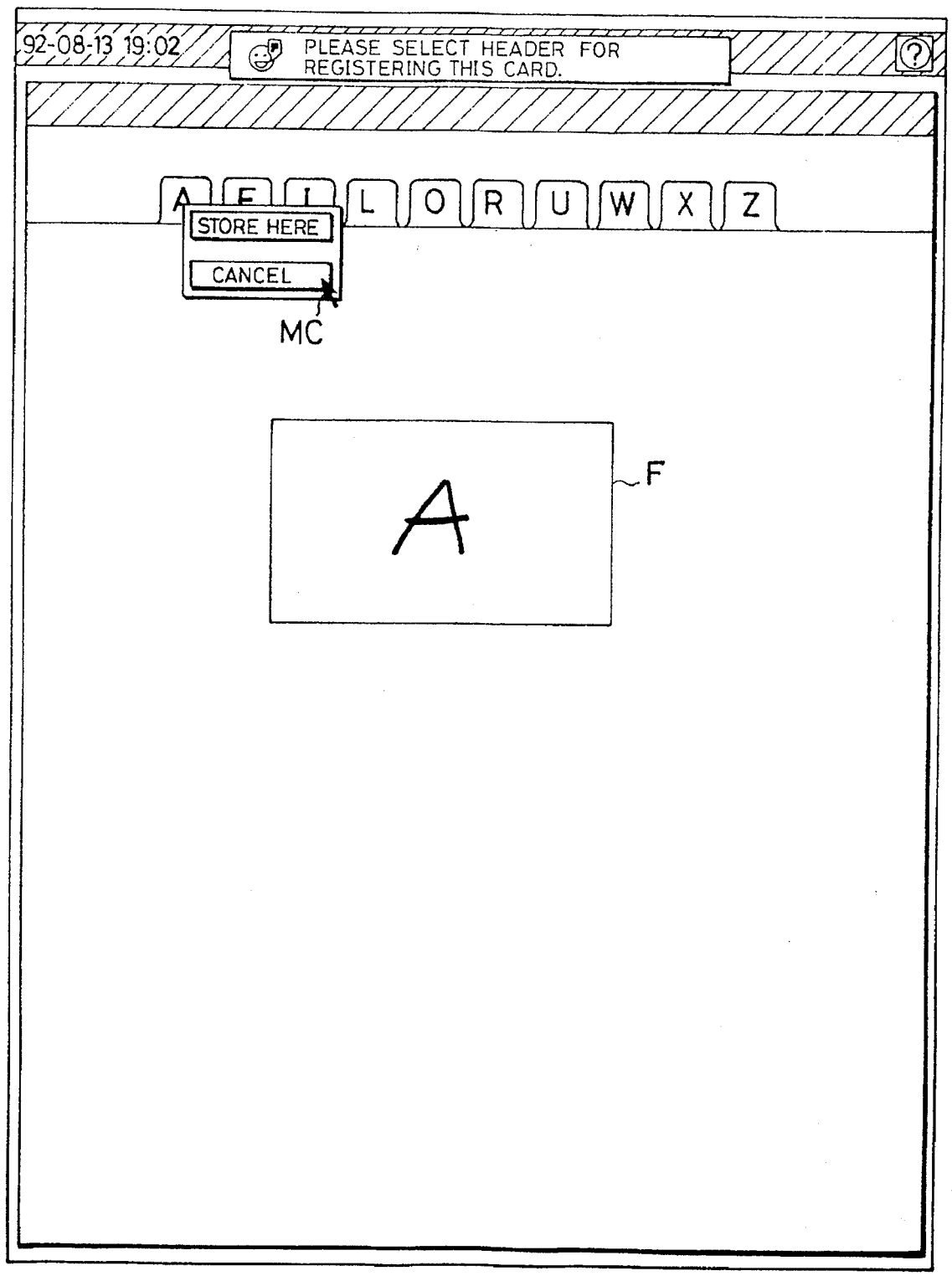
FIG. 30 is a view showing a picture for waiting for register commands after "A" is selected as the header in FIG. 29.

Accordingly, an operator selects a header for registering this card. For example, when a header "A" is selected, this header "A" is inverted in color and is displayed as shown in FIG. 30. Further, a pop-up command window is displayed such that this pop-up command window partially overlaps this header. If a button for "store here" is then selected, the cut card is stored to the selected header. If a name card is used as the original, an original image can be almost registered as a card as it is.

Since it is then returned to the picture of FIG. 28, another portion of the read image can be cut out by moving the frame F and can be registered again as a card. When the icon of "return" is selected, the card is completely registered and it is returned to the picture shown in FIG. 23.

The image of a selected card can be replaced with another image by selecting "replace cards" within the card confirming window in the picture of FIG. 25 and performing operations Similar to the above-mentioned operations.

<Retrieval of Documents>

As explained in FIG. 2, a document retrieving system can be arbitrarily selected from box retrieval, diary retrieval, card retrieval and keyword retrieval. No keyword retrieval constitutes a retrieving system peculiar to the present invention. Accordingly, an explanation about this keyword retrieval is omitted in the following description.

Figure 31:
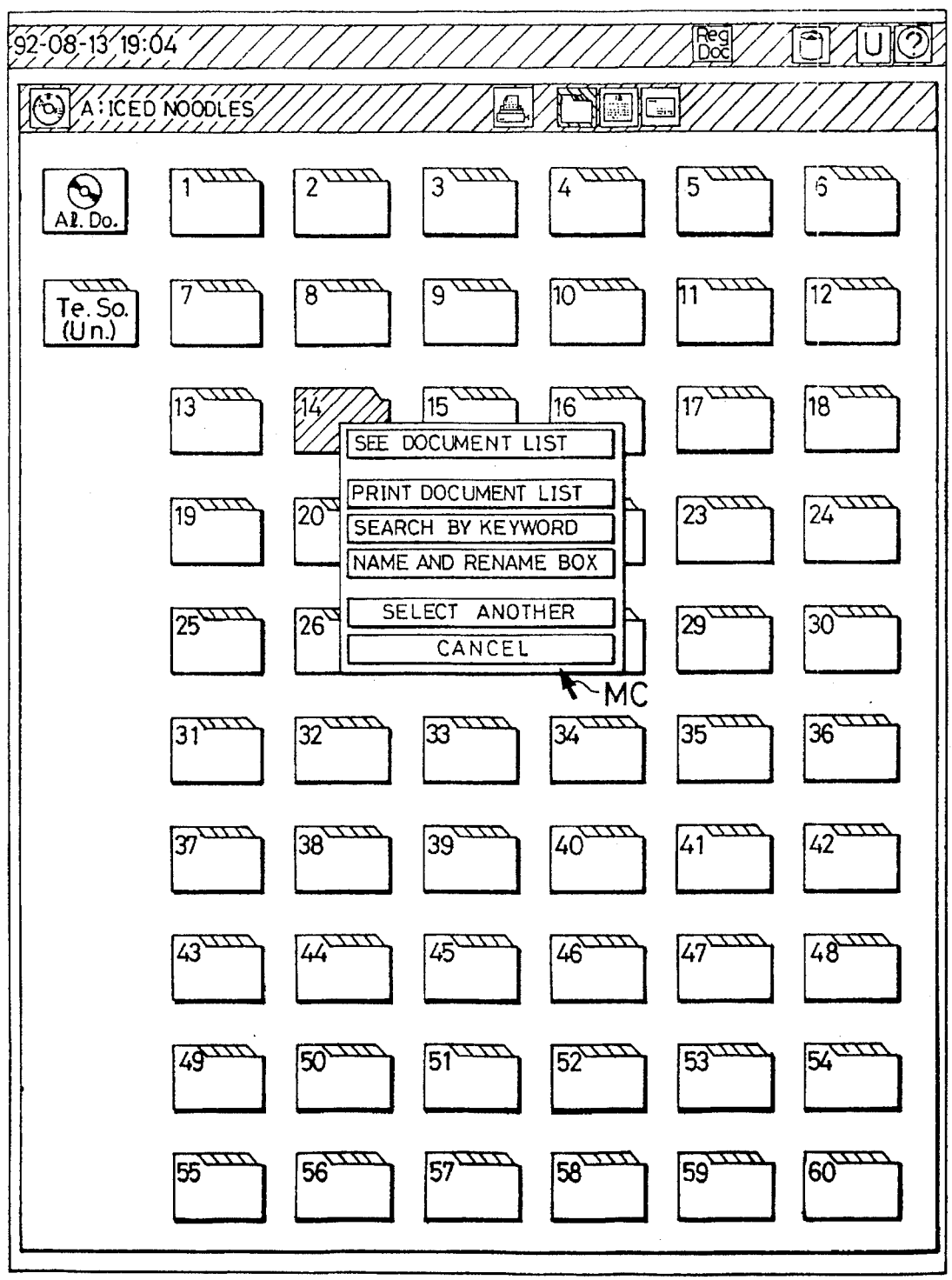
FIG. 31 is a view showing one example of a picture provided when a box to be retrieved is designated from the box initial picture shown in FIG. 7.
Figure 81:
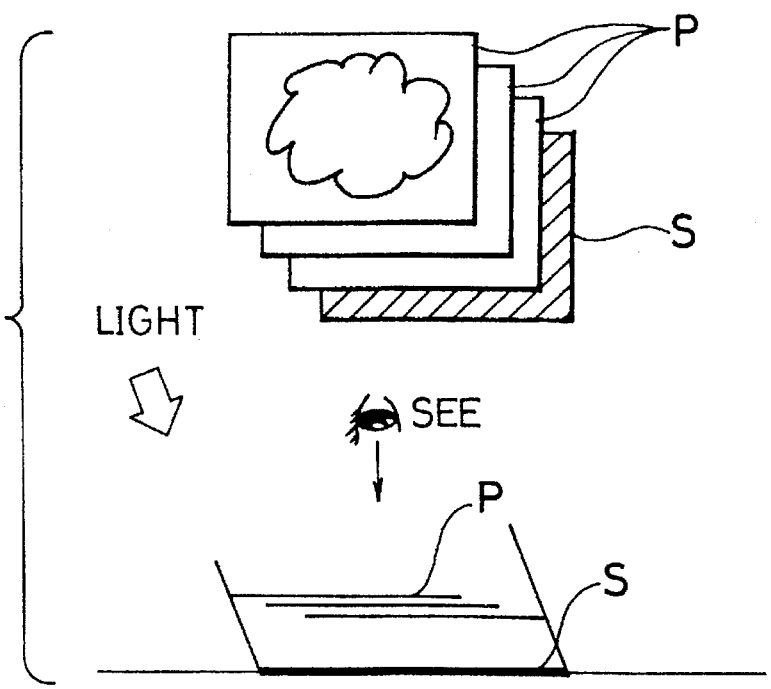
FIG. 81 is a view for explaining the principle of another different planar figure display system.

In the case of the box retrieval, when a retrieved box is selected by the mouse cursor MC in the initial picture of boxes shown in FIG. 7, a display of the selected box is inverted in color as shown in FIG. 81. In FIG. 31, a fourteenth box is selected and inverted in color. A box command window is further displayed such that this box command window partially overlaps this selected box.

Three boxes can be simultaneously selected and retrieved at its maximum. When plural boxes are selected, a button for "select another box" is selected within the box command window displayed in the picture of FIG. 31. When this button is selected, it is returned to the picture of FIG. 17 so that another box is selected again. When this operation is repeated once more, three boxes can be designated.

In FIG. 31, Te. So. (Un.) is an abbreviated form of "temporary sort (unsorted)".

A document registered by designating a diary or a card is temporarily sorted into a box of "temporary sort (unsorted)". When an icon of "all documents" is selected, all documents registered onto a magnetooptic disk are set to objects to be retrieved.

When one of "temporary sort" and "all documents" is selected and three boxes are selected, no button for "select another box" is displayed on the screen.

Figure 32:
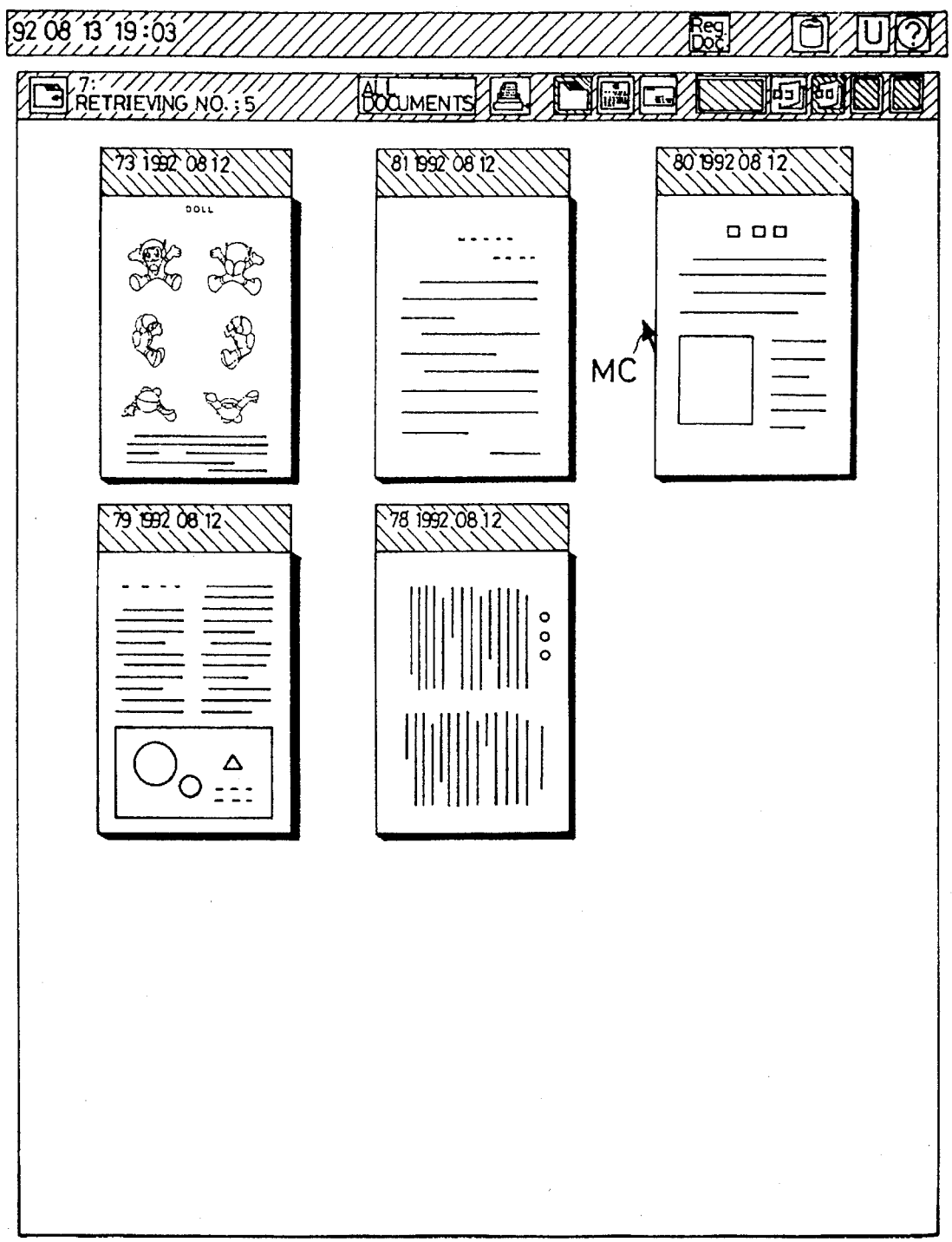
FIG. 32 is a view showing one example of a document list display picture provided when "see document list" is selected in FIG. 31.

When a button For "see document list" is selected within the box command window shown in FIG. 31 after a box has been selected, a reduced image on a First page oF each of all documents sorted into the selected box is displayed on the screen as shown in FIG. 32. It is possible to designate a characteristic page of each of the documents at a registering time thereof in advance instead of the first page. In this case, a reduced image on the characteristic page designated in advance can be displayed when each of the documents is listed and displayed.

In FIG. 32, Nor. Dis. and Cle. Cha. are abbreviated forms of "normal display" and "clear character", respectively.

Figures 33C, 33D:
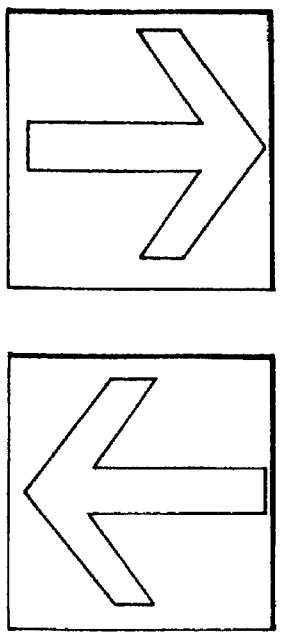
FIGS. 33(a)–33(h) are views respectively enlarging various kinds of icons relative to page turning displayed in an upper portion of each of the pictures shown in FIGS. 31 and 36.
Figures 33G, 33H:
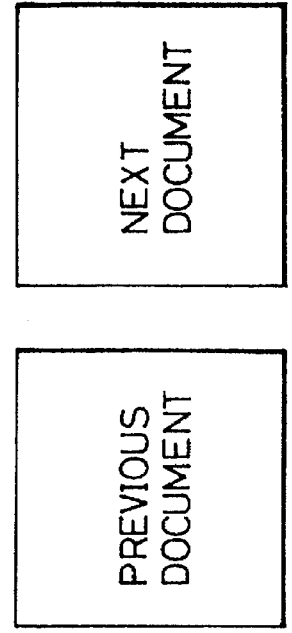
Figures 33A, 33B:
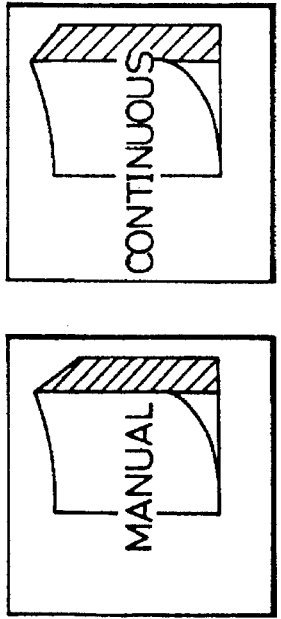

In this embodiment, reduced images of nine documents can be simultaneously displayed as one picture on the screen. When no reduced images are displayed as one picture on the screen, reduced images listed on another page can be displayed by switching pictures. This is called "page turning". In "manual page turning", pages of the documents are manually turned every one page. In "continuous page turning", pages of the documents are automatically turned continuously. The "manual page turning" and the "continuous page turning" can be selected by a "manual page turning icon" shown in FIG. 33a and a "continuous page turning icon" shown in FIG. 33b. With respect to page turning orders, it is possible to select a backward directional page-turning order by a "previous list icon" shown in FIG. 33c and a forward directional page-turning order by a "next list icon" shown in FIG. 33d.

In the case of the "continuous page turning", a page turning speed is increased while a left-hand button of the mouse is pushed. In contrast to this, a continuous page turning operation is interrupted when a right-hand button of the mouse is pushed. When the "next list icon" is selected in the "continuous page turning", the page turning operation is completed when a document image on a final page is displayed. In contrast to this, when the "previous list icon" is selected in the "continuous page turning", the page turning operation is completed when a document image on a first page is displayed.

Figure 34:
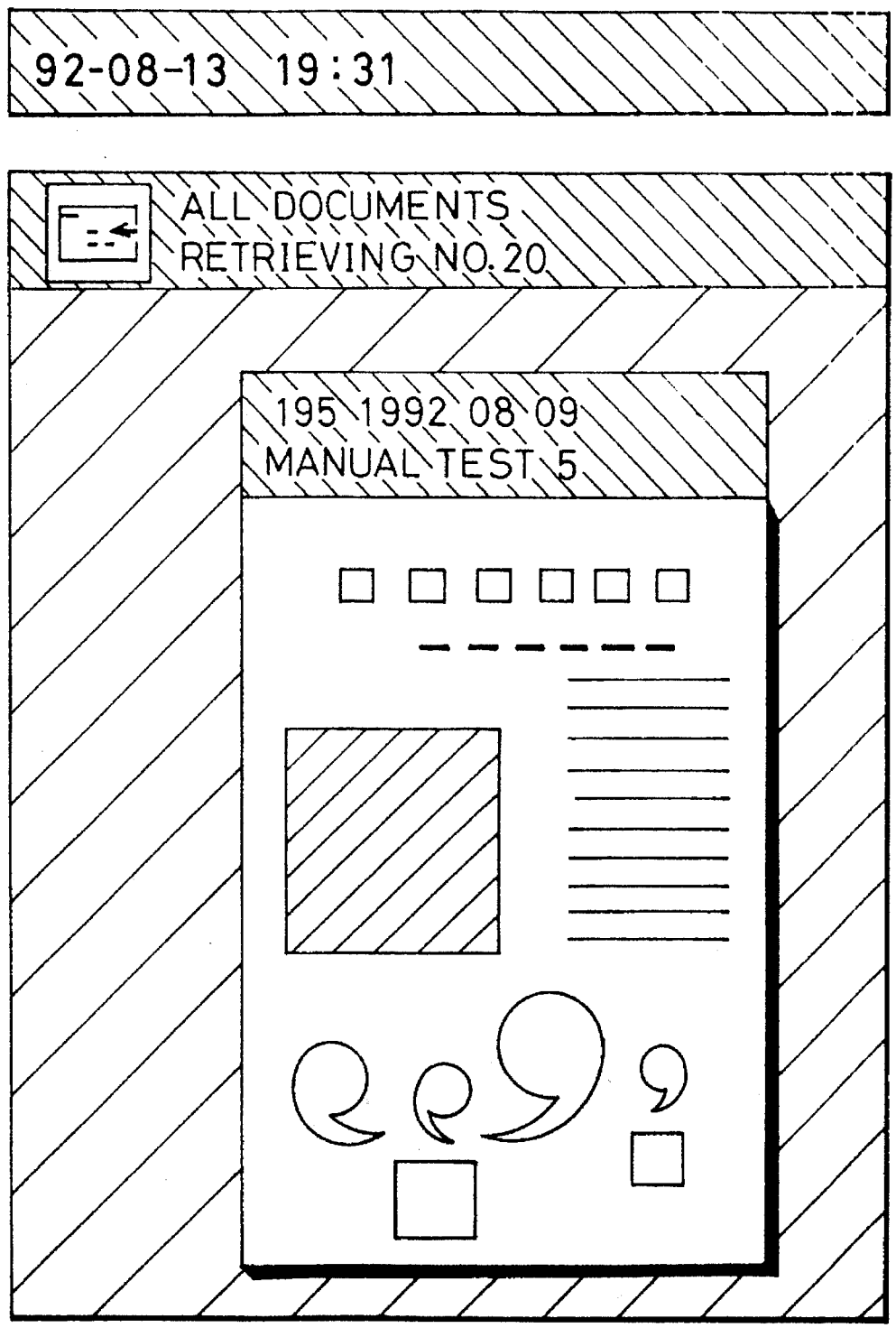
FIG. 34 is a view enlarging a reduced document image displayed in the above picture of FIG. 32, a header of this reduced document image, and an upper left-hand portion of this picture.

If the number of documents as a retrieving document number sorted into a selected box and a box name are provided, the retrieving document number and the box name are displayed in a lower black band of an upper portion of the picture of FIG. 32. When "all documents" is selected, characters of "all documents" and the retrieving document number are displayed as shown in FIG. 34.

A header formed in the shape of a black band is additionally displayed above a reduced image of each of the documents on one page. As clearly shown in FIG. 34, a document number, a register date, and a document name or mark are also displayed if the document number, the register date, and the document name or mark are registered. In the example of FIG. 34, the document number is set to "19" and the document name is set to "manual test 5". These document contents within the header are not displayed during a page turning operation, but are displayed only before the page turning operation is started and when the page turning operation is interrupted or completed.

Figure 35:
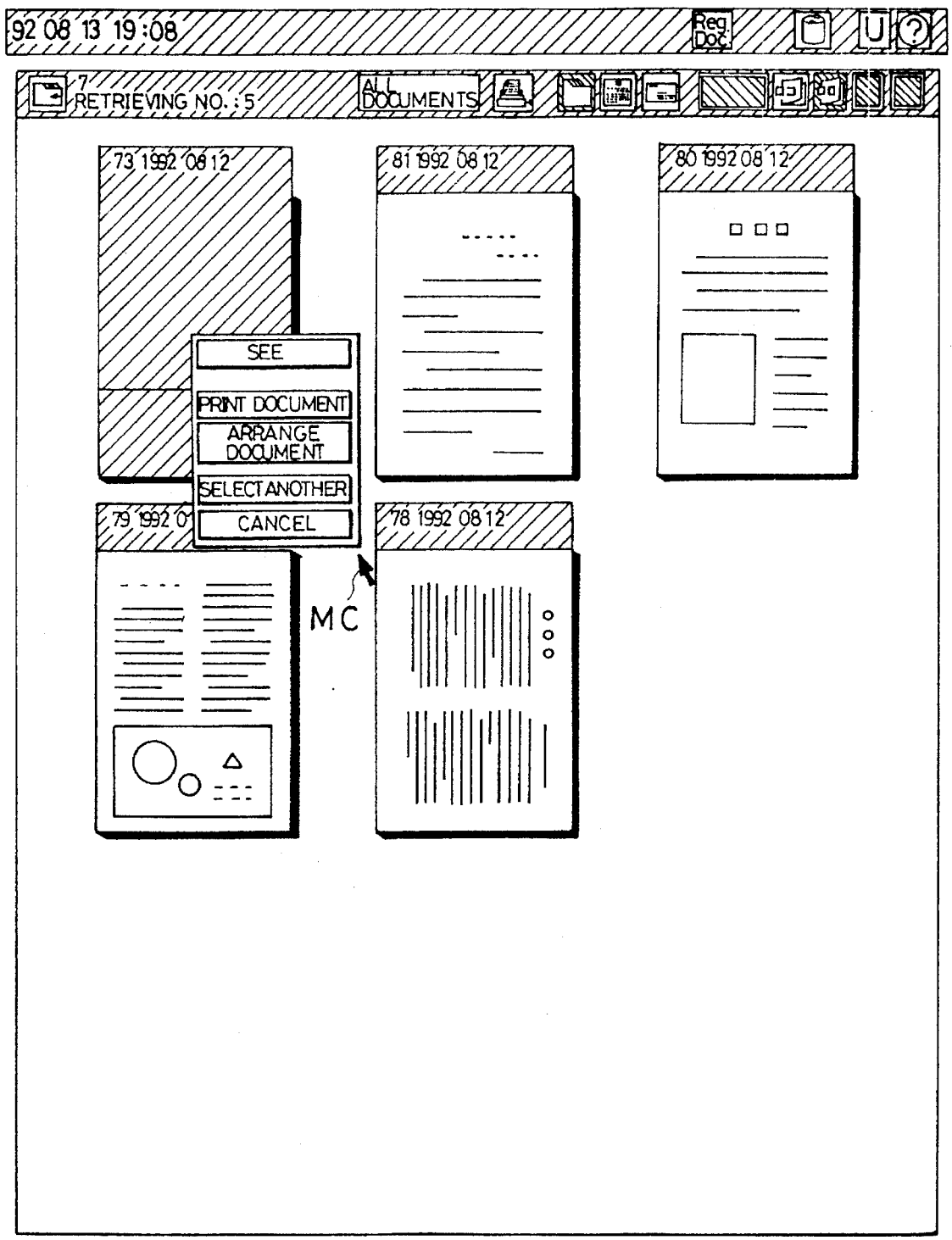
FIG. 35 is a view showing one example of a picture provided when an object document to be retrieved is designated in FIG. 32.

When one of the documents having reduced images is selected in the picture of FIG. 32, the mouse cursor MC is moved onto a reduced image of this selected document and is clicked on the left-hand side. For example, when the reduced image of a seventy-third document in an upper left-hand portion of this picture is selected, a display of this reduced image is inverted in white and black colors as shown in FIG. 35. In FIG. 35 the display of an internal figure is omitted and this internal figure is entirely displayed in black. A document command window is also displayed such that the document command window partially overlaps this reduced image.

Figure 36:
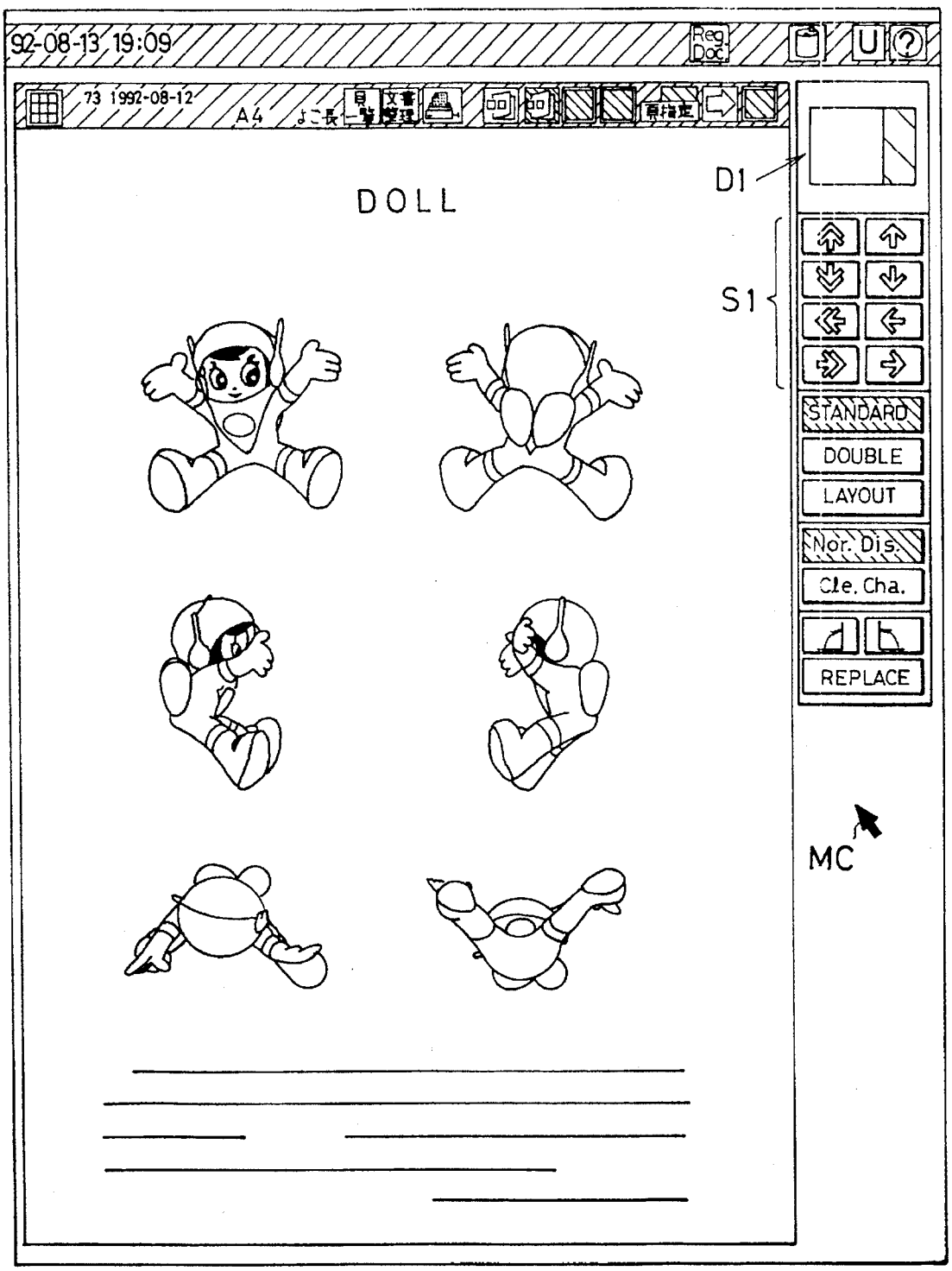
FIG. 36 is a view showing one example of a picture displaying an image on a first page of the object document at an approximately equal magnification when "see" is selected in FIG. 35.

When a button for "see" is selected, an image of this document on a first page is displayed at an approximately equal magnification as shown in FIG. 36. In this display state, similar to the case of the above-mentioned list display, pages of this document can be turned manually or continuously and automatically by selecting the icons shown in FIGS. 33a and 33b. Thus, contents of the selected document on each of these pages are sequentially displayed at an approximately equal magnification and can be confirmed.

Figures 33E, 33F:
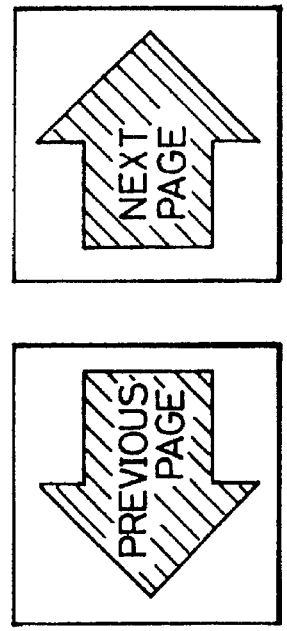

At this time, if a "previous page icon" shown in FIG. 33e is selected, a document image on the previous page is sequentially displayed. In contrast to this, if a "next page icon" shown in FIG. 33f is selected, a document image on the next page is sequentially displayed. When plural or all documents are selected, an image of the previous document on a first page thereof is sequentially displayed by selecting a "previous document icon" shown in FIG. 33g. Further, an image of the next document on a first page thereof is sequentially displayed by selecting a "next document icon" shown in FIG. 33h.

When "all documents" is selected in FIG. 35, all the documents listed as reduced images are set to objects to be displayed, printed or arranged. When a button for "select another document" is selected within the document command window after one of the documents has been selected, it is returned to the picture shown in FIG. 32 and another document can be selected. When this operation is repeatedly performed, a plurality of documents can be selected as objects to be displayed, printed or arranged.

An "icon for returning to document list" is displayed in a left-hand end portion within a lower black band of a picture shown in FIG. 36. This "icon for returning to document list" is shown by a figure having nine squares aligned with each other within a white square. When this icon is selected, it is returned to the document list displumy of FIG. 32. Accordingly, another document can be continuously selected and document retrieval can be completed.

When an operator would like to see a document image on another page in the picture of FIG. 36, the operator selects a "page designating icon". When this "page designating icon" is selected, a page designating command window is displayed on the screen. Accordingly, if a document image on a page to be seen is designated, the document image on this page can be immediately displayed on the screen.

Further, icons for selecting various kinds of functions of the electronic filing apparatus such as a "drag icon" DI, "scroll icons" SI, a display magnification, a display mode, rotation, replacement, etc. are displayed on a right-hand side of the picture of FIG. 36. In the "scroll icons", a high scroll speed is shown by a double arrow and a low scroll speed is shown by a single arrow.

In the case of the "drag icon" DI, when the size of an entire image is shown in gray and a display portion is colored in white and a white portion is dragged, an image portion corresponding to a moved image portion is displayed on the screen.

When the mouse cursor MC is moved onto one of the "scroll icons" SI and the left-hand button of the mouse is continuously pushed, an image is scrolled at a high or low speed in an arrow direction while this left-hand button is pushed.

For example, icons of display magnification are constructed by "standard", "double", "layout", etc. When one of these icons is selected, the size of an image can be switched to a standard size, a double size or a size for displaying the entire image at one time.

When "clear characters" is selected in a display mode, an image clearer than a normal image is displayed. In contrast to this, when "standard display" is selected in a display mode, it is returned to an original display.

When a "right-hand rotational icon" or a "left-hand rotational icon" is selected, an original is displayed in a state in which the original is rotated 90° rightward or is rotated 90° leftward. When "replacement" is selected, an image rotated and displayed is replaced with an image registered to a magnetooptic disk.

Figure 37:
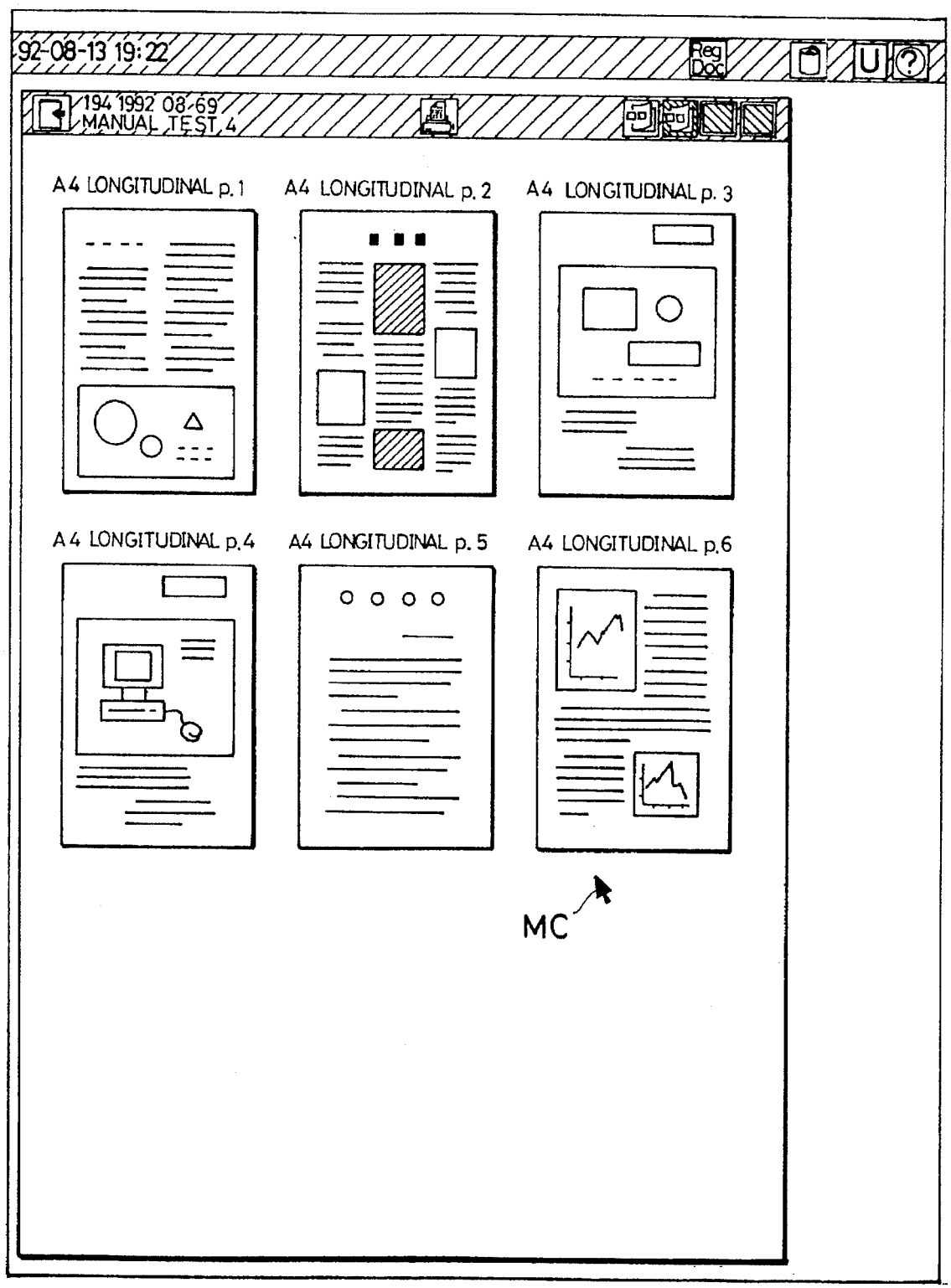
FIG. 37 is a view showing an example of a page list picture provided when an icon of "page list" is selected in the picture showing the image on the first page of the retrieved document in FIG. 36.

A "page list icon" is displayed within an upper black band of the picture of FIG. 36. When this icon is selected, the reduced image of a selected document on each of pages thereof is listed and displayed from a first page every nine pages as shown in FIG. 37. The document shown in FIG. 37 is different from the document shown in FIG. 36. At this time, a paper size and a document arranging direction as a longitudinal or transversal direction are displayed in an upper portion of the reduced image on each of the pages of the selected document.

Similar to the case of the above-mentioned document list display of FIG. 32, a manual or continuous page turning operation can be also performed in this page list display. When the selected document has ten pages or more, contents of this document can be sequentially confirmed every nine pages.

Thus, the contents of a retrieved document can be confirmed easily and sufficiently by turning pages of the document, scrolling, enlarging and rotating a document image, etc.

In the picture of FIG. 7 or 31, etc., all sortable boxes are listed and displayed. In such a picture, as shown in FIG. 41a, a thickness of each of the boxes is changed as shown in Table 2 in accordance with the number of documents sorted into each of the boxes.

TABLE 2

| the number of documents | thickness of box |
|---|---|
| 0 | 0 sheet |
| 1~10 | 1 sheet |
| 11~30 | 2 sheets |
| 31~60 | 3 sheets |
| 61~ | 4 sheets |

In this Table 2, the thickness of a box is shown by the number of document sheets. Zero sheet means that only a basic pattern of the box is shown and there is no additional thickness pattern. One sheet means that one added black thickness pattern shows one sheet of paper. Two to four sheets mean that the thickness of a thickness pattern is respectively increased sequentially from two paper sheets to four paper sheets.

Figure 38A:
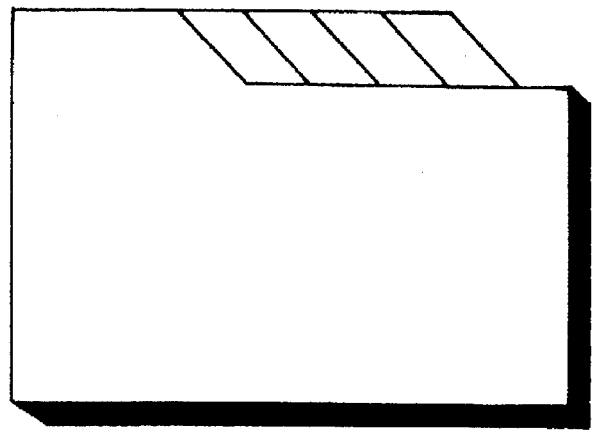
FIGS. 38a and 38b are views for explaining that a shadow document thickness of each of boxes displayed in the box display picture of FIG. 31, etc., or an overlapping sheet number is changed in accordance with the number of sorted documents.
Figure 38B:
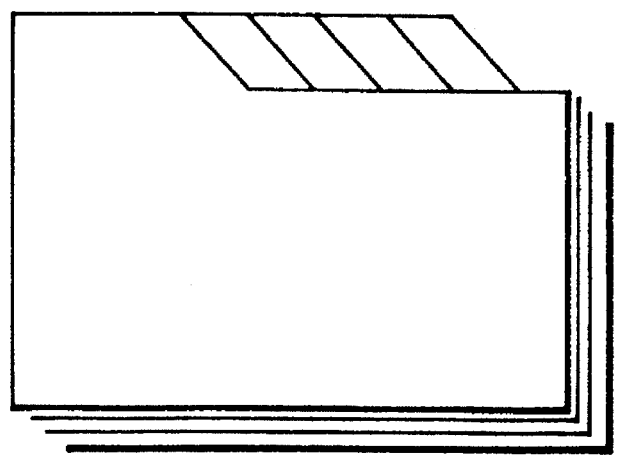

As shown in FIG. 38b, the number of overlapped boxes as a sheet number may be changed in accordance with the number of documents sorted into the boxes. The thickness of boxes shown in FIG. 38a shows that 11 to 30 documents are sorted into the boxes. The number of overlapped boxes shown in FIG. 38b shows that 31 to 60 documents are sorted into the boxes.

When such a display is used, it is possible to know an amount of documents sorted into each of listed and displayed boxes. Accordingly, this document amount is used as reference information when the documents are retrieved. Further, it is possible to prevent a large amount of documents from being stored into a specified box when the documents are registered.

Similarly, in the document list display shown in FIG. 32, the thickness of a reduced image of each of documents on one page thereof is changed and displayed in accordance with the number of pages off each of the documents as shown in Table 3.

TABLE 3

| the number of pages | thickness of document image |
|---|---|
| 1 | 0 sheet |
| 2~5 | 1 sheet |
| 6~10 | 2 sheets |
| 11~50 | 3 sheets |
| 51~ | 4 sheets |

Figure 39:
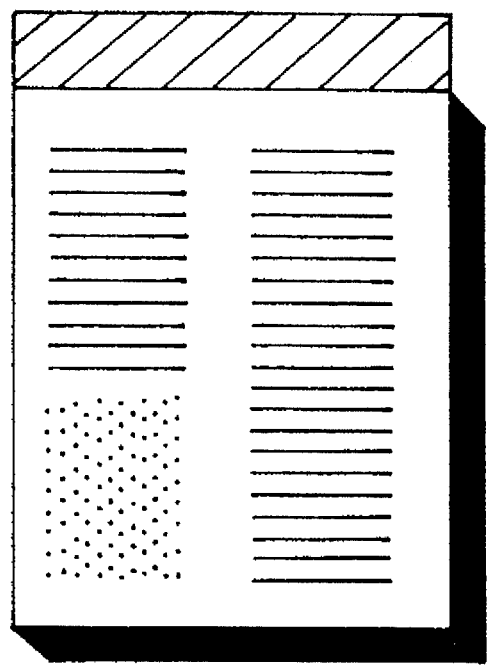
FIG. 39 is a view for explaining that the thickness of a document shadow as a modificative pattern added to a contour portion of each of reduced document images in the document list display of FIG. 32, or an overlapping sheet number is changed in accordance with the number of pages of each of documents.

The thickness of the reduced image is shown by a black band pattern on right-hand and lower sides of the reduced image in FIG. 39. In this Table 3, similar to the above Table 2, the thickness of a document image is shown by a sheet number.

In this case, the number of overlapped sheets may be changed instead of the thickness of a reduced pattern. The thickness of the reduced image shown in FIG. 39 shows that the number of pages of this document is set to 11 to 50 pages.

Thus, the thickness of a reduced image on a page of each of documents in the document list display as shown in FIG. 32 is changed in accordance with the number of pages of each of the documents including this page. Accordingly, a retrieving operator can obtain reference information for retrieval and can approximately know the number of pages of an object document in advance, which is convenient for the operator.

Figure 42:
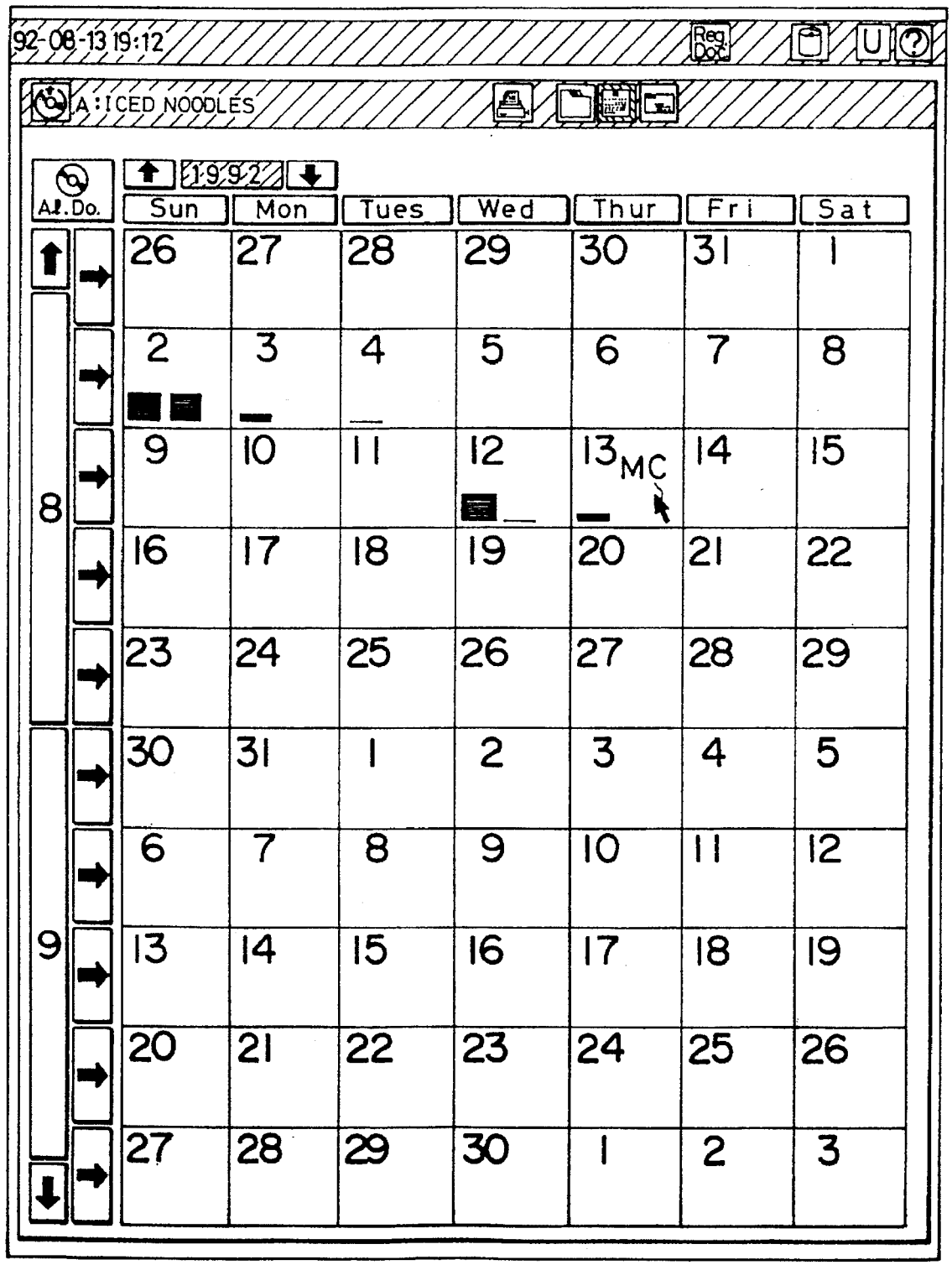
FIG. 42 is a view showing one example of an initial picture for retrieving a diary.

In the case of the diary retrieval, there is no problem if an initial picture is set to that of a diary as shown in FIG. 42. However, in the case of the initial picture of a box or a card, the icon of "diary" is selected as mentioned above and this initial picture is switched to the initial picture of a diary as shown in FIG. 42. In this initial picture of a diary, a bar pattern according to the number of documents is displayed in a date column in which the documents are sorted. For example, such a bar pattern is enlarged and shown in FIG. 40.

Figure 40:
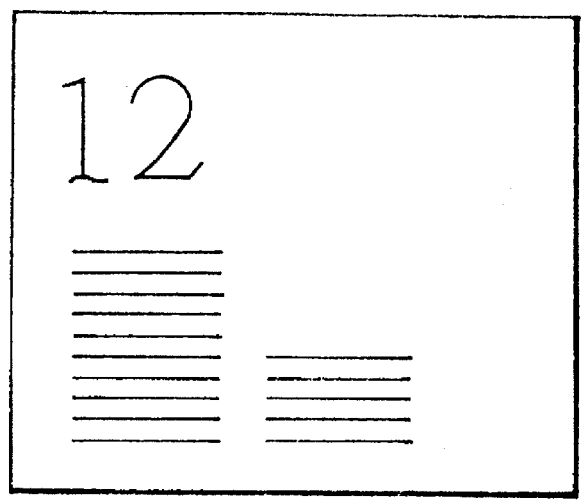
FIG. 40 is an enlarged view for clearly showing bar patterns according to the number of sorted documents displayed within a date column in which the documents are sorted in FIG. 42.

One bar in the bar pattern is provided per one document and bars are overlapped and displayed until ten bars. Bars ranged From 11 to 20 bars are overlapped and displayed in a second bar stack. Bars equal to or greater than 20 bars showing 20 documents are displayed by 20 bars. The example illustrated in FIG. 40 shows that documents are sorted on a twelfth day.

In FIG. 42, A1. Do. is an abbreviated form of "all documents"

If the above-mentioned diary mark is set in each of date columns, this diary mark is also displayed. Years and months can be scrolled forward and backward. A retrieved object can be designated by a day, a week and a month. It is most efficient to designate the retrieved object by a day.

Figure 43:
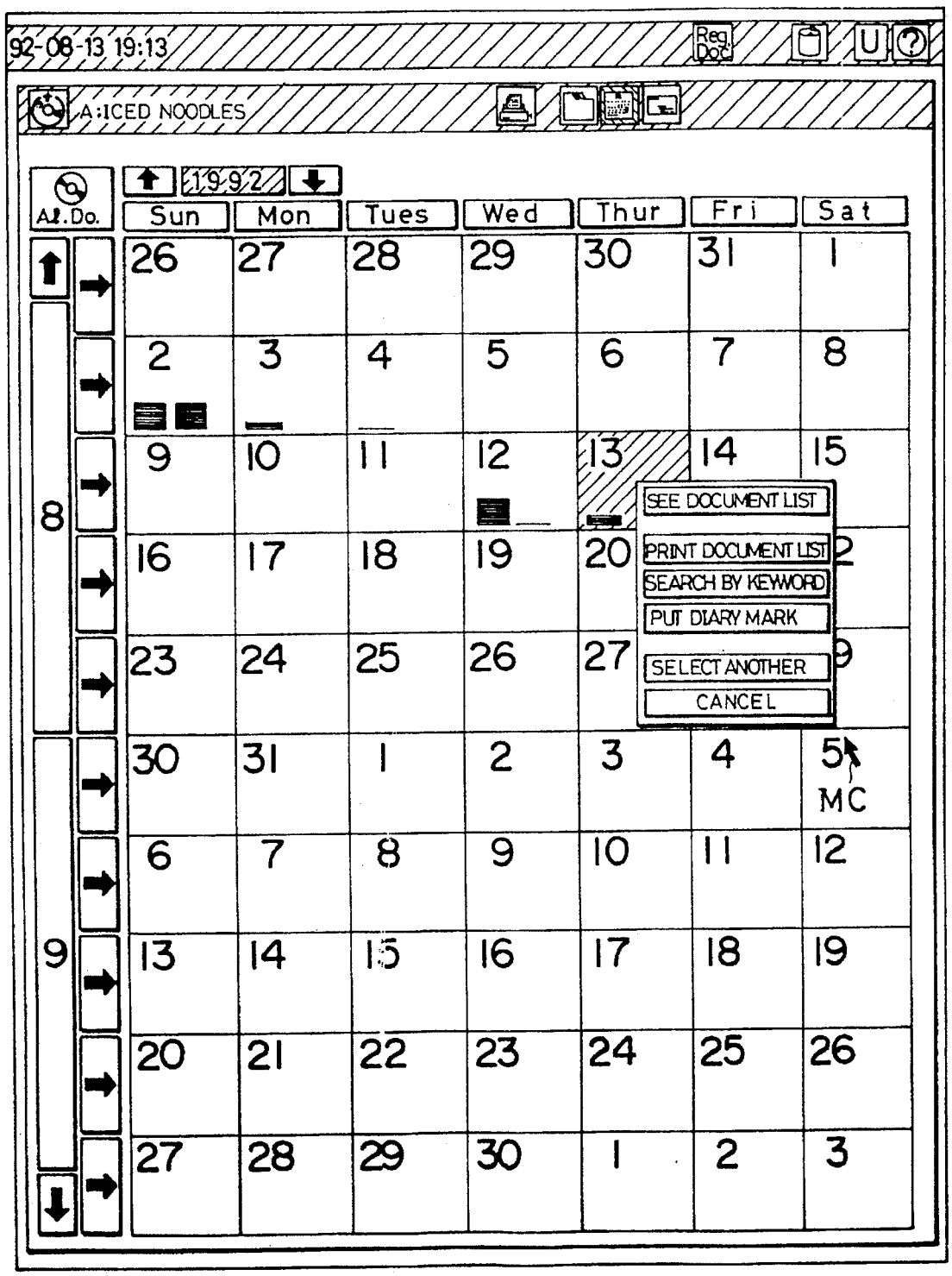
FIG. 43 is a view showing one example of a picture provided when a retrieved date is designated in FIG. 42.

When the retrieved object is designated by a day and the mouse cursor MC is moved onto a date column to be designated and is clicked on the left-hand side, a display of this date column is inverted in color as shown in FIG. 43. Further, a diary command window is displayed such that the diary command window partially overlaps this date column. Subsequent operations are similar to operations subsequent to the display of the box command window shown in FIG. 31 in the above-mentioned box retrieval. Accordingly, an explanation about these operations is omitted in the following description.

In FIG. 43, A1. Do. is an abbreviated form of "all documents".

In the case of the card retrieval, there is no problem if an initial picture is set to that of a card shown in FIG. 9. However, in the case of the initial picture of a box or a diary, the icon of "card" is selected as mentioned above and the initial picture of a box or a diary is switched to the initial picture of a card shown in FIG. 9. In this initial picture of a card, an operator first selects a header in which a card to be retrieved is sorted.

Figure 44:
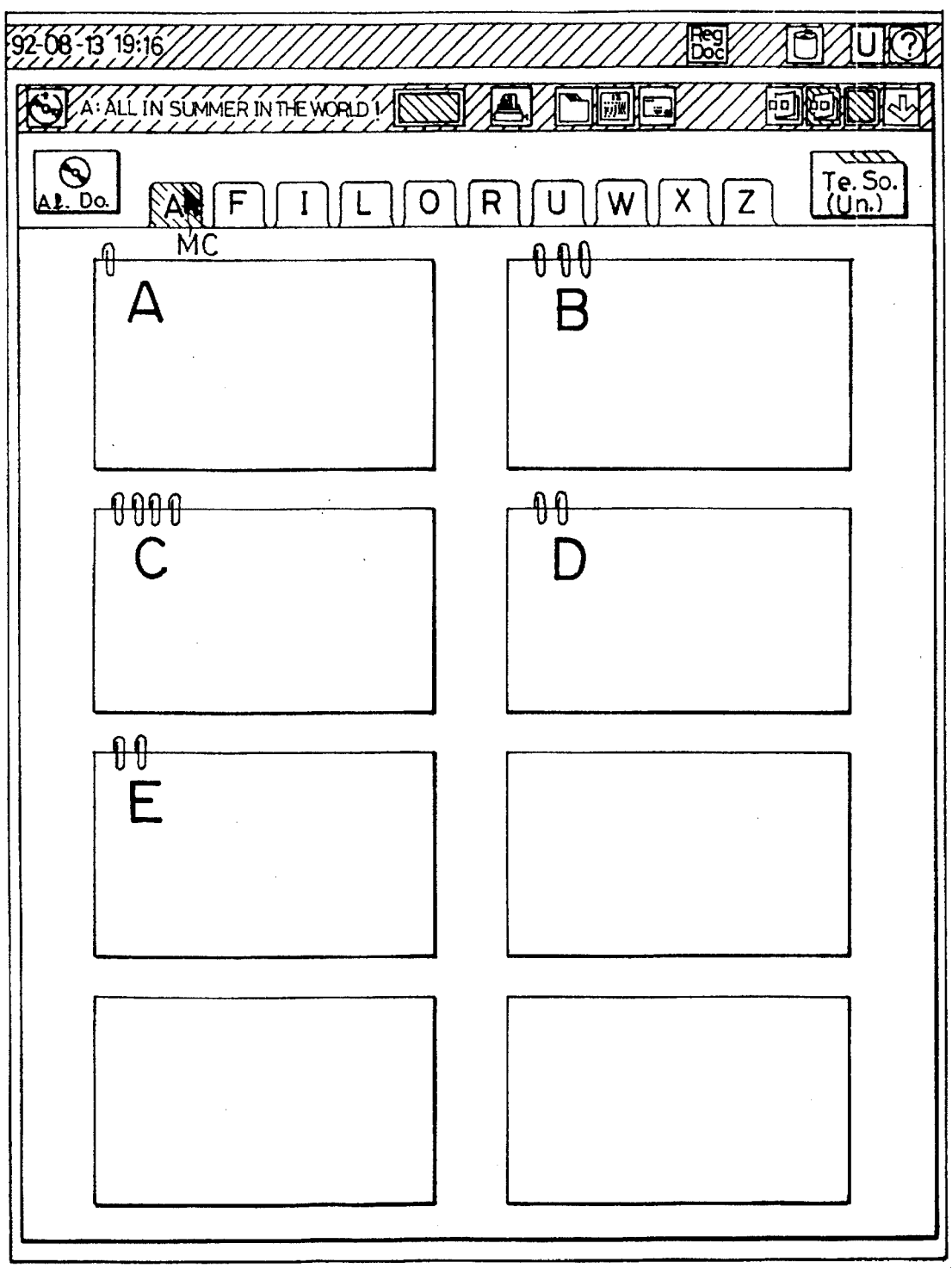
FIG. 44 is a view showing one example of a picture provided when a header "A" is selected in an initial picture in the retrieval of a card.

For example, when a header "A" is selected, cards sorted to the header "A" are displayed until 8 cards as shown in FIG. 44. In the case of nine cards or more, similar to the above-mentioned page turning operation, pictures are switched manually or continuously so that these cards can be sequentially displayed on the screen every eight cards.

Figure 41:
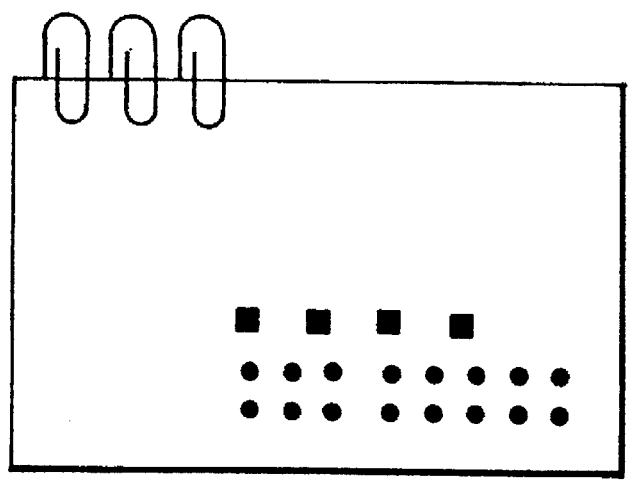
FIG. 41 is an enlarged view for clearly showing clip patterns additionally displayed according to the number of documents for each of cards in FIG. 44.

At this time, as clearly seen from FIG. 41, a pattern of clips according to the number of sorted documents is added to a displayed card. For example, the number of sorted documents and the number of added clips are set as shown in Table 4.

TABLE 4

| the number of documents | the number of clips |
|---|---|
| 0 | 0 |
| 1~10 | 1 |
| 11~30 | 2 |
| 31~60 | 3 |
| 61~ | 4 |

Accordingly, 1 to 10 documents are sorted to a card "A" displayed in FIG. 44. 31 to 60 documents are sorted to a card "B". 61 documents or more are sorted to a card "C". 11 to 30 documents are sorted to each of cards "D" and "E". No documents are sorted to the other cards.

In FIG. 44, A1. Do. and Te. So. (Un.) are abbreviated forms of "all documents" and "temporary sort (unsorted)", respectively.

Figure 45:
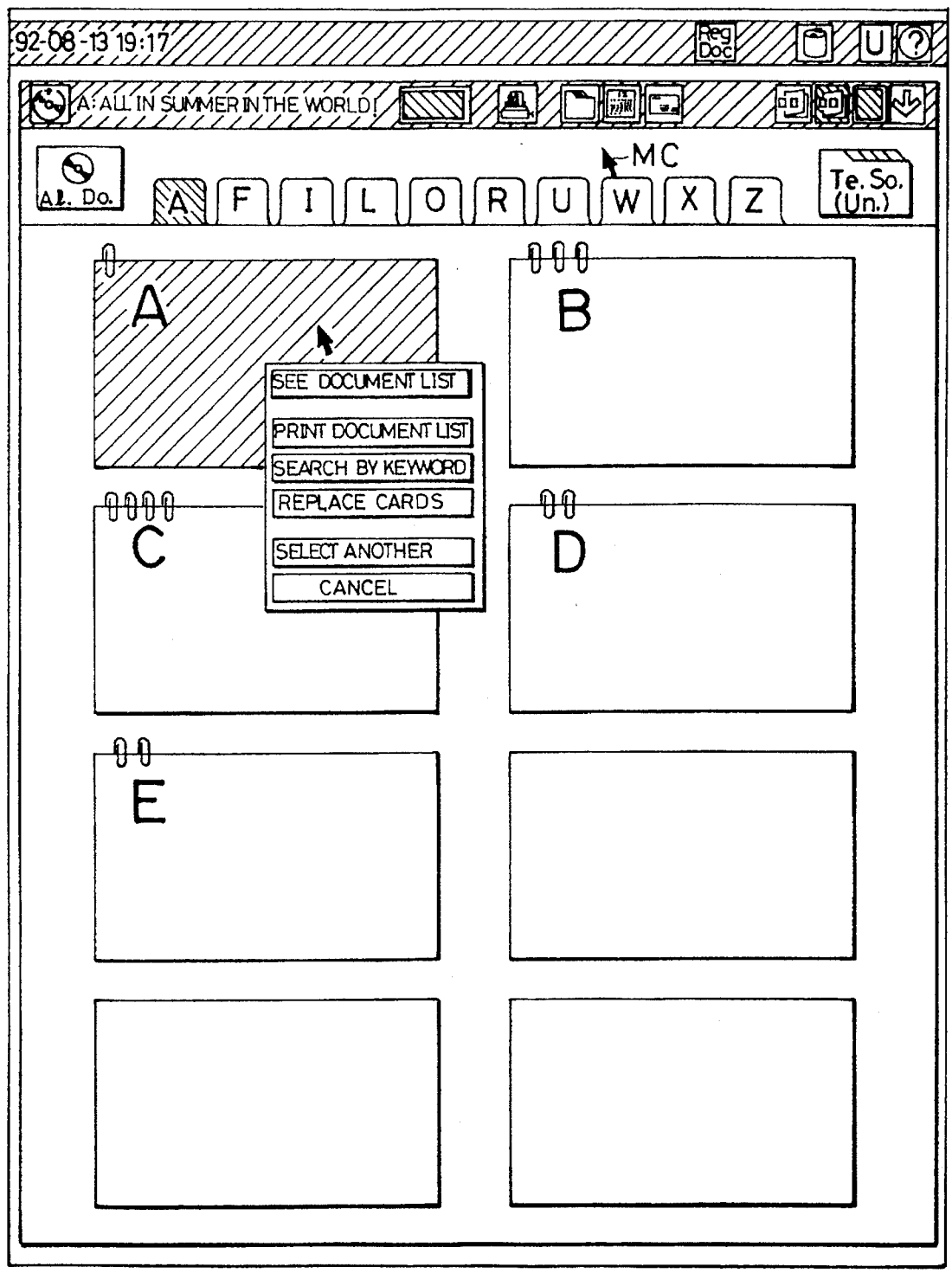
FIG. 45 is a view showing one example of a picture provided when a retrieved card is designated in FIG. 44.

When a card to be retrieved is selected, a display of the selected card is inverted in color as shown in FIG. 45 and a card command window is displayed such that the card command window partially overlaps the selected card. In FIG. 45, a card "A" is selected as one example. Cards can be simultaneously selected until three cards. When plural cards are selected, a button for "select another card" is selected within the card command window and it is returned to the picture of FIG. 44. Then, an operation for selecting another card is repeatedly performed. It is also possible to select an icon of "all documents" or "temporary sort (unsorted)".

In FIG. 45, A1. Do. and Te. So (Un.) are abbreviated forms of "all documents" and "temporary sort (unsorted)", respectively.

Subsequent operations are similar to operations subsequent to the display of the box command window shown in FIG. 31 in the above-mentioned box retrieval. Accordingly, an explanation about these operations is omitted in the following description.

<Arrangement of Documents>

An arrangement of documents will next be explained. Contents of a registered document can be changed by using a function of document arrangement when another document portion is added to a document original registered to a magnetooptic disk and contents of the document original are corrected and it is not necessary to store the registered document. The following operations can be performed in the document arrangement.

Addition of pages: A newly read original document is added to a registered document.

Replacement of pages: A document portion on a partial page of the registered document is replaced with a newly read original document.

Turning replacement: Pages of the registered document are turned or shifted and original pages of the registered document are replaced with the shifted pages, Page deletion: A partial page of the registered document is deleted.

Document division: One document is divided into two documents.

Document compilation: A plurality of documents are compiled into one.

Change in sort: Storing places of documents are changed.

Copy: The registered document is copied to make a new document.

Change in keyword: Keywords of documents are changed.

Get into garbage box: A document is removed from retrieved objects.

Take out of garbage box: The document removed from the retrieved objects is returned to an original place.

Erase document: The document removed from the retrieved objects is erased from a magnetooptic disk.

The operation of change in sort relative to the present invention in the above-mentioned operations will next be explained.

Three sorting methods of a box, a diary and a card are designated with respect to one document.

The sorting methods can be changed every box, diary and card. When one sorting method or place is changed, the remaining two sorting methods or places are unchanged. This function is used when "temporary sort (unsorted)" and a sorting method of documents sorted at a registered date are designated and the designated sorting method is then changed after the documents have been registered.

In this case, similar to the case of retrieval of documents, the picture of a document list shown in FIG. 32 is displayed by operating the electronic filing apparatus From the initial picture of a box, a diary or a card. In this document list picture, a document to be changed in sort is selectively designated by the mouse cursor.

Figure 46:
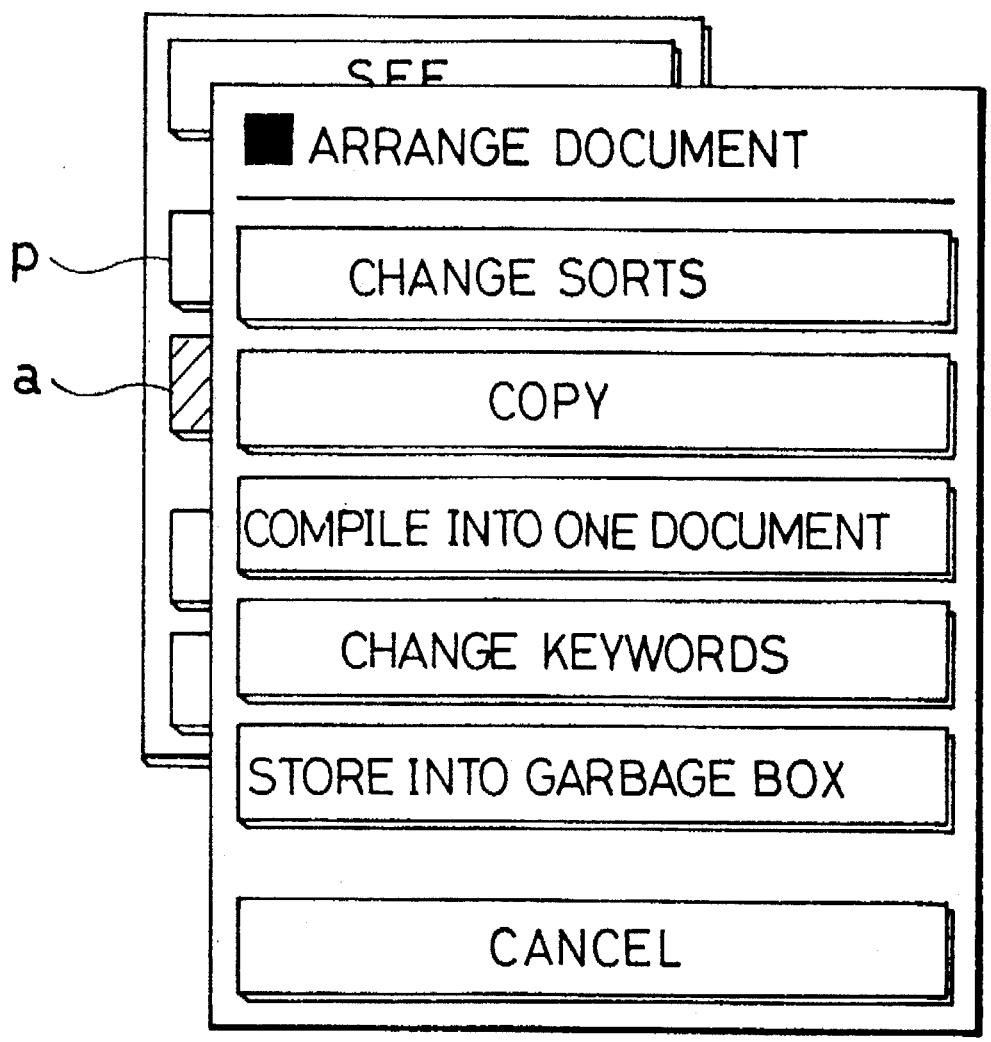
FIG. 46 is a view showing one example of a command window provided when "arrange documents" is selected in FIG. 35.

Thus, a display of the selected document is inverted in color as shown in FIG. 35 and a command window is displayed as a first command window. Then, a button for "arrange document" is selected. Thus, a new command window is displayed such that this new command window partially overlaps the first command window as shown in FIG. 46. A button for "change sorts" is next selected.

Figure 47:
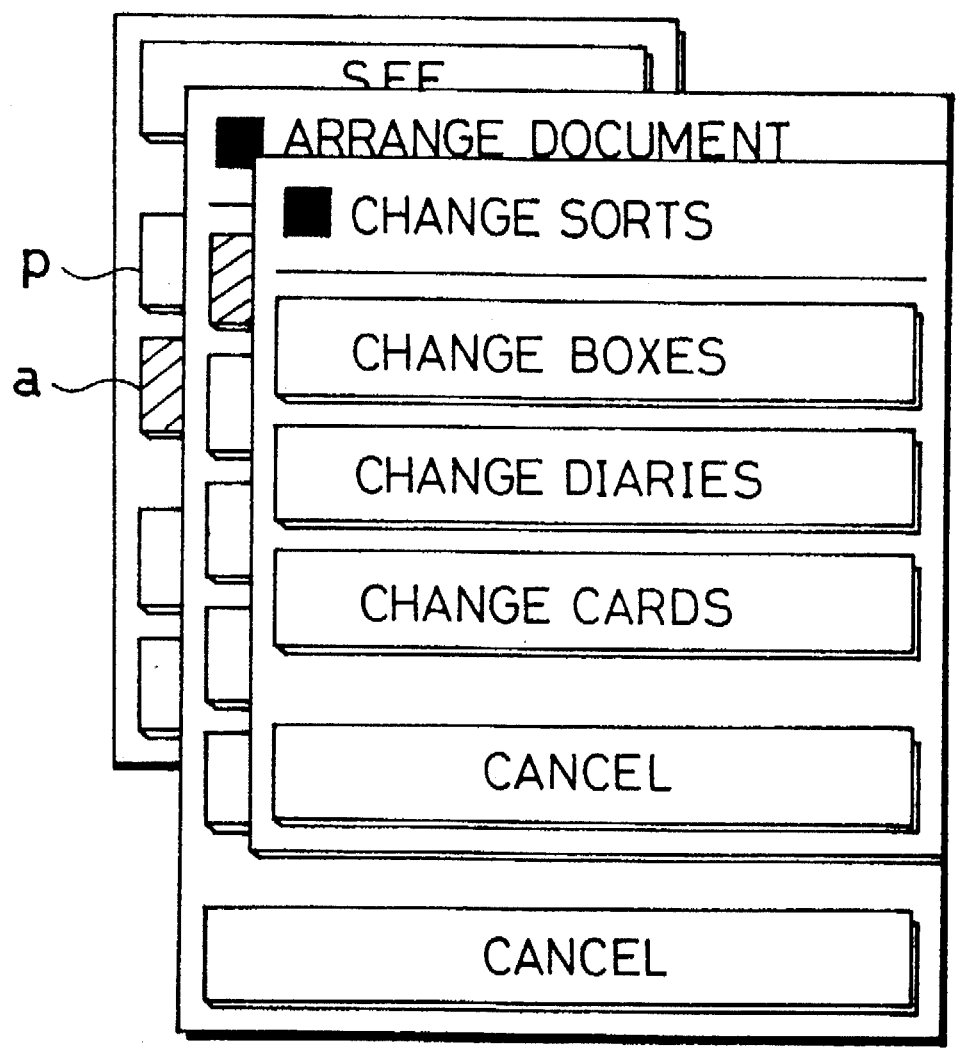
FIG. 47 is a view showing one example of a command window provided when "change sorts" is selected in FIG. 46.

Further, a new command window shown in FIG. 47 is displayed such that this new command window partially overlaps the new command window shown in FIG. 46. Therefore, an operator selects the sorting method of a box, a diary or a card to be changed. For example, when document information is sorted by a box, a button for "change boxes" is selected. Thus, a box selecting picture is displayed on the screen and a message of "please select. a sorted box" is displayed as shown in FIG. 48.

Figure 48:
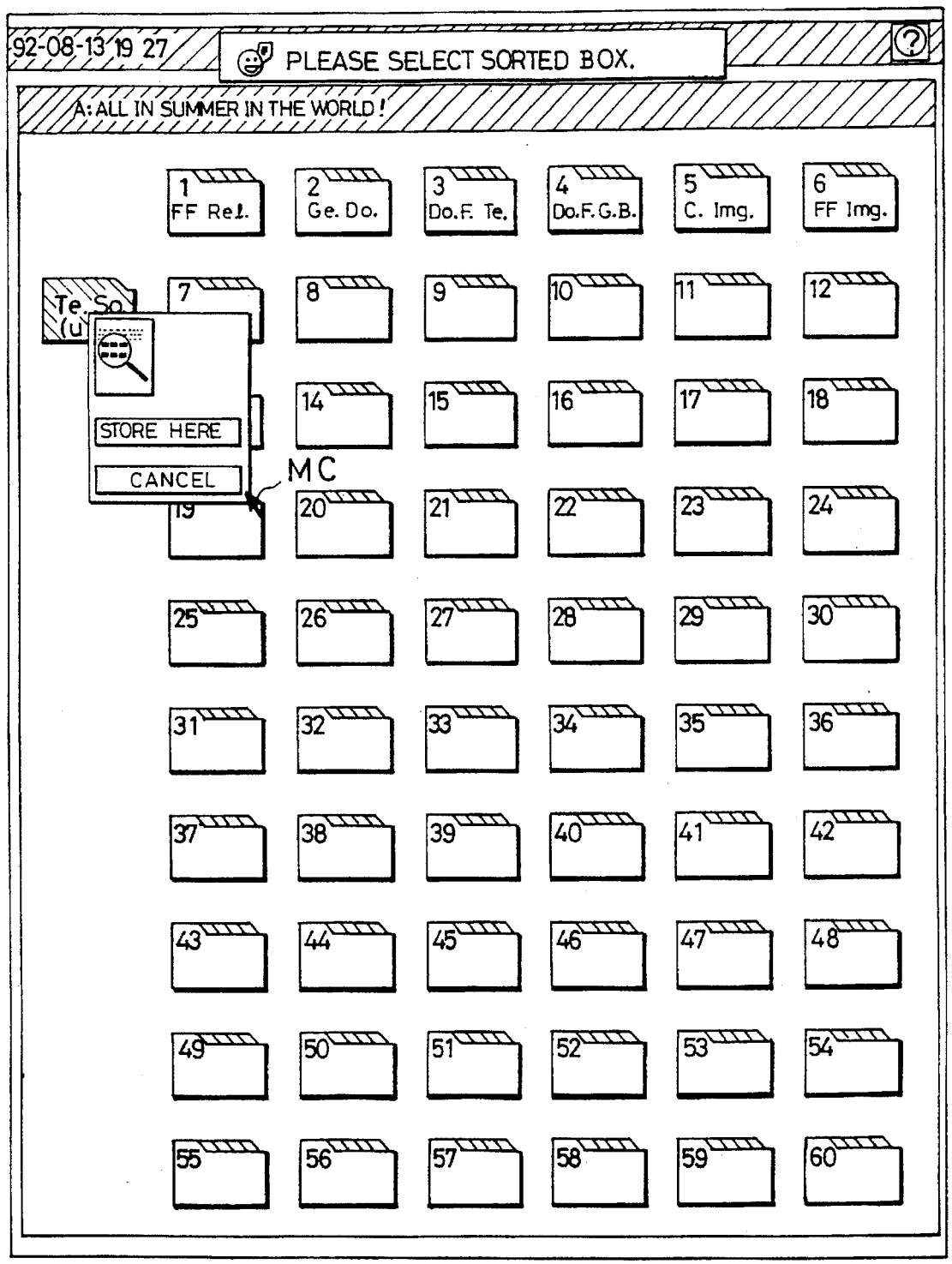
FIG. 48 is a view showing one example of a selective picture for sort provided when "change boxes" is selected in FIG. 47.

When the sorted box is selected, a display of this selected box is inverted in color as shown in FIG. 48 and a confirming window is displayed on the screen. When a button for "store here" is then selected, a box for sorting documents is changed to the selected box and it is returned to the display picture of a document list.

in FIG. 48, the abbreviated forms shown in FIG. 48 are respectively defined as follows.

Te. So. (Un.) - - - temporary sort (unsorted)

FF Rel. - - - FF relation

Ge. Do. - - - general document

Do. f. Te. - - - document for test

Do. f. G. B. - - - document for garbage box test

C. Img. - - - C-4 image

IFF Img. - - - FF image

<Arrangement of Documents>

A printing operation of a document will next be described. It is possible to print various kinds of retrieved documents, box lists, etc. Printable terms are provided as follows.

Printing of document: A retrieved document is printed.

Printing of displayed portion: A picture image of a displayed document on a page thereof is printed as it is.

Printing of box list: A box list is printed.

Printing of diary list: A portion of a diary list displayed on the screen is printed. For example, a diary list portion corresponding to two months is printed.

Printing of card list: A list of all registered cards or a list of cards registered in a specified header such as a tag is printed.

Printing of reduced document list: A list of reduced document images is printed, Printing of keyword list: Lists of keywords of documents and page numbers are printed.

Printing of reduced page list: A list of displayed pages is printed.

In a printing operation, an operator confirms that the electronic filing apparatus is connected to a printer and a power source is turned on. Then, sheets of paper having a predetermined size are set. When the operator would like to print a displayed picture, a printing icon is selected by displaying this picture on the screen. The printing icon is set to an icon A6 shown in FIG. 10. Thereafter, the operator designates a printing condition and execution of the printing operation in accordance with displayed pictures.

Figure 49:
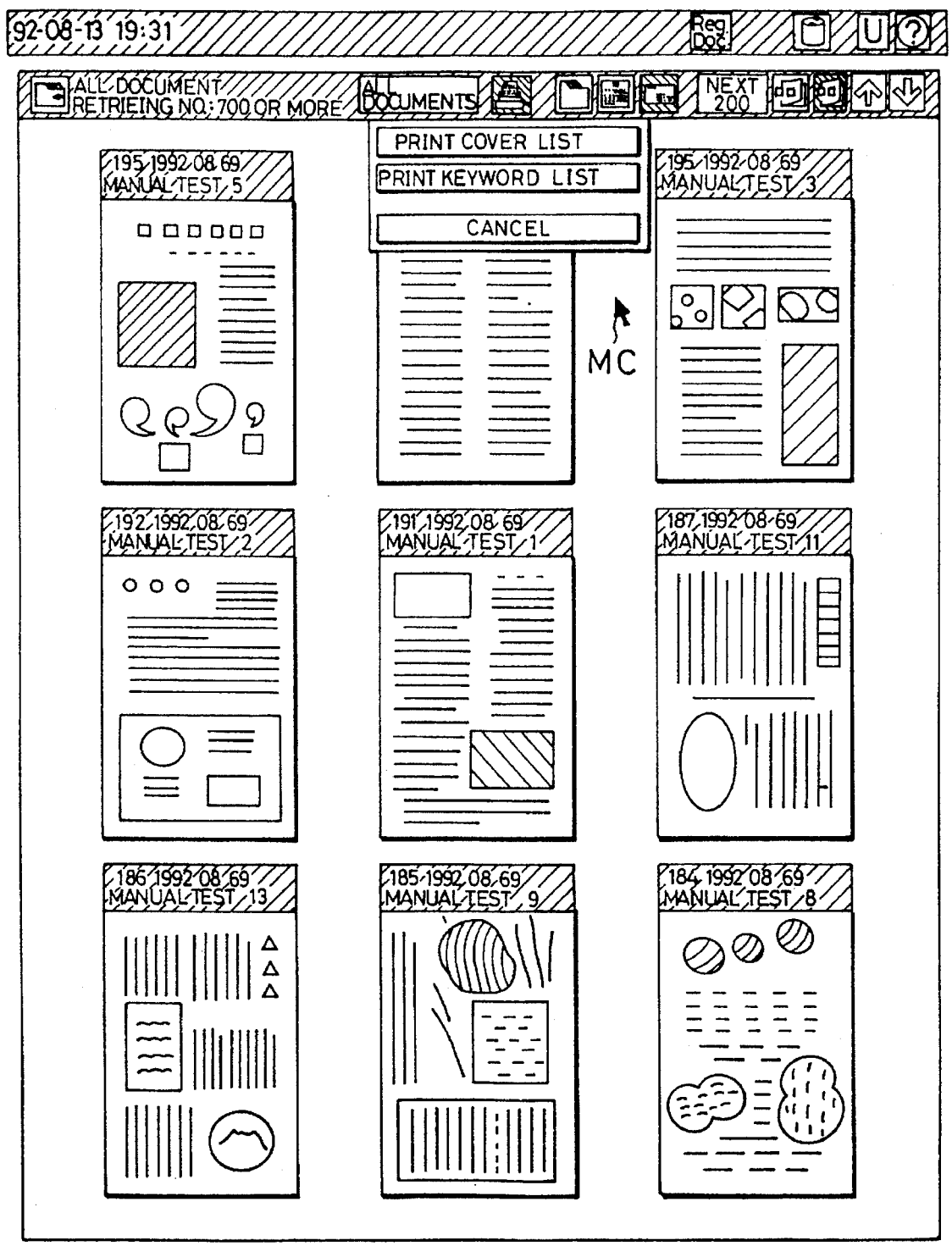
FIG. 49 is a view showing one example of a picture provided when "print document list" is selected within a window in the box designating the picture of FIG. 31.

For example, when the operator would like to print a document list, "print document list" is selected within a hop-up command window in the box designating picture of FIG. 31. Thus, a list of documents sorted into a sorted box is displayed as shown in FIG. 49. In this document list, a reduced image of each of the documents on one page thereof is displayed and the display of a command icon is changed.

When a button for "print cover list" is then selected, a list of reduced images of covers (on first pages) of all the documents sorted into the selected box is printed.

When a retrieved document is printed, an object of documents listed and displayed on the screen is selected as shown in FIG. 35. Thereafter, "print document" is selected within a command window.

Figure 50:
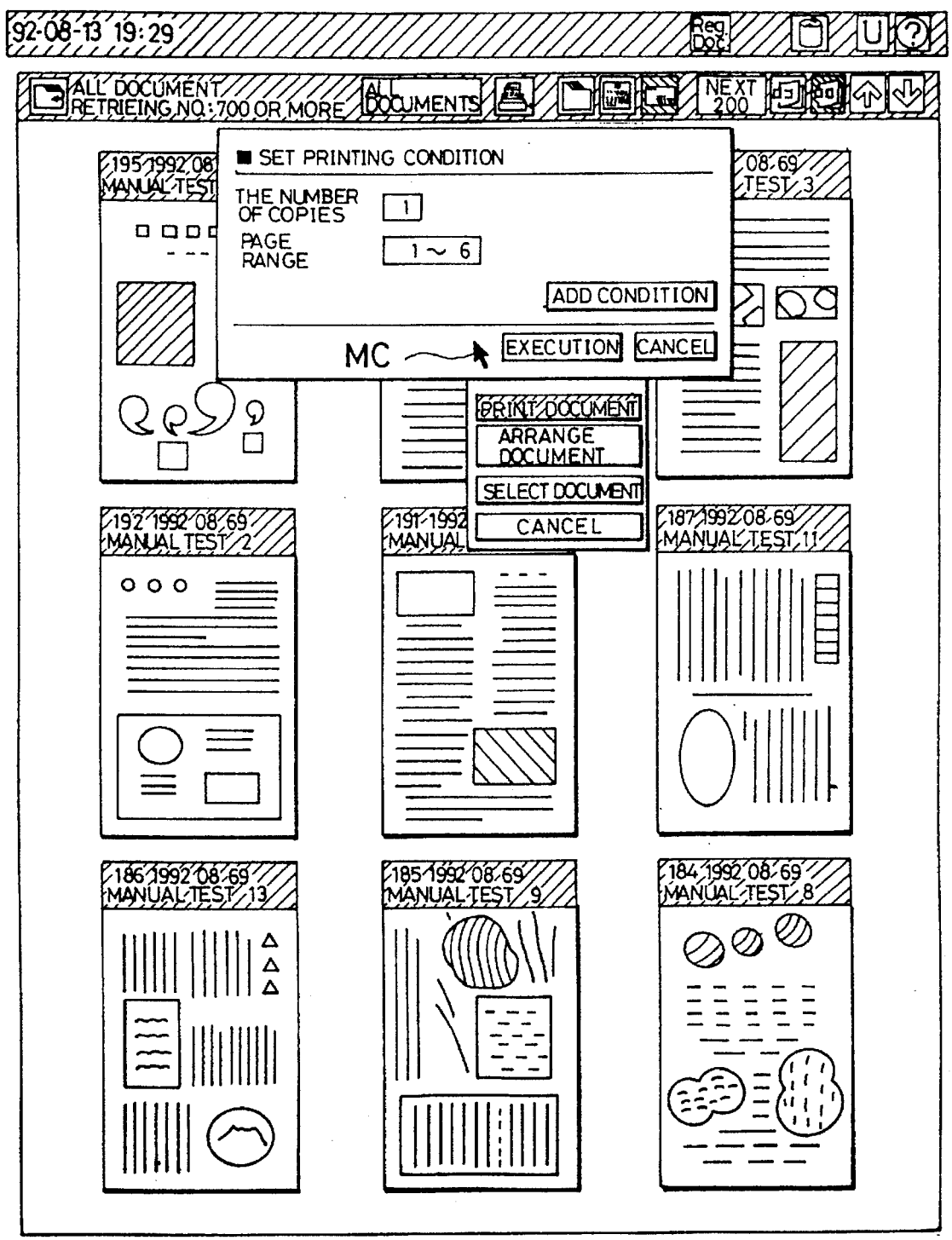
FIG. 50 is a view showing one example of a picture for setting a printing condition when "print cover list" is selected within a window shown in FIG. 49.

Thus, as shown in FIG. 50, a window for setting a printing condition is displayed on the screen. The contents of a document list displayed in FIG. 50 are different from those in FIG. 35. An operator then sets the printing condition such as the number of copies and a page range and selects execution of the printing operation.

<On-Line Help>

This electronic filing apparatus has a function for immediately displaying an explanation about the functions of a button and an icon by operator's commands when the operator cannot understand these functions in use and how to use the button and the icon. This function is called an "on-line help" function.

A help icon designated by A4 in FIG. 10 is displayed at a right-hand end of a black band portion for an icon display in an uppermost portion of any display picture for performing each of the above-mentioned operations. This help icon is shown by a question mark. When this help icon is selectively designated by the mouse, a help window for displaying explanatory information relative to operations is displayed on the screen. The explanatory information include the corresponding relation between various kinds of operations able to performed on the screen and the selections of displayed icons and buttons, etc.

Figure 51:
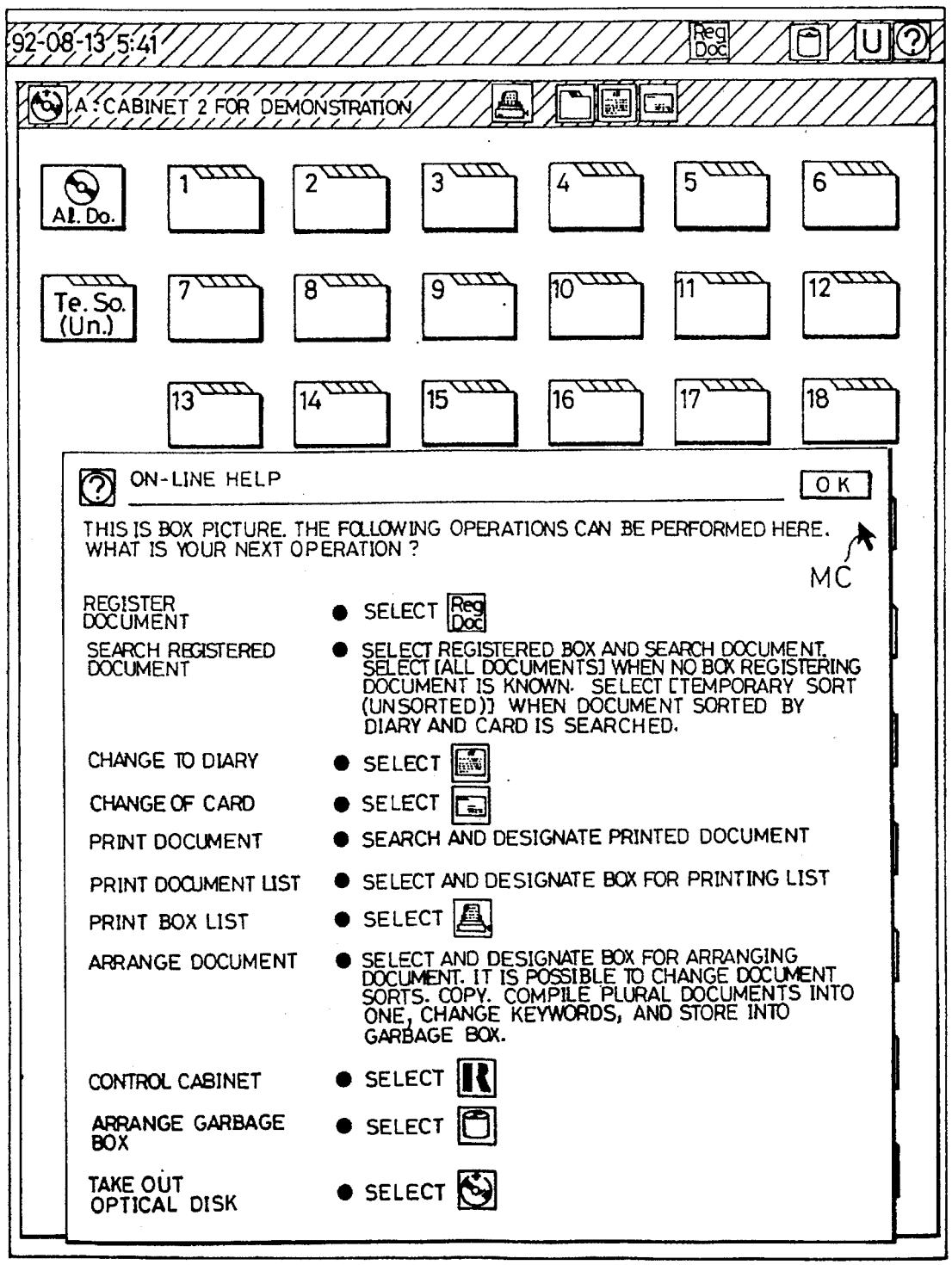
FIG. 51 is a view showing one example of an on-line help window display picture provided when a help icon is selected in the box initial picture of FIG. 7.

For example, when the help icon is selected in the initial picture of boxes shown in FIG. 7, a help window as shown in FIG. 51 is displayed on the screen. When an operator confirms contents of this help window and knows the next operation, the operator pushes a button for "OK" so that it is returned to the original picture. Thus, the operator can subsequently perform a desirable operation.

In FIG. 51, Te. So. (Un.) and A1. Do. are abbreviated forms of "temporary sort (unsorted)" and "all documents", respectively.

Accordingly, when the operator cannot understand how to perform the next operation during an operation of the electronic filing apparatus, it is not necessary for the operator to find an instruction manual each time and search and read a corresponding explanatory portion and ask another person about the next operation. Therefore, any person can simply use this electronic filing apparatus without anxiety and operating efficiency of this apparatus is improved.

When an error in operation and an internal trouble are caused in this electronic filing apparatus, an error message window is displayed on the screen. This error message window shows contents of this error and methods for coping with this error. Accordingly, it is possible to easily take a required treatment according to commands of this error message.

<On-Line Help>

This electronic filing apparatus further has a demonstration function in which an operator can learn procedures of operations according to pictures sequentially displayed on the screen.

Figure 52:
FIG. 52 is a view showing an initial picture for a demonstration.

When no magnetooptic disk is mounted onto this electronic filing apparatus and a power source is turned on, a message window as shown in FIG. 52 is displayed in an initial picture. When a button for "introduce DF-1" is selected, an operation for fulfilling the demonstration function is started.

Figure 53:
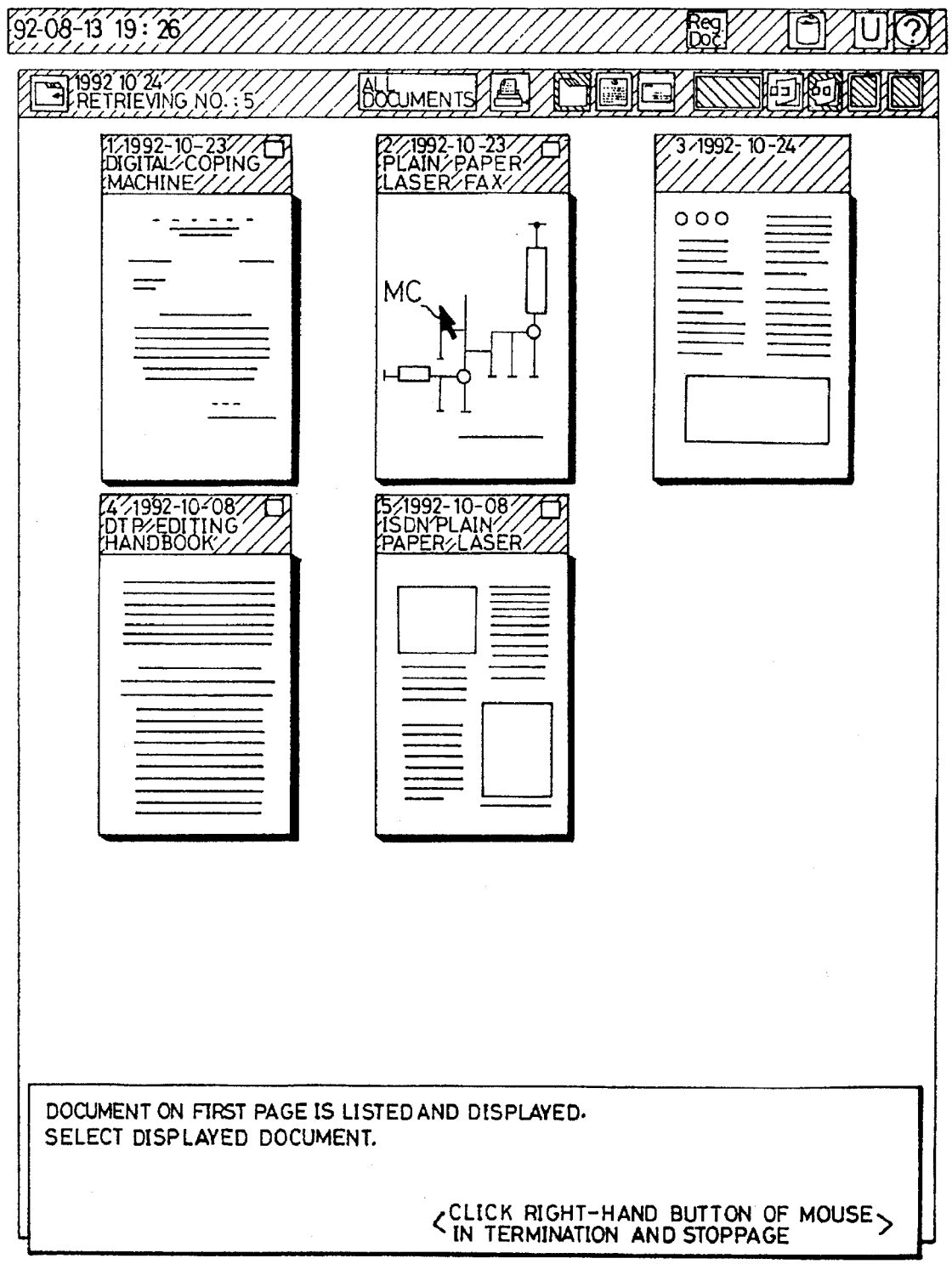
FIG. 53 is a view showing one example of a picture provided during the execution of the demonstration after "introduce DF-1" is selected in FIG. 52.
Figure 54:
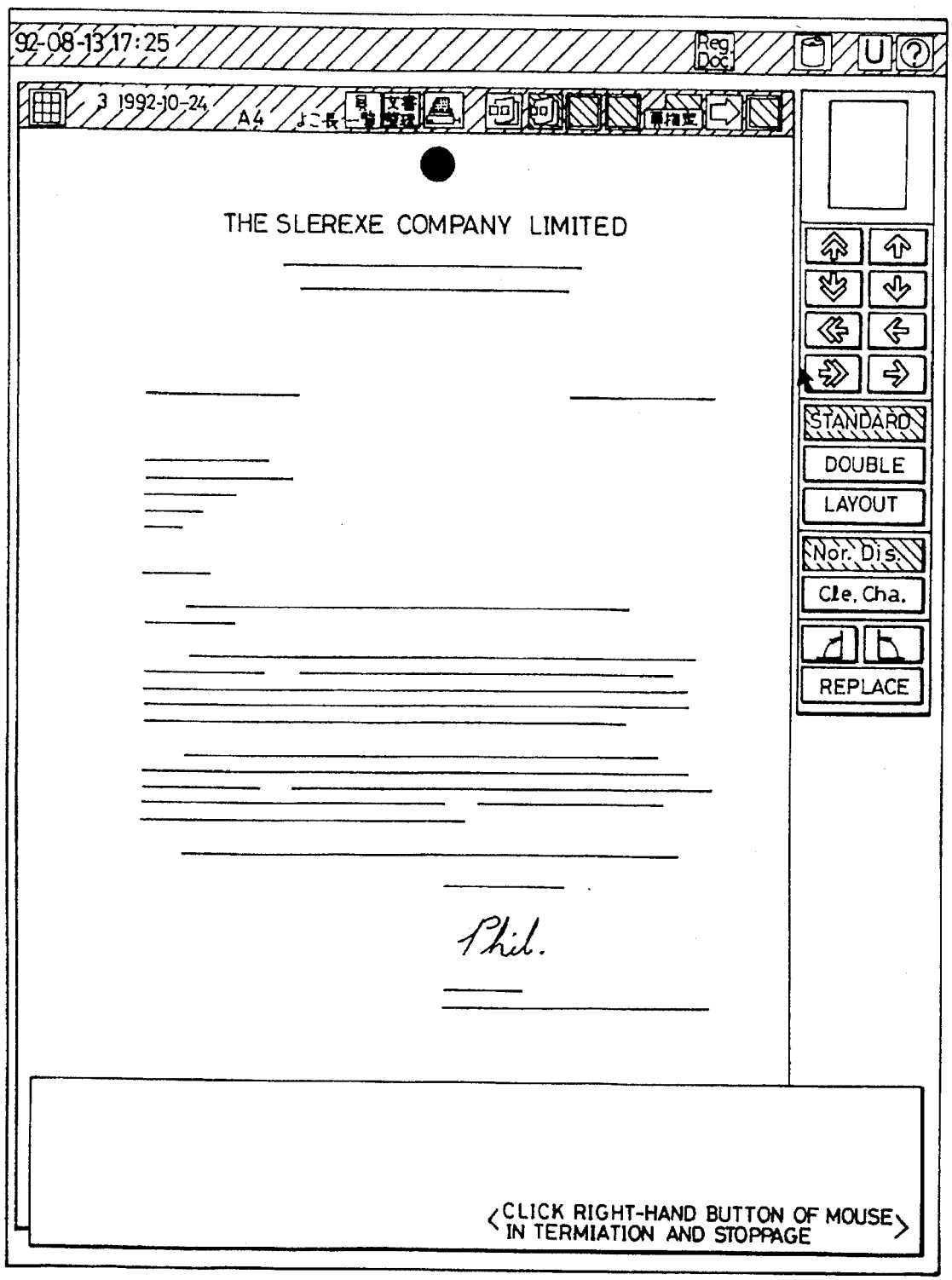
FIG. 54 is a view showing one example of a picture provided when an object document is retrieved in this demonstration.

In this display, a series of images similar to that at a real operating time with respect to operating procedures and functions in this electronic filing apparatus is sequentially displayed on the screen of a display unit in accordance with a movement of the mouse cursor. For example, FIG. 53 displays a document list during demonstration. In FIG. 53, an explanation about this document list is also displayed in a lower portion of this displayed picture. Then, the mouse cursor is moved onto a first document shown by a reduced image and this reduced image of the first document is inverted in color. Thus, a picture after document selection is displayed as shown in FIG. 35. After the mouse cursor is moved onto a button for "see" within a command window displayed in FIG. 35, a picture shown in FIG. 54 is displayed on the screen. This picture shows an image of the selected document on a first page thereof at an approximately equal magnification.

The abbreviated forms shown in FIG. 54 are respectively defined as follows.

Std. - - - standard

Dob. - - - double

Lay. - - - layout

Nor. Dis. - - - normal display

Cle. Char. - - - clear character

Rep. - - - replace

The above demonstration is divided into two demonstrations for register and retrieval. For example, a series of image data for display and program data with respect to these two demonstrations is stored into the built-in RAM 107 or the hard disk 127 shown in FIG. 4 in advance.

When this demonstration function is used, explanations about functions and operations of the electronic filing apparatus are understood easily and clearly when this electronic filing apparatus is made public, exhibited, sold, etc. Further, when a user first uses this electronic filing apparatus, the user can understand these explanations very easily.

Explanation of Processings by Flow Charts

Flow charts of various kinds of processings of the electronic filing apparatus in this embodiment will next be explained.

Figure 55:
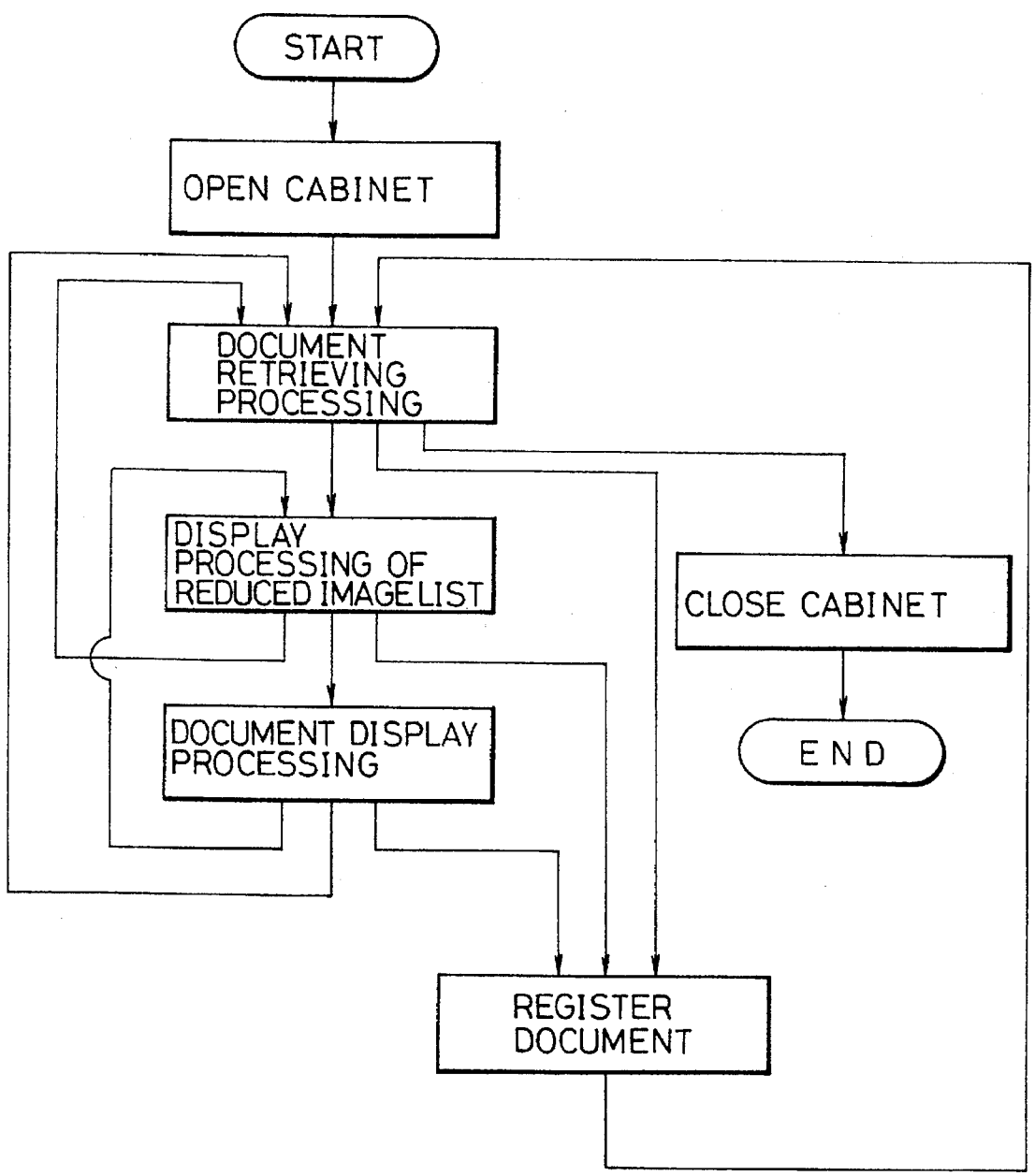
FIG. 55 is a flow chart showing an entire flow of main processings in the electronic filing apparatus shown in FIGS. 3 and 4.

FIG. 55 shows an entire flow of main processings of the electronic filing apparatus. After a cabinet is opened, document retrieving processing, reduced image list processing and document display processing are sequentially executed. Otherwise, the document retrieving processing is switched to document register processing, or the cabinet is closed. Thereafter, the processings of this flow chart are terminated.

Figure 56:
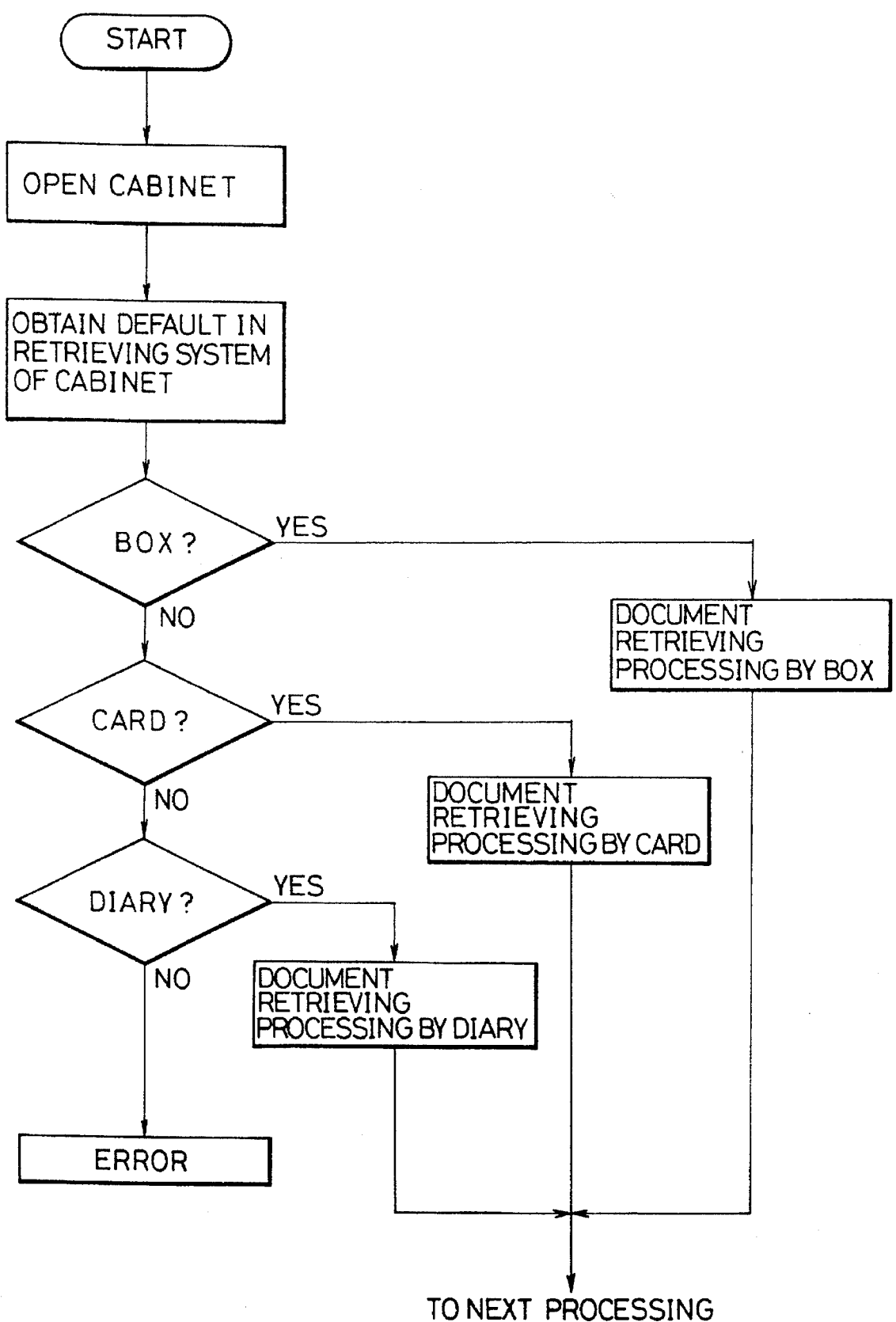
FIG. 56 is a flow chart showing document retrieving processing shown in FIG. 55 in detail.

FIG. 56 is a flow chart showing detailed contents of the document retrieving processing from the cabinet open in FIG. 55.

In FIG. 56, the cabinet is opened and a default of a retrieving system of the cabinet is obtained. Then, it is sequentially judged whether a sorting method is set to a box, a card or a diary. When the box is selected, the document retrieving processing is executed by the box. When the card is selected, the document retrieving processing is executed by the card. When the diary is selected, the document retrieving processing is executed by the diary. Thereafter, the next processings are executed. In contrast to this, when the box, the card and the diary are not selected, an error in selection is considered to be caused so that processings for this error are started.

Figure 57:
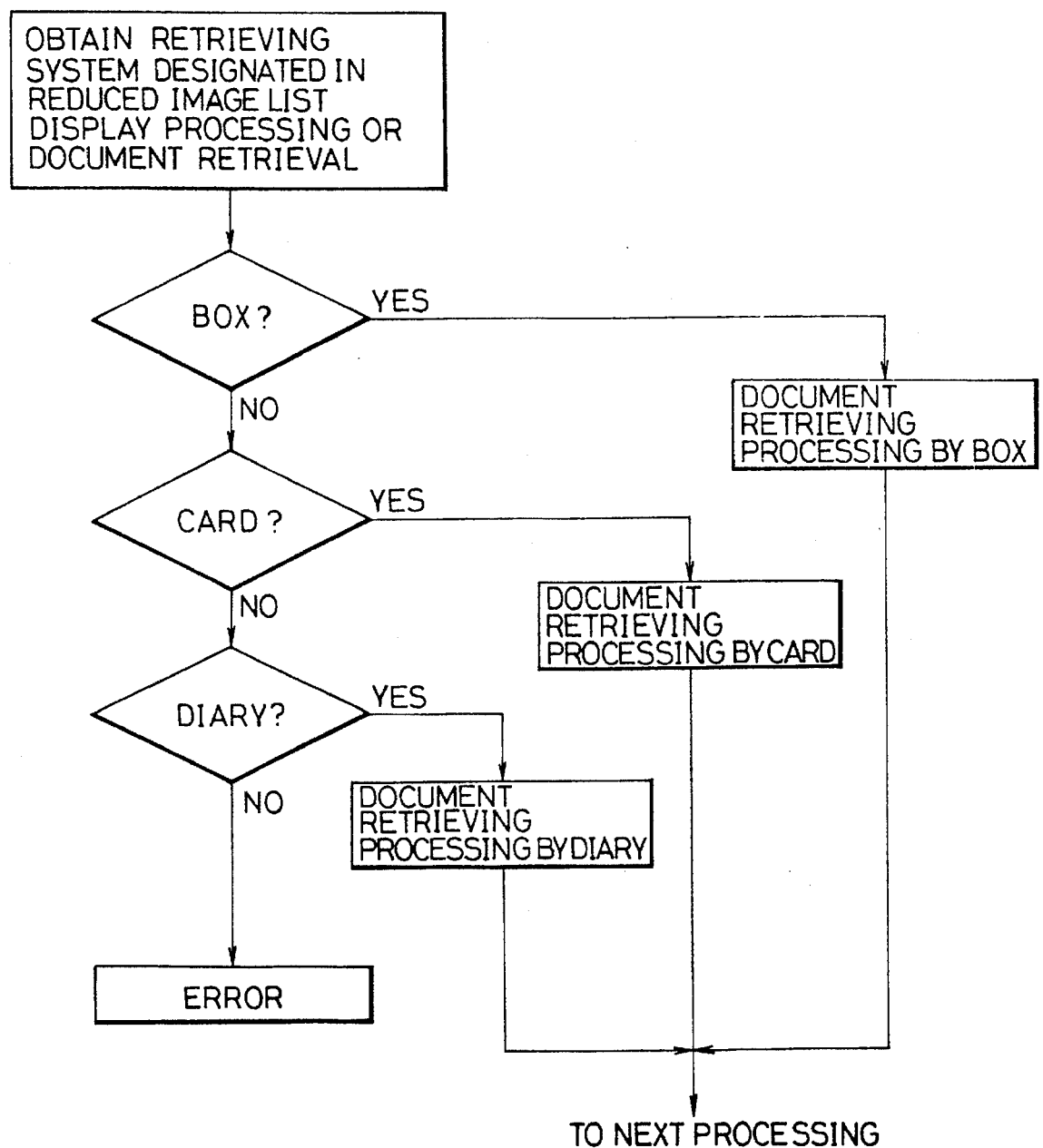
FIG. 57 is a flow chart showing processings of the electronic filing apparatus when another retrieving system in a sorting-retrieving method is selected during a reduced image list display or document retrieval described later.

FIG. 57 is a flow chart showing processings provided when another retrieving system is selected as a sorting-retrieving method during a reduced image list display or document retrieval described later. In this case, the retrieving system is obtained by selecting any one of the icons of a box, a card and a diary mentioned above. Subsequent judgments and the document retrieving processing in each of the retrieving systems are similar to those in the above case of FIG. 56.

Figure 58:
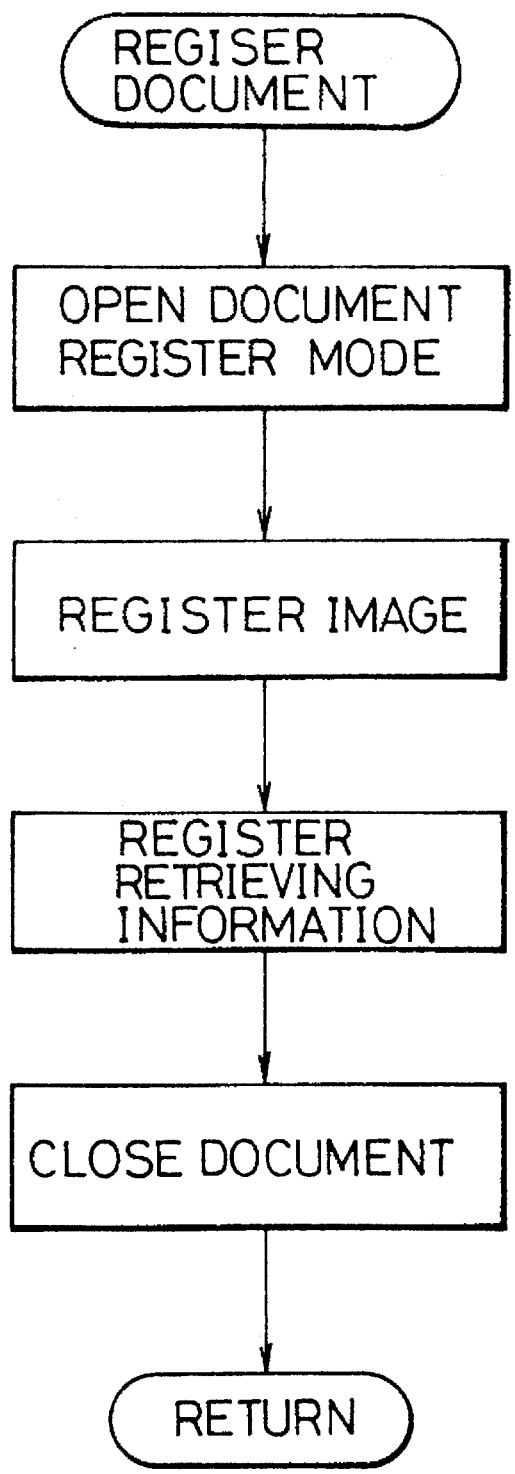
FIG. 58 is a flow chart showing processing contents of the electronic filing apparatus in "register document" in FIG. 55.

FIG. 58 is a flow chart showing processing contents of the document register in FIG. 55. At a time of this document register, a document register mode is set and an image read by the scanner is registered to a disk. Further, retrieving information is also registered to this disk and the document is closed.

Figure 59:
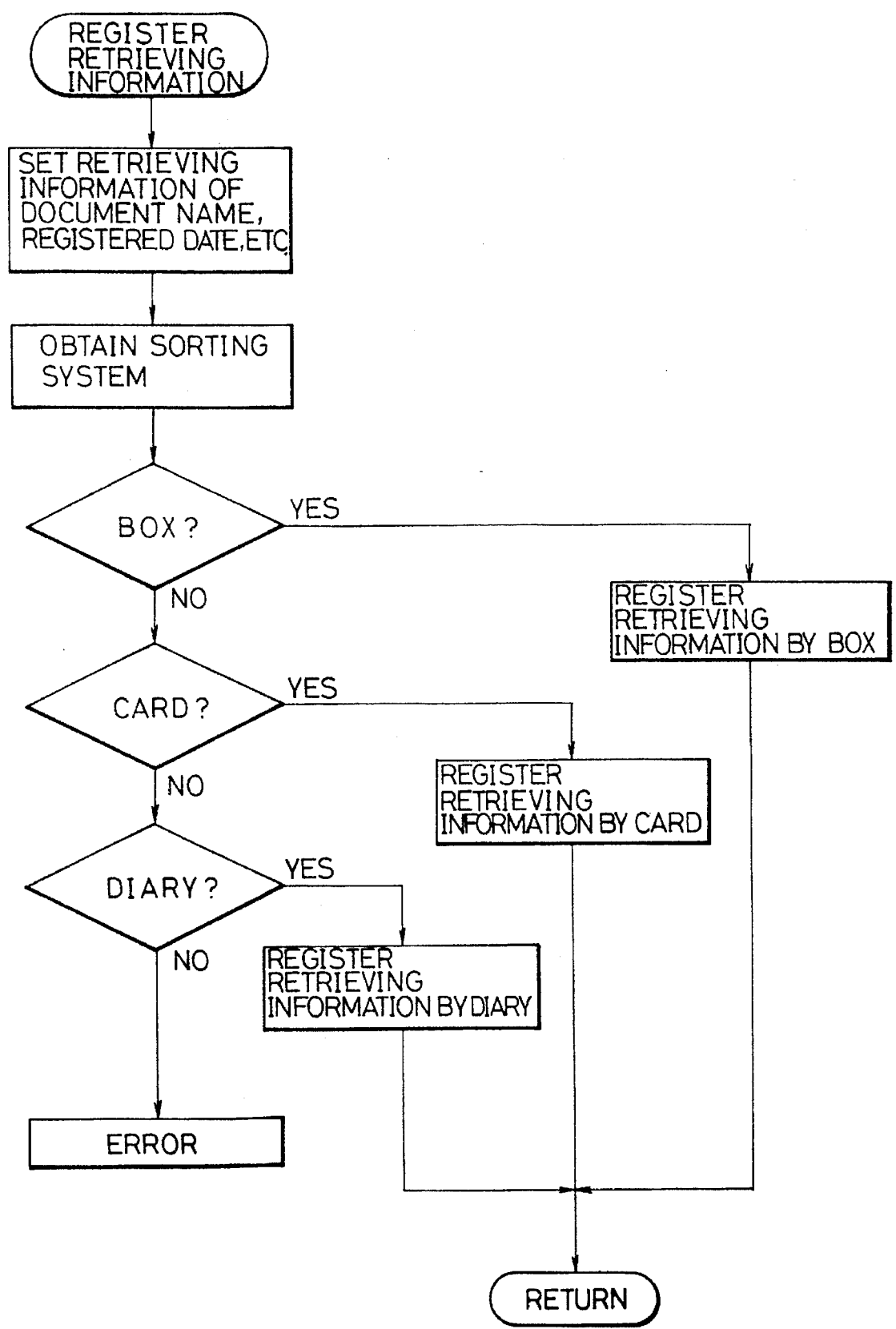
FIG. 59 is a flow chart showing processing contents of the electronic filing apparatus in "register retrieved information" in FIG. 58.

FIG. 59 is a flow chart showing processing contents of the retrieving information register in FIG. 58. In this processing, retrieving information such as document names, register dates, etc. is set to obtain a sorting system. Then, it is sequentially judged whether a sorting method is set to a box, a card or a diary. If the box is selected, the retrieving information is registered by the box. If the card is selected, the retrieving information is registered by the card. If the diary is selected, the retrieving information is registered by the diary. It is then returned to the processing routine of FIG. 58. When one of a box, a card and a diary is not selected, an error in selection is considered to be caused so that processings for this error are started.

FIG. 60 is an explanatory view showing a constructional example of document information registered to a magnetooptic disk. As shown in FIG. 60, each of registered documents is marked with a document number. Further, registered year, month and day, a document name, a box number, a card number and a diary date are registered to each of the registered documents.

Figure 61:
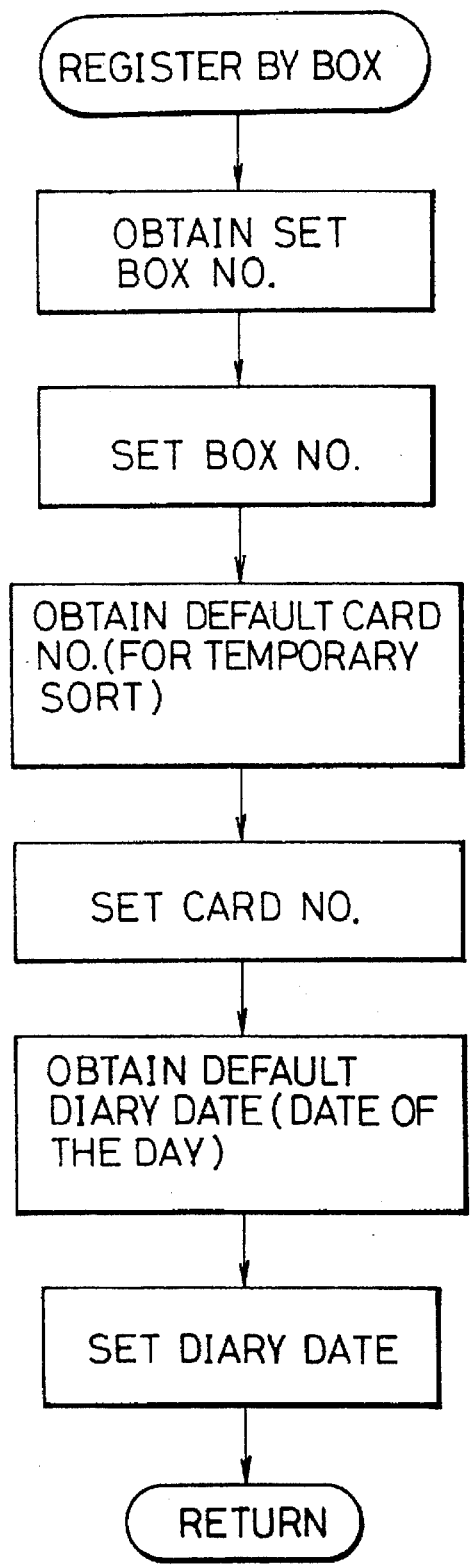
FIG. 61 is a flow chart showing processing contents of the electronic filing apparatus in "register retrieved information in box" in FIG. 59.

FIG. 61 is a flow chart showing processing contents of the retrieving information register in a box in FIG. 59. In this case, a set box number is obtained and set to a box number. A default card number as a card number for temporary sort is obtained and set to a card number. Next, a default diary date as a date of the day is obtained and set to a diary date.

Figure 62:
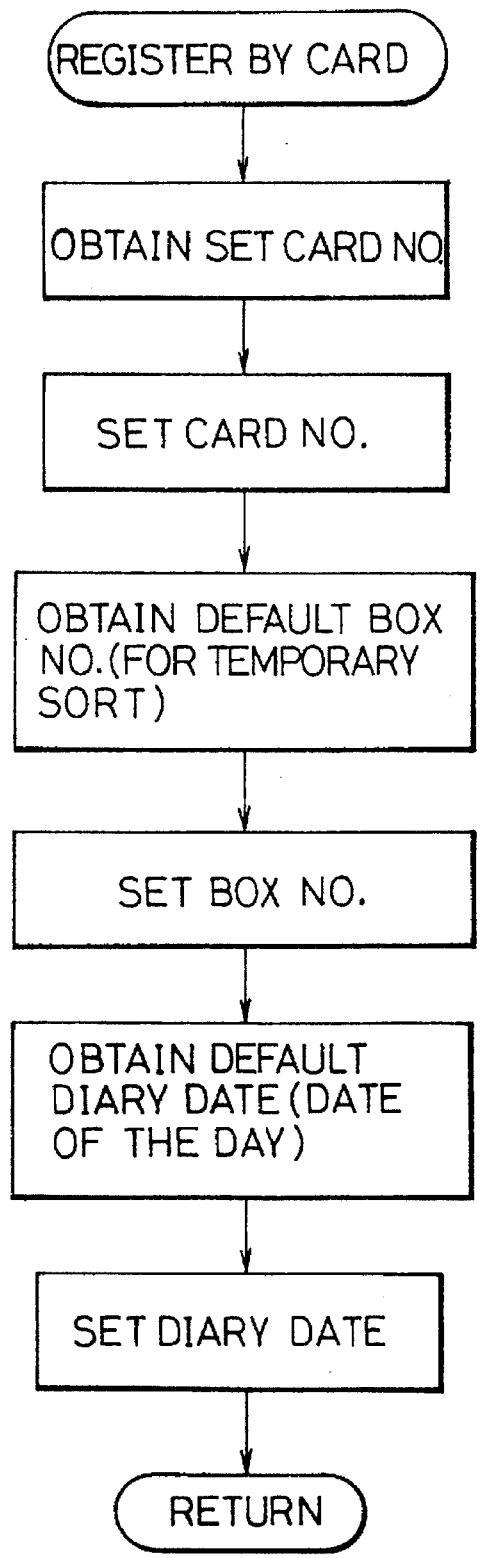
FIG. 62 is a flow chart showing processing contents of the electronic filing apparatus in "register retrieved information in card" in FIG. 59.

FIG. 62 is a flow chart showing processing contents of the retrieving information resister by a card in FIG. 59. In this case, a set card number is obtained and set to a card number. A default box number as a box number for temporary sort is obtained and set to a box number. Next, a default diary date as a date of the day is obtained and set to a diary date.

Figure 63:
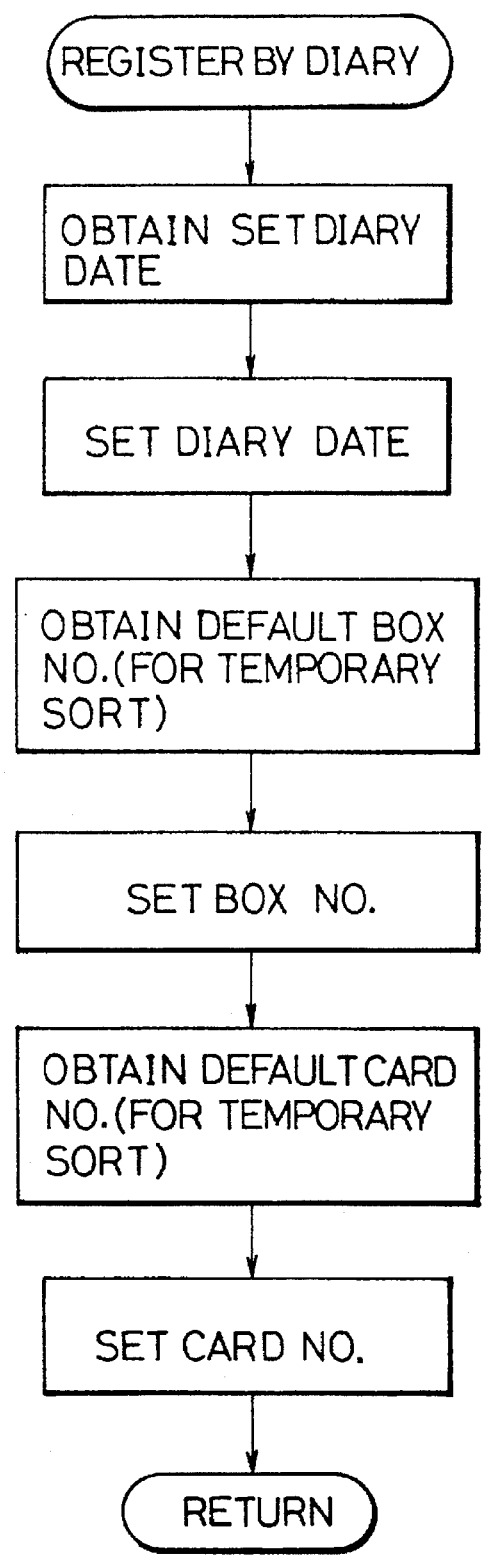
FIG. 63 is a flow chart showing processing contents of the electronic filing apparatus in "register retrieved information in diary" in FIG. 59.

FIG. 63 is a flow chart showing processing contents of the retrieving information register by a diary in FIG. 59. In this case, a set diary date is obtained and set to a diary date. A default box number as a box number for temporary sort is obtained and set to a box number. Next, a card number for temporary sort is obtained and set to a card number.

Figure 64:
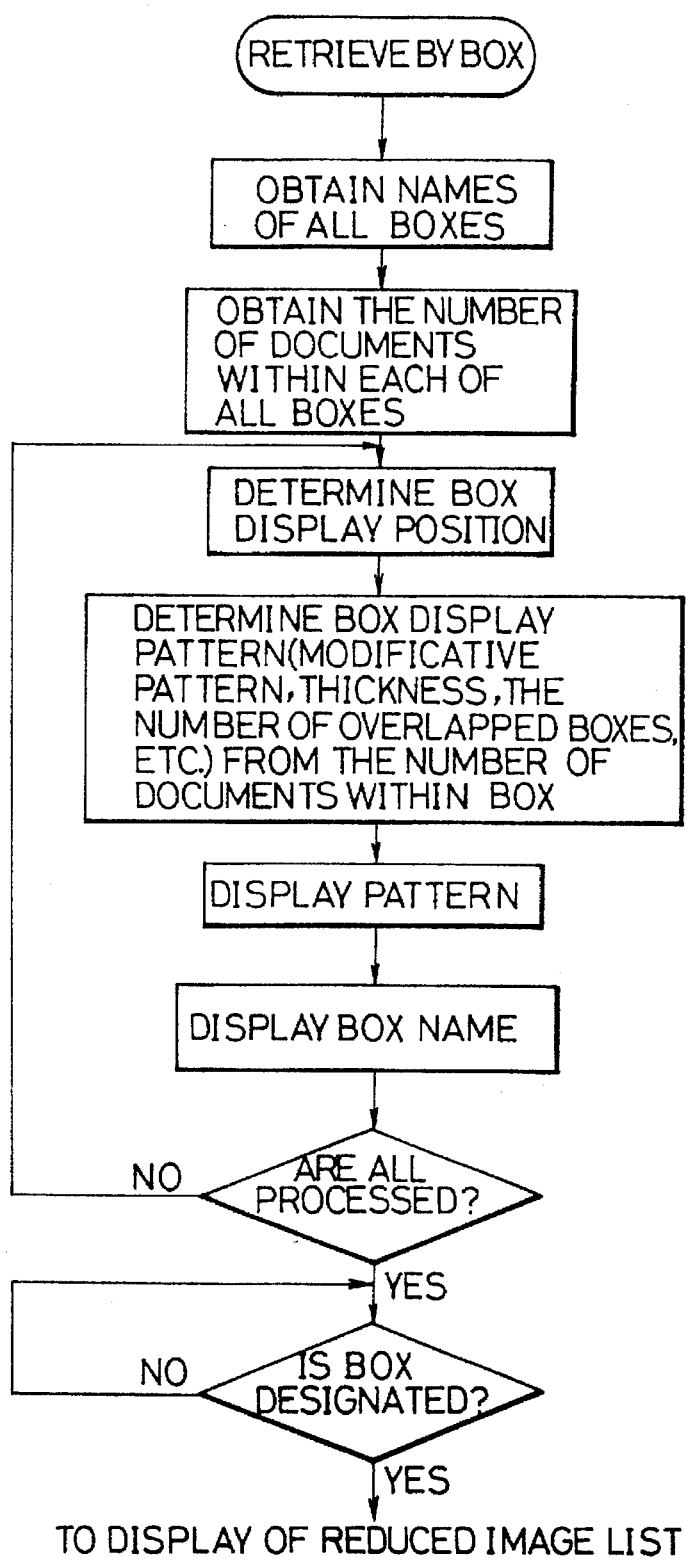
FIG. 64 is a flow chart showing contents of "document retrieving processing in box" in FIG. 57.

FIG. 64 is a flow chart showing contents of the document retrieving processing by a box in FIG. 57. In this document retrieving processing, names of all boxes and the number of documents within each of the boxes are obtained. Then, a box display position is determined and a box display pattern is determined from the number of documents within each of the boxes. This box display pattern is a modificative pattern showing the thickness of a box or the number of overlapped boxes, etc. This box display pattern and a box name are displayed. The above processings are performed with respect to all the boxes, and box display patterns and box names are displayed. Thereafter, if a box is designated, reduced image list processing is started.

Figure 65:
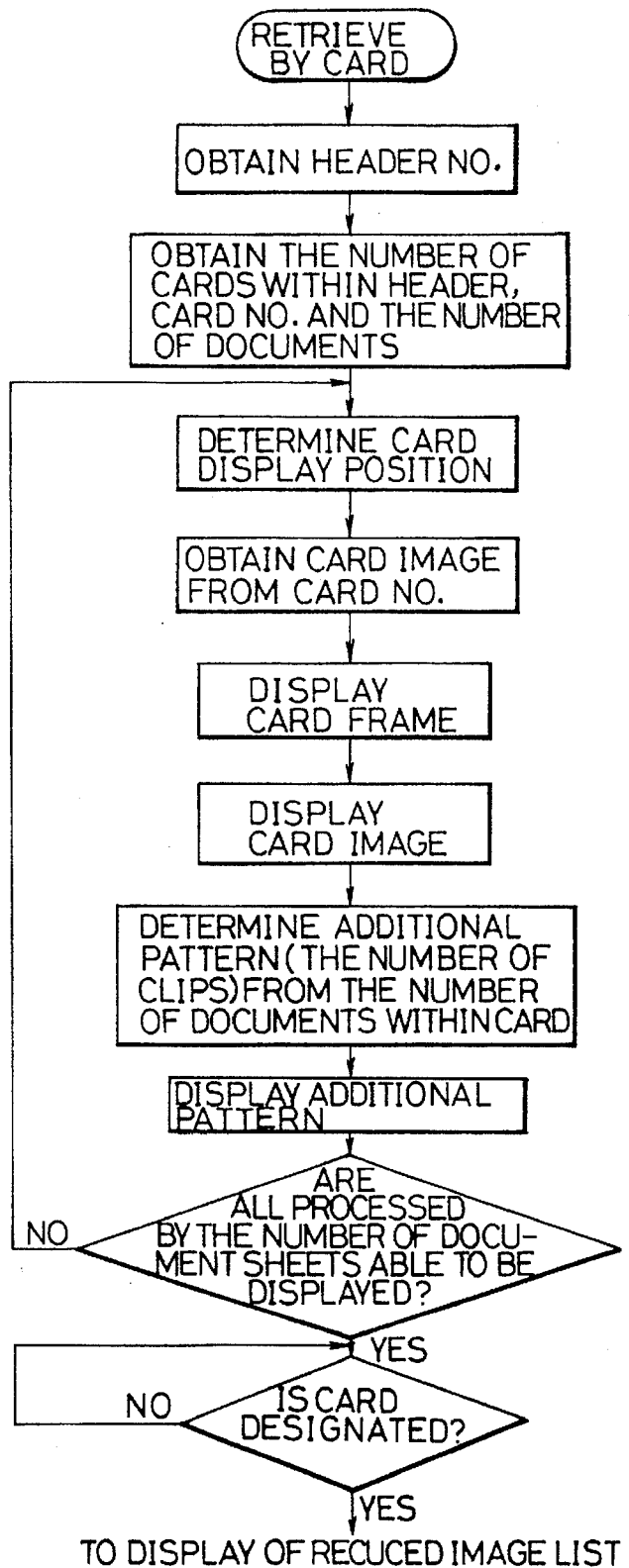
FIG. 65 is a flow chart showing contents of "document retrieving processing in card" in FIG. 57.

FIG. 65 is a flow chart showing contents of the document retrieving processing by a card in FIG. 57. In this document retrieving processing, a header number, the number of cards within a header, a card number and the number of documents are obtained. A card display position is determined and a card image is obtained from the card number. A card frame and the card image are then displayed on the screen. Further, the number of additional patterns as clip patterns is determined from the number of documents within the card. These additional patterns are displayed on the screen. After this document retrieving processing has been performed with respect to all documents able to be displayed on the screen, a reduced image list display is started if a card is designated.

Figure 66:
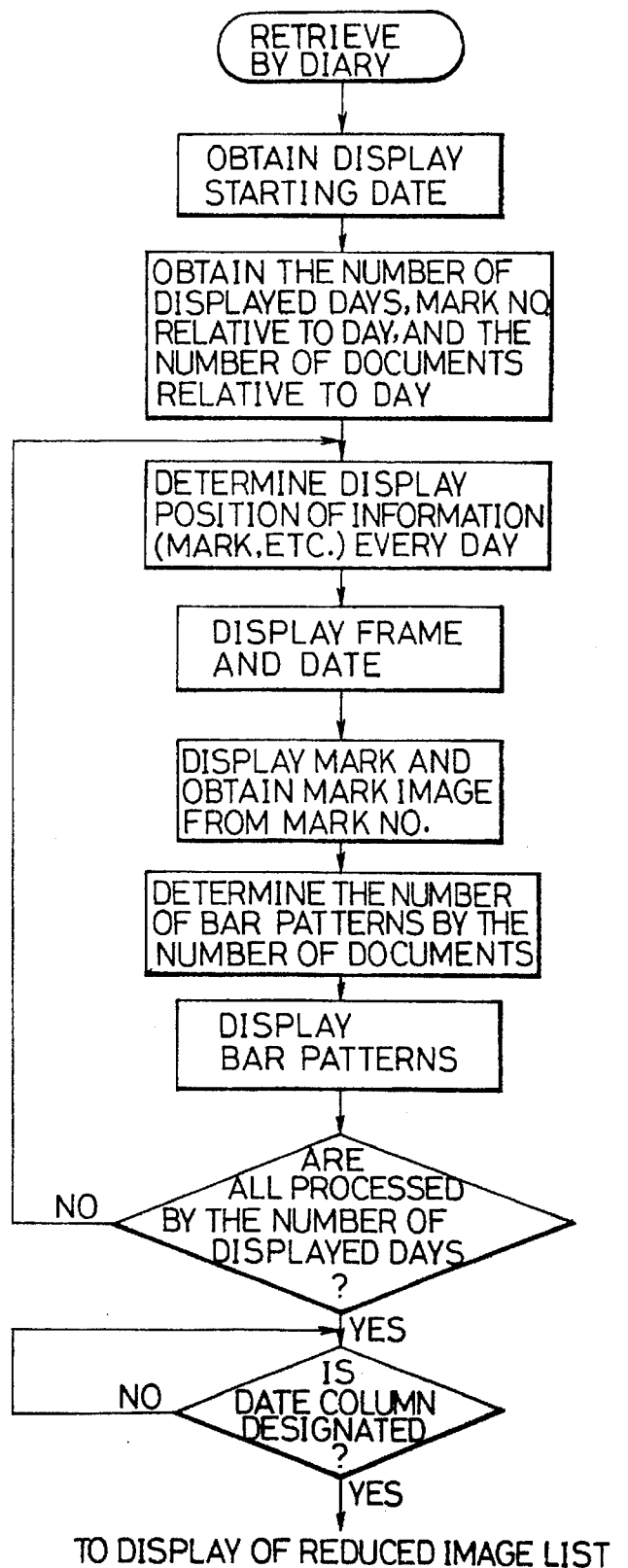
FIG. 66 is a flow chart showing contents of "document retrieving processing in diary" in FIG. 57.

FIG. 66 is a flow chart showing contents of the document retrieving processing by a diary in FIG. 57. In this document retrieving processing, a display starting date, the number of displayed days, mark numbers relative to days and the number of documents relative to days are obtained. Then, a display position of information such as marks every date is determined and a frame and a date are displayed on the screen. A mark image is obtained from a mark number and a diary mark is displayed. The number of bar patterns is determined by the number of documents and bar patterns corresponding to this bar pattern number are displayed. After this document retrieving processing has been performed with respect to all displayed days, a reduced image list display is started if a date column is designated.

Figure 67A:
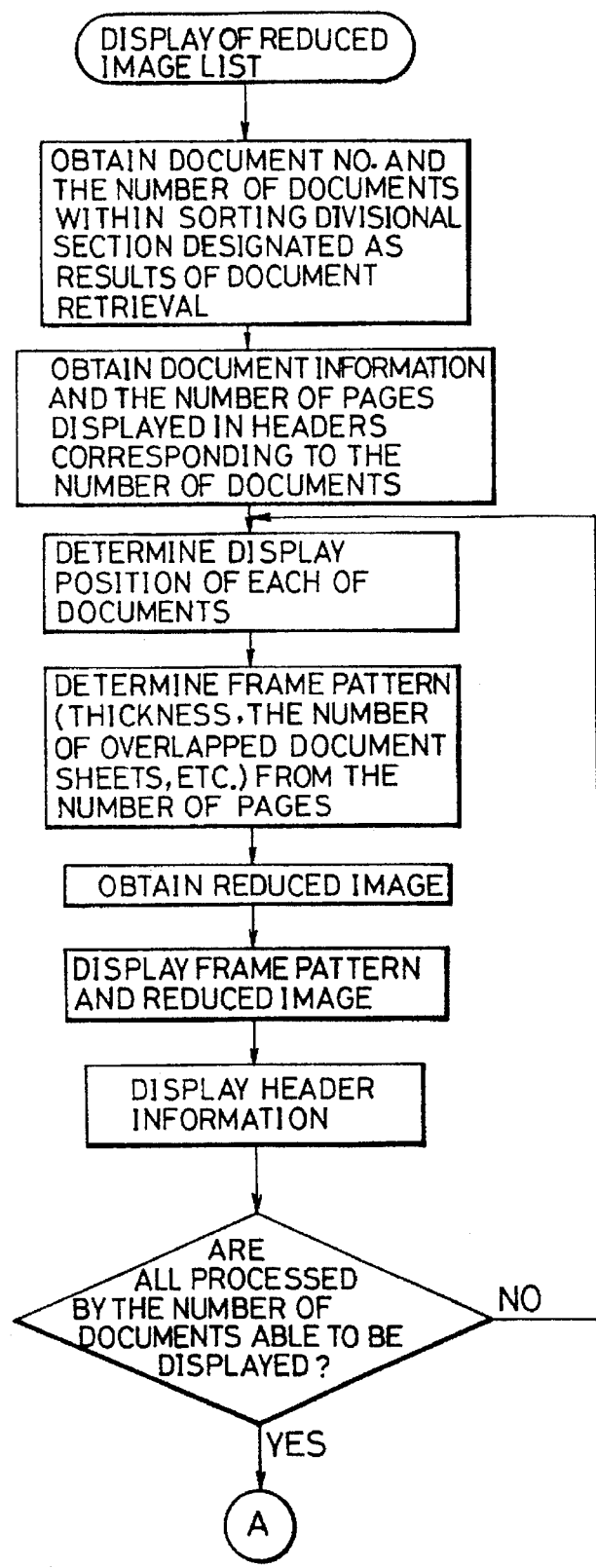
FIGS. 67(A) and 67(B) are a flow chart showing contents of "reduced image list display processing" in FIG. 55.
Figure 67B:
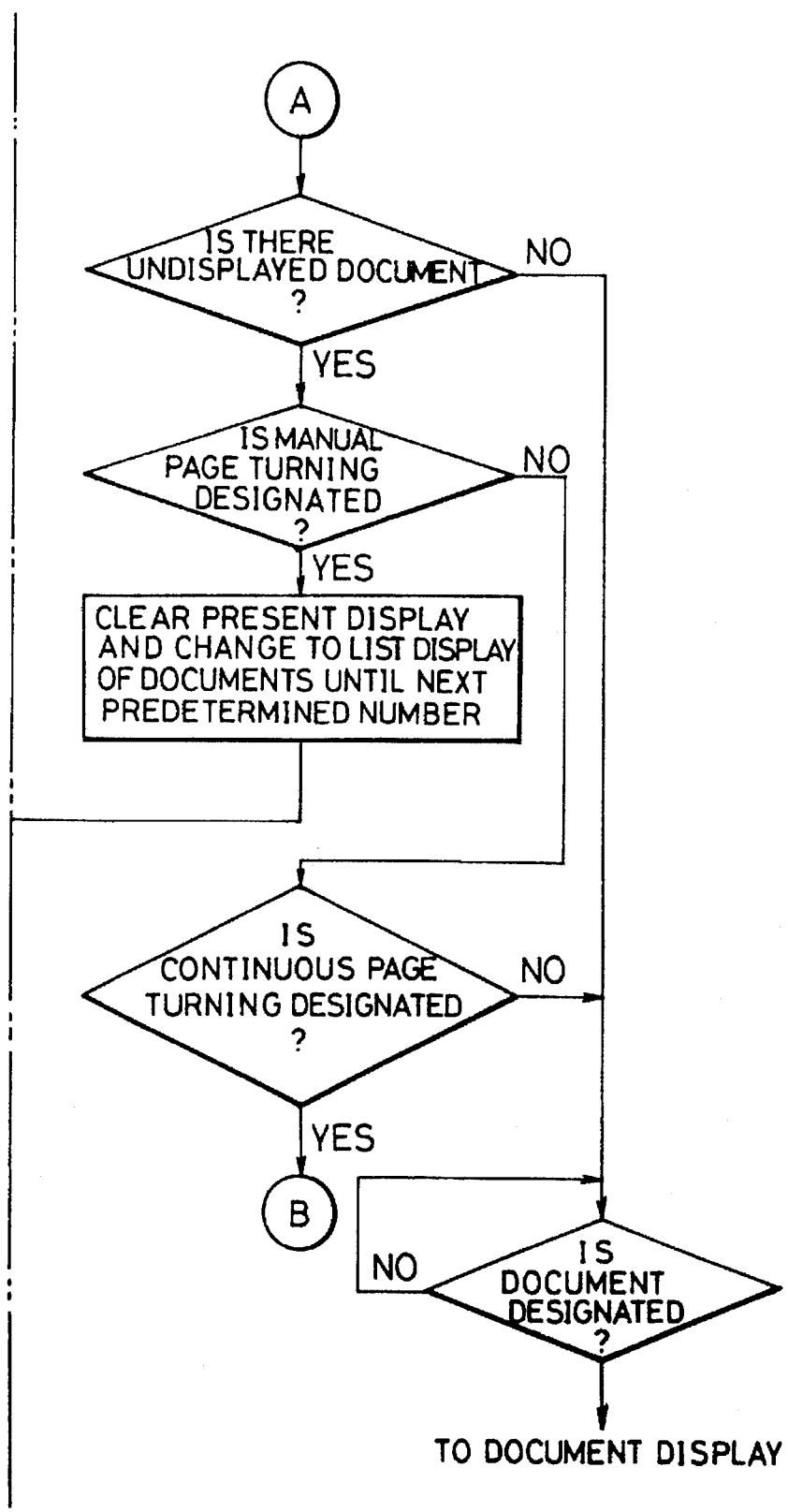
Figure 68:
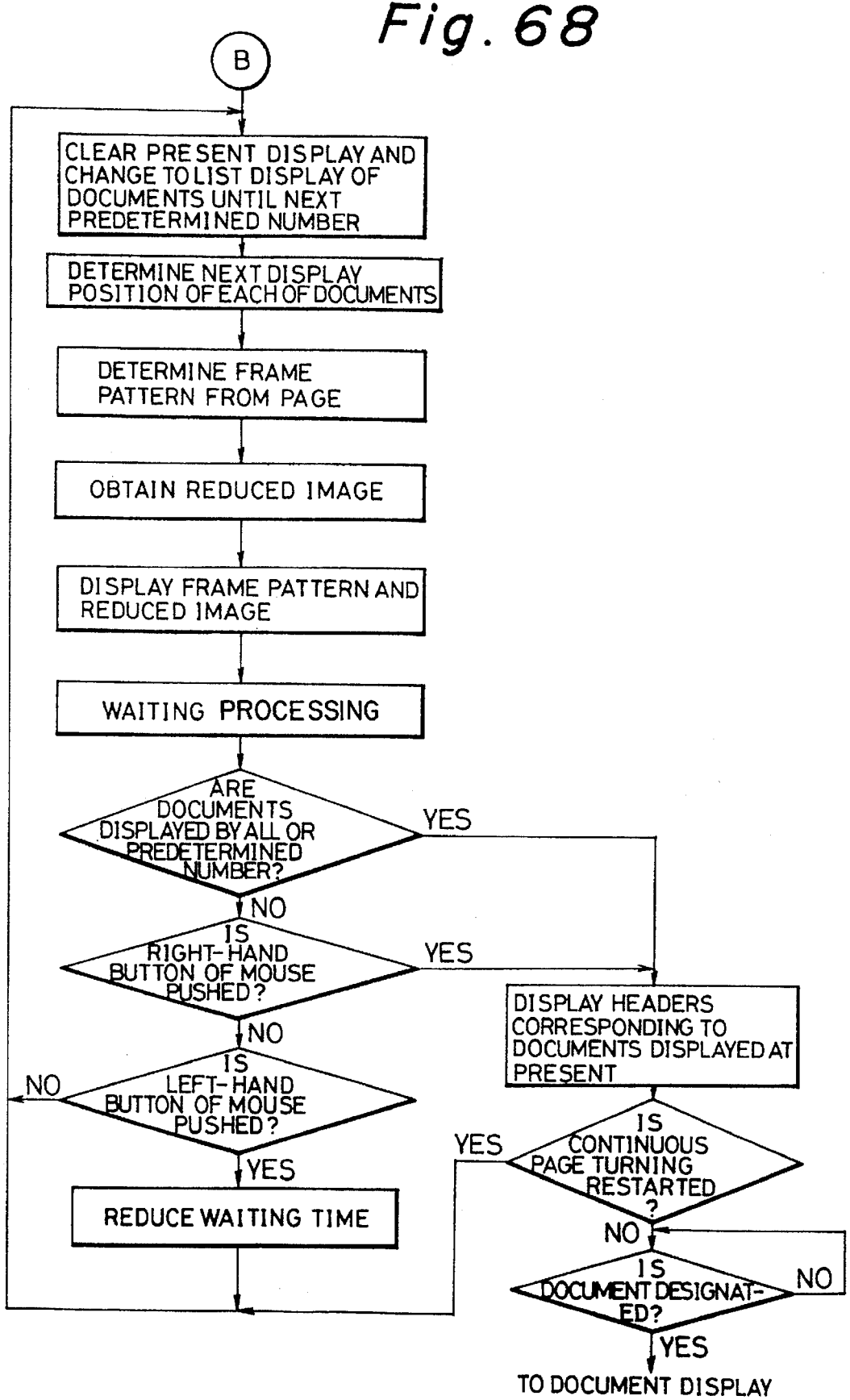
FIG. 68 is a flow chart continuous to the flow chart shown in FIG. 67.

FIGS. 67(A) and 67(B) and 68 are flow charts showing contents of the reduced image list display processing in FIG. 53.

In this processing, as shown in FIG. 67(A) and 67(B), a document number and the number of documents within a sorting divisional section designated as results of document retrieval are obtained. Further, the number of pages and document information displayed in headers corresponding to the number of documents are obtained. Then, a display position of each of the documents is determined and a frame pattern is determined from the number of pages. The frame pattern is shown by a frame thickness or the number of overlapped document sheets, etc. Then, a reduced image is obtained and the frame pattern, the reduced image and a header are displayed on the screen.

When all documents able to be displayed on the screen have been displayed, it is judged whether there is an undisplayed document or not. If there is no undisplayed document, the electronic filing apparatus waits for document designation. In contrast to this, when there is an undisplayed document, it is judged whether a manual page turning operation is designated or not. If the manual page turning operation is designated, the present display is cleared and documents are listed and displayed until the next predetermined document number. In contrast to this, if no manual page turning operation is designated, it is judged whether a continuous page turning operation is designated or not.

If no continuous page turning operation is designated, the electronic filing apparatus waits for document designation as it is. In contrast to this, if the continuous page turning operation is designated, it proceeds to "B" of FIG. 68. In FIG. 68, a picture display on the present page is cleared and documents are listed and displayed on the screen until the next predetermined number. Then, the next display position of each of the documents is determined and a frame pattern is determined from the number of pages. A reduced image is obtained and the frame pattern and the reduced image are displayed on the screen. At this time, no header is displayed on the screen.

After waiting processing is then performed, it is judged whether documents corresponding to a document number such as all or a predetermined document number are displayed or not. If this judgment is YES, headers corresponding to the documents displayed on the screen at present are displayed. Further, it is judged whether the continuous page turning operation is restatted or not. If the continuous page turning operation is restatted, it is returned to the above "B" and the above-mentioned processings are repeated. In contrast to this, when no continuous page turning operation is restatted, the electronic filing apparatus waits for document designation.

If no documents corresponding to the document number are displayed in the above case, it is next judged whether the right-hand button of the mouse is pushed or not. If this judgment is YES, it proceeds to the same processing as the case in which documents corresponding to the document number are displayed. In contrast to this, if this judgment is NO, it is next judged whether the left-hand button of the mouse is pushed or not. If this judgment is NO, it is returned to the above "B" as it is, and a document list display on the next page is started. In contrast to this, if this judgment is YES, a waiting time is shortened and it is returned to the above "B" and a document list display on the next page is started.

In each of FIGS. 67 and 68, if a document is designated in a document designation standby state, it proceeds to the document display processing of FIG. 55.

Figure 69:
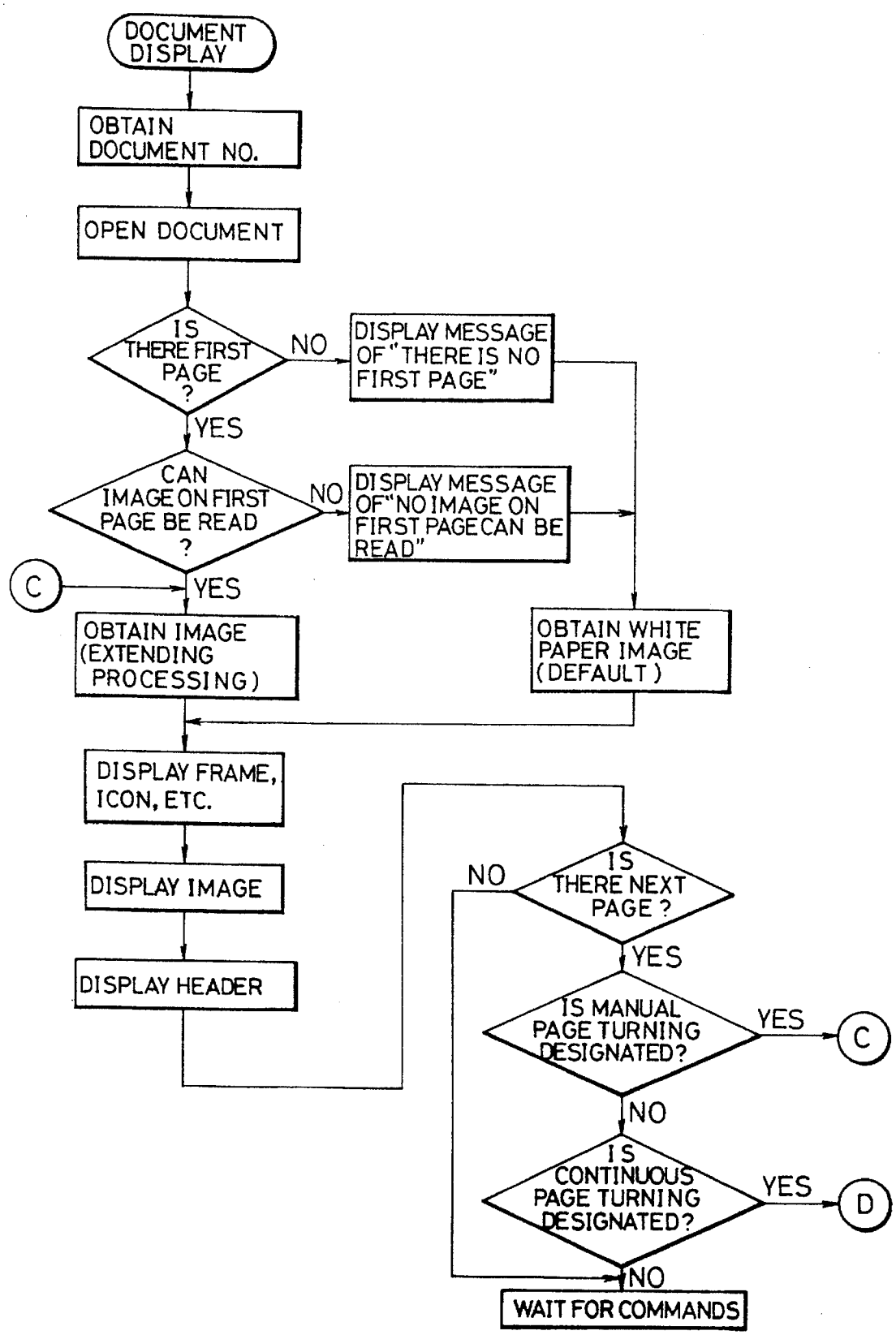
FIG. 69 is a flow chart showing contents of "document display processing" in FIG. 55.
Figure 70:
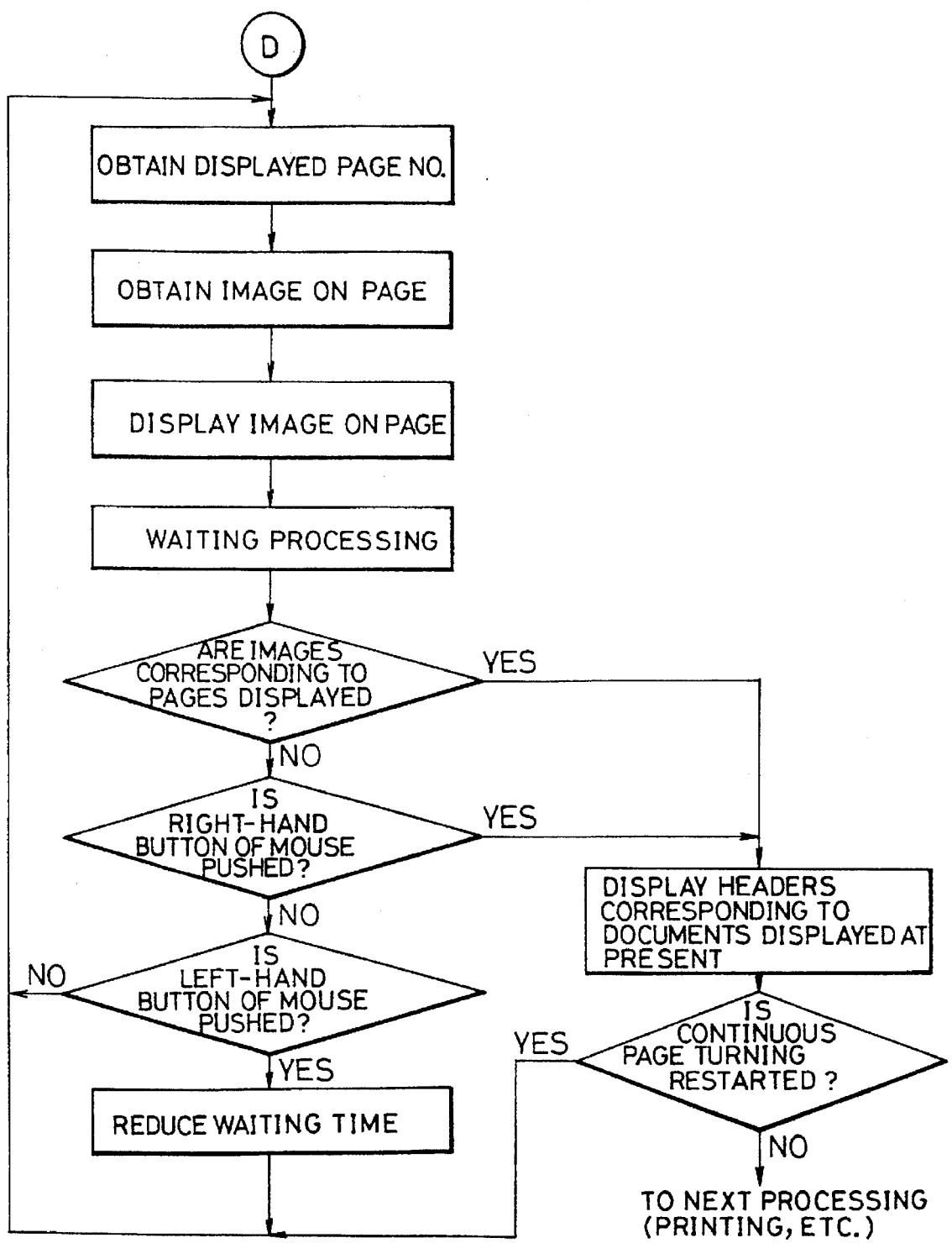
FIG. 70 is a flow chart continuous to the flow chart shown in FIG. 69.

FIGS. 69 and 70 are flow charts showing contents of the document display processing in FIG. 55. As shown in FIG. 69, a document number is obtained and a document is opened. It is then judged whether there is a first page of this document or not. If there is no first page, the electronic filing apparatus displays a message of "there is no first page". In contrast to this, if there is the first page, it is next judged whether an image on the first page can be read or not. If this image cannot be read, the electronic filing apparatus displays a message of "no image on first page can be read".

When there is no first page or no image on the first page can be read, a white paper image as a default is obtained after the above messages are displayed.

In contrast to this, when there is the first page and the image on the first page can be read, this image is obtained and extended. Then, similar to the above case for obtaining the white paper image, a frame, icons, etc. are displayed on the screen and an image and a header are then displayed.

If is next judged whether there is the next page or not. If there is no next page, the electronic filing apparatus immediately attains a designation standby state. In contrast to this, when there is the next page, it is judged whether a manual page turning operation or a continuous page turning operation is designated. If these page turning operations are not designated, the electronic filing apparatus immediately attains a designation standby state.

In contrast to this, if the manual page turning operation is designated, it is returned to the above "C" of FIG. 69. Then, similar to the above-mentioned case, processings for displaying an image on the next page are performed. When the continuous page turning operation is designated, it proceeds to "D" of FIG. 70. In FIG. 70, a displayed page number is obtained and an image on this displayed page is obtained and displayed on the screen. It is then judged whether documents corresponding to page numbers are displayed or not after processings for a waiting time. If this judgment is YES, headers of the documents displayed at present are displayed and it is judged whether the continuous page turning operation is restatted or not. If the continuous page turning operation is restatted, it is returned to the above "D" and the above-mentioned processings are repeated. In contrast to this, when no continuous page turning operation is restatted, it proceeds to the next processing of printing, etc.

If no documents corresponding to page numbers are displayed in the above case, it is judged whether the right-hand button of the mouse is pushed or not. If this judgment is YES, it proceeds to the same processings as the case in which the documents corresponding to page numbers are displayed. In contrast to this, if this judgment is NO, it is judged whether the left-hand button of the mouse is pushed or not. If this judgment is NO, it is returned to the above "D" as it is, and a document list display on the next page is started. In contrast to this, if this judgment is YES, a waiting time is shortened and it is returned to the above "D" and a document list display on the next page is started.

Figure 71A:
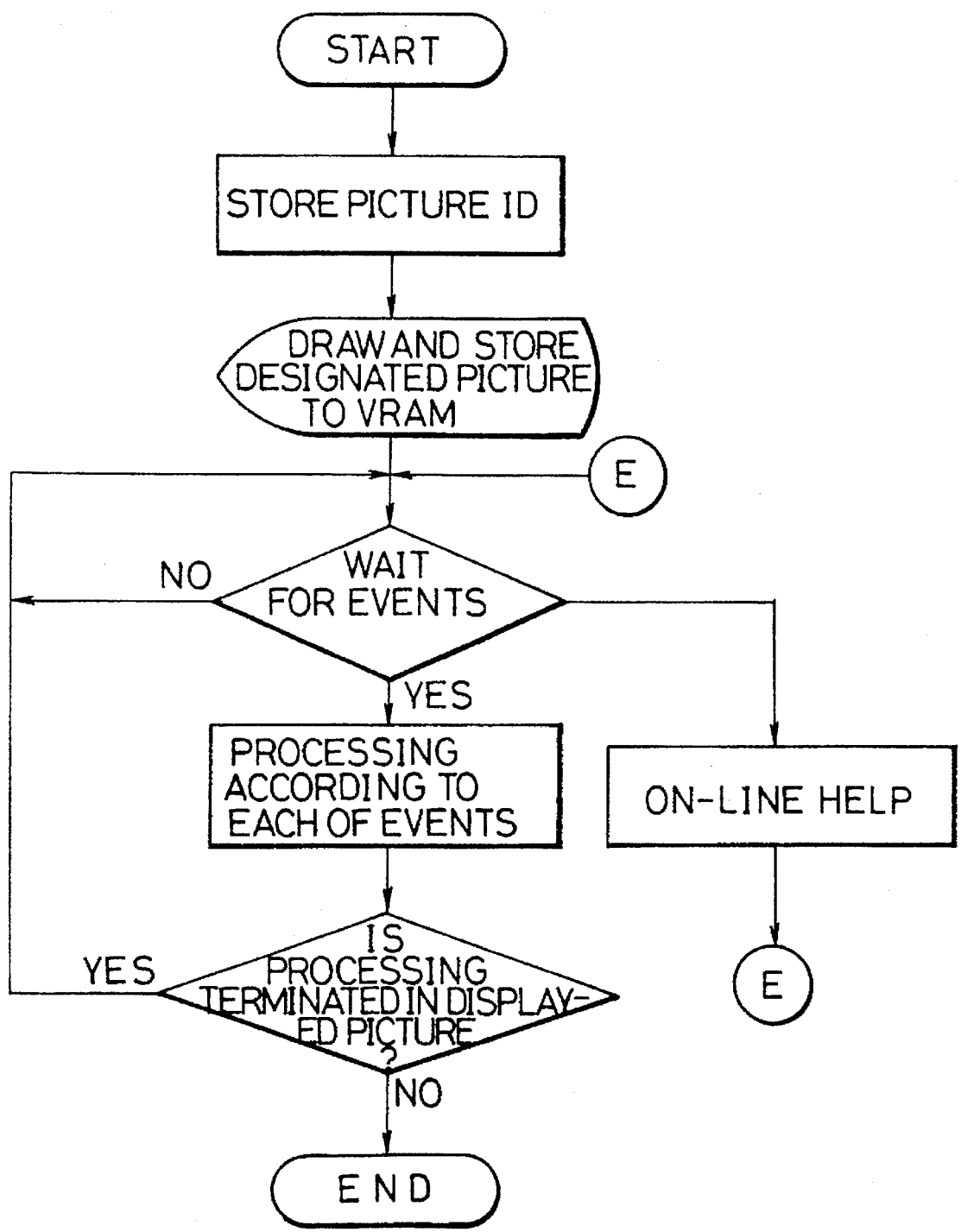
FIGS. 71a and 71b are flow charts showing processings of the electronic filing apparatus for displaying an on-line help window.
Figure 71B:
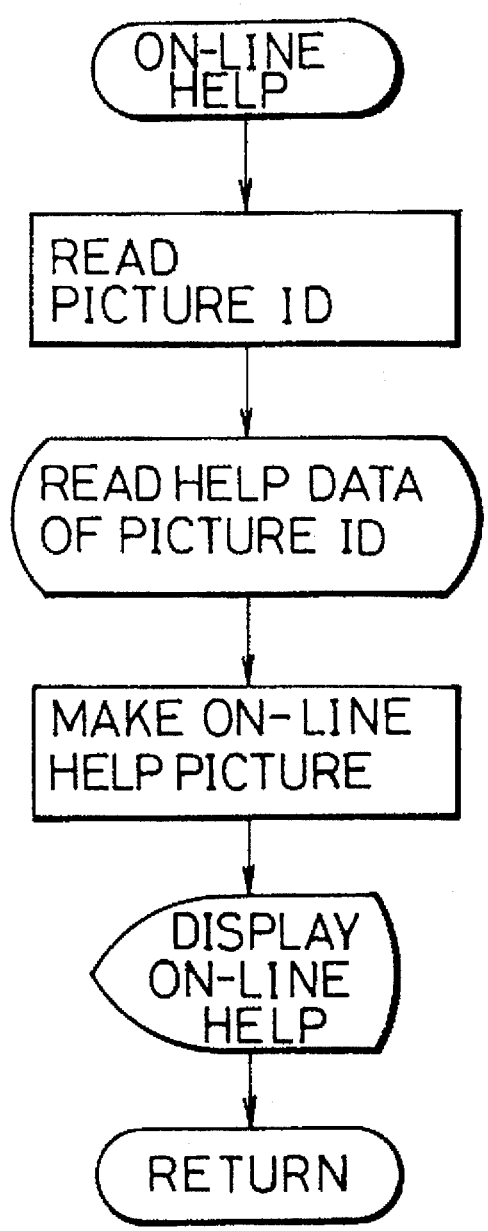
Figure 72:
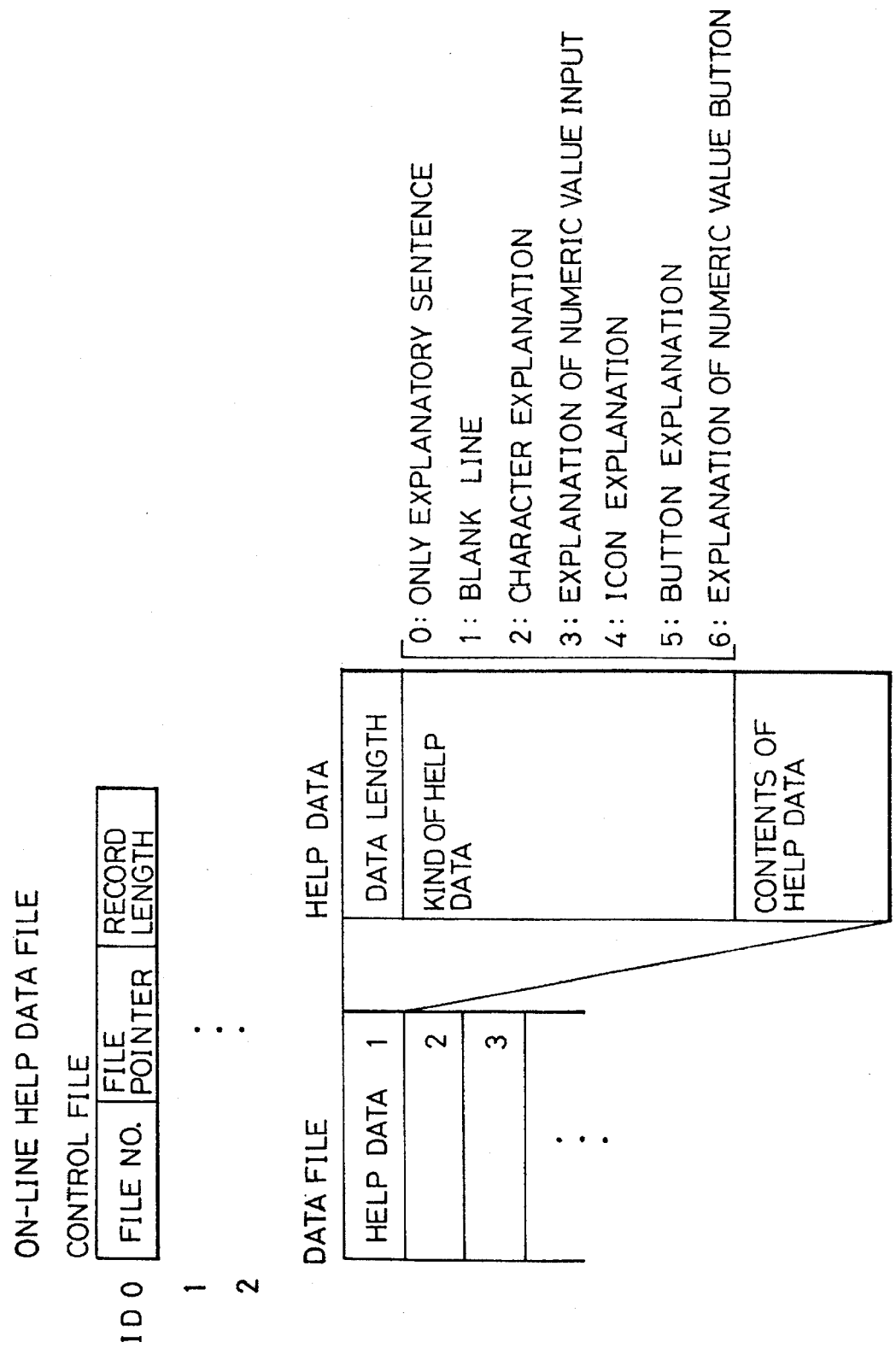
FIG. 72 is an explanatory view showing a constructional example of an on-line help data file.

FIGS. 71a and 71b are flow charts of processings for displaying the above-mentioned on-line help window. FIG. 72 is an explanatory view showing a constructional example of an online help data file for the on-line help window.

In a display routine of FIG. 71a, a displayed picture ID is stored to a memory and a designate picture is drawn and stored to a VRAM. The electronic filing apparatus then attains an event waiting state. If there are events except for a help icon, processings according to each of these events are executed. If no processings are terminated in the displayed picture, the electronic filing apparatus waits for the next event. In contrast to this, if the processings are terminated in the displayed picture, this routine processings are terminated. ff there is an event of the help icon, on-line help processings are executed and the electronic filing apparatus waits for the next event.

The on-line help processings are shown in FIG. 71b. As shown in FIG. 71b, the picture ID previously stored to the memory is read therefrom and help data of this picture ID are also read. Then, an on-line help picture is made and displayed on the screen.

Display Method of Planar Figures

In an information processor of such an electronic filing apparatus, a display method of planar figures such as an icon, a box, a card, a reduced document image, etc. will next be described.

For example, there is "a state in which an image on a first page of plural pages is located in an uppermost position and images on second and subsequent pages are sequentially located below and the images on these pages are spaced from each other by constant widths". When such a state is represented, the present invention can use the following display system. Characters and images are included on each of the pages.

(1) A system for displaying an image obtained when images on respective pages are stacked with each other in a direction in which these images are sequentially seen.

(2) A system for displaying an image obtained when images on respective pages are stacked with each other in a direction in which light is irradiated onto these images.

(3) A system in which images on all the pages are moved in a direction reverse to a direction in which light is irradiated onto these images every increase in page in the above item (2), and no position of an image on a first page is changed.

(4) A system for displaying an image obtained when lower pages are sequentially shifted from each other.

(5) A system for displaying characters or images showing page groups in the above items (1) to (4).

(6) A system for displaying images according to variable page numbers in the above items (1) to (4).

(7) A system for displaying images on pages as another unit of documents, etc. in the above items (1) to (5).

Figure 73:
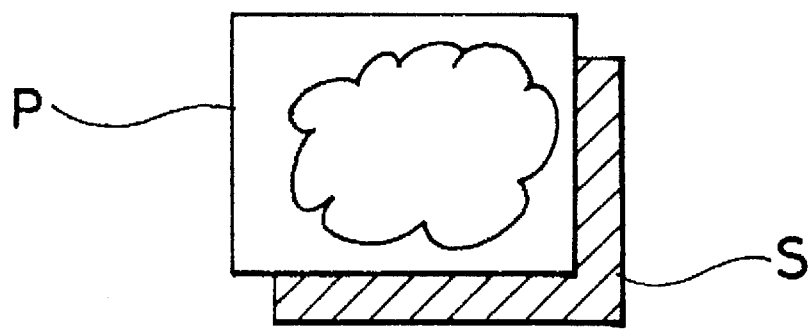
FIG. 73 is a view showing a display example of a planar figure such as an icon in an information processor in a general electronic filing apparatus, etc.
Figure 74:
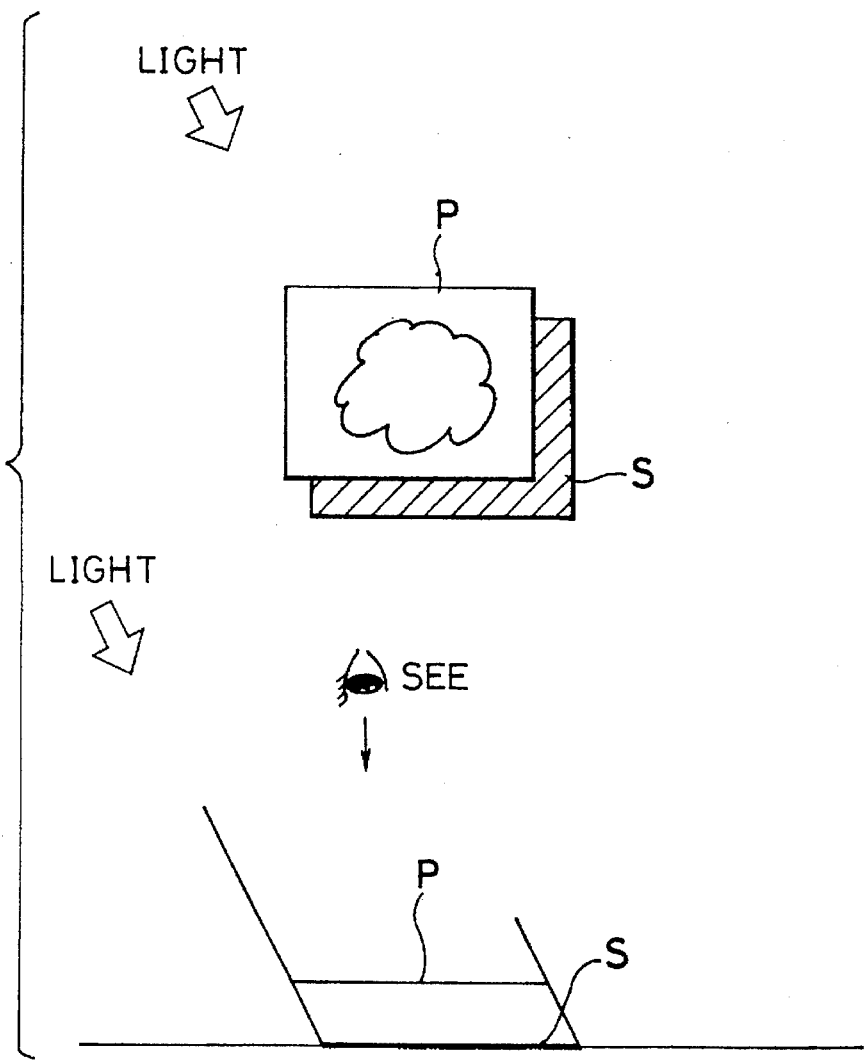
FIG. 74 is a view for explaining a display principle of this information processor.

As shown in FIGS. 73 and 74, planar figures are generally spaced from each other at a constant distance on a face on which a shadow is formed. An image is obtained by shading a planar figure in a state in which there is a difference in angle between a light irradiating direction and a looking direction of the planar figure. This image is used to display icons, etc.

Figure 75:
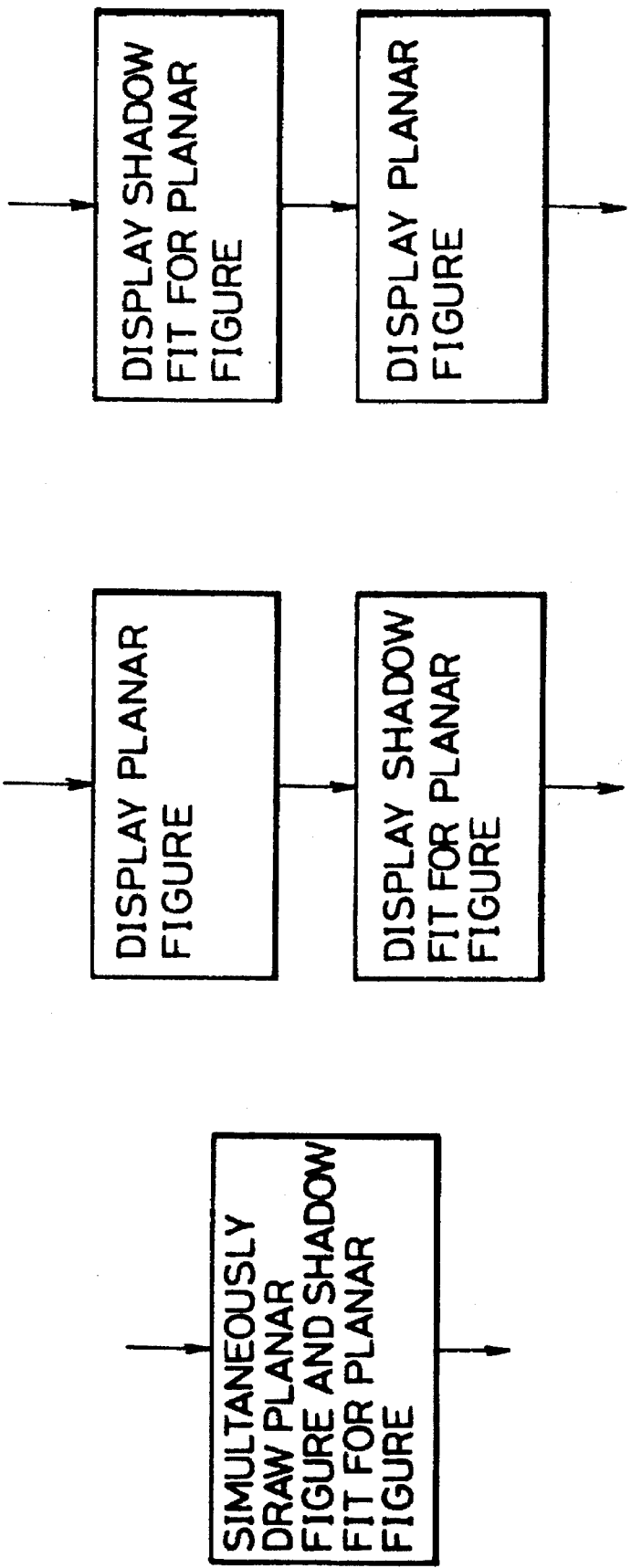
FIG. 75 is a flow chart showing an example of different processings in which the planar figure is generally displayed together with a shadow or is displayed separately from the shadow.

As shown by a flow chart of FIG. 75, a planar figure and a shadow are generally displayed simultaneously or separately.

In the electronic filing apparatus of the present invention, when documents and pages are represented by planar figures obtained by the above technique, the planar figures are displayed on the screen as plural planar figures corresponding to the number of documents and the number of pages. In the following description, the planar figures correspond to the number of pages. Accordingly, a "quantity" such as the number of pages can be displayed on the screen.

Figure 76:
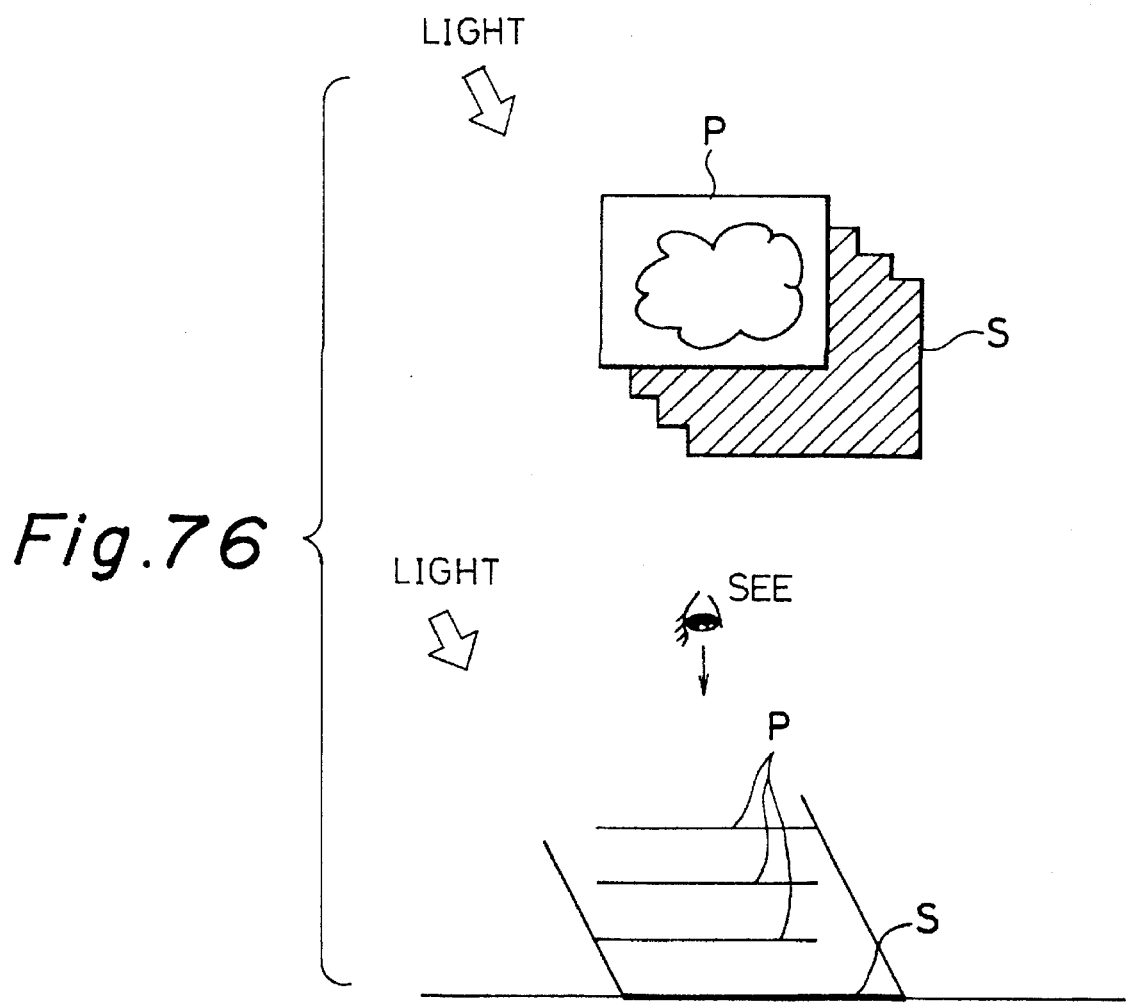
FIG. 76 is a view for explaining the principle of a system for displaying planar figures such as a box, a card, a reduced document image, etc. in an information processor of the electronic filing apparatus in the present invention.
Figure 77:
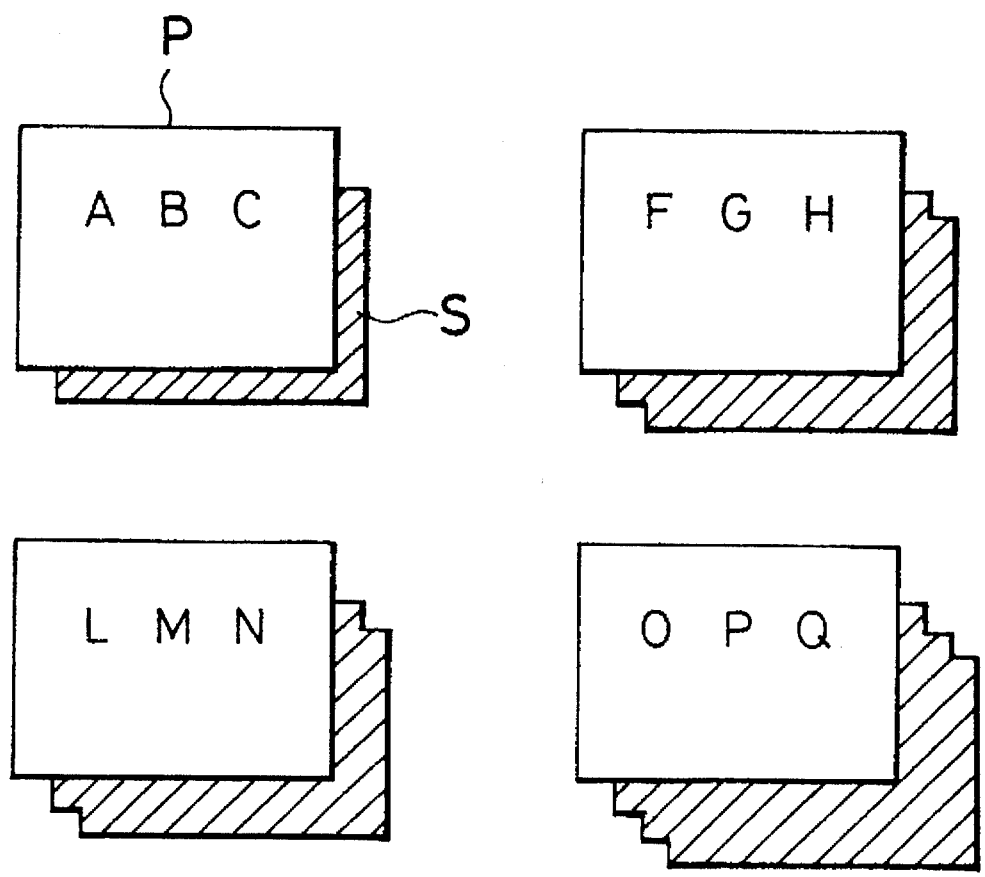
FIG. 77 is a view showing an example in which plural planar figures on different pages are arranged and displayed in this planar figure display system.

If a display system shown in FIG. 76 is used, images on pages are stacked with each other in a direction in which these images are seen. Accordingly, no display position of an image on a first page is changed even when the number of pages is changed. However, as shown in FIG. 77, the size of a shade is increased as the number of pages is increased.

Figure 78:
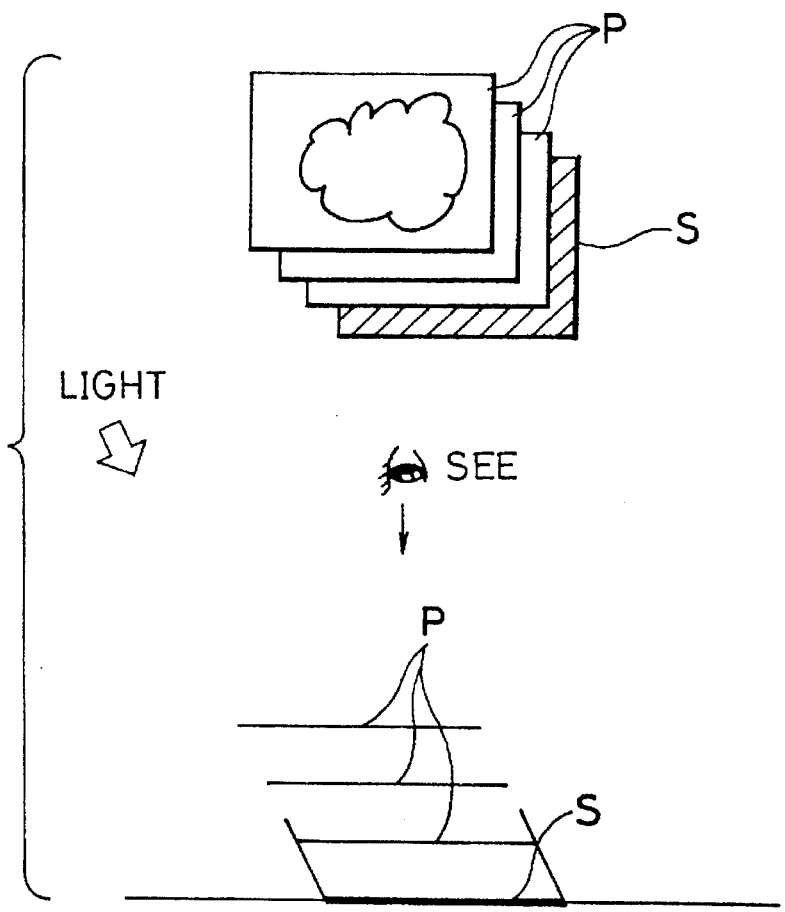
FIG. 78 is a view for explaining the principle of another planar figure display system.
Figure 79:
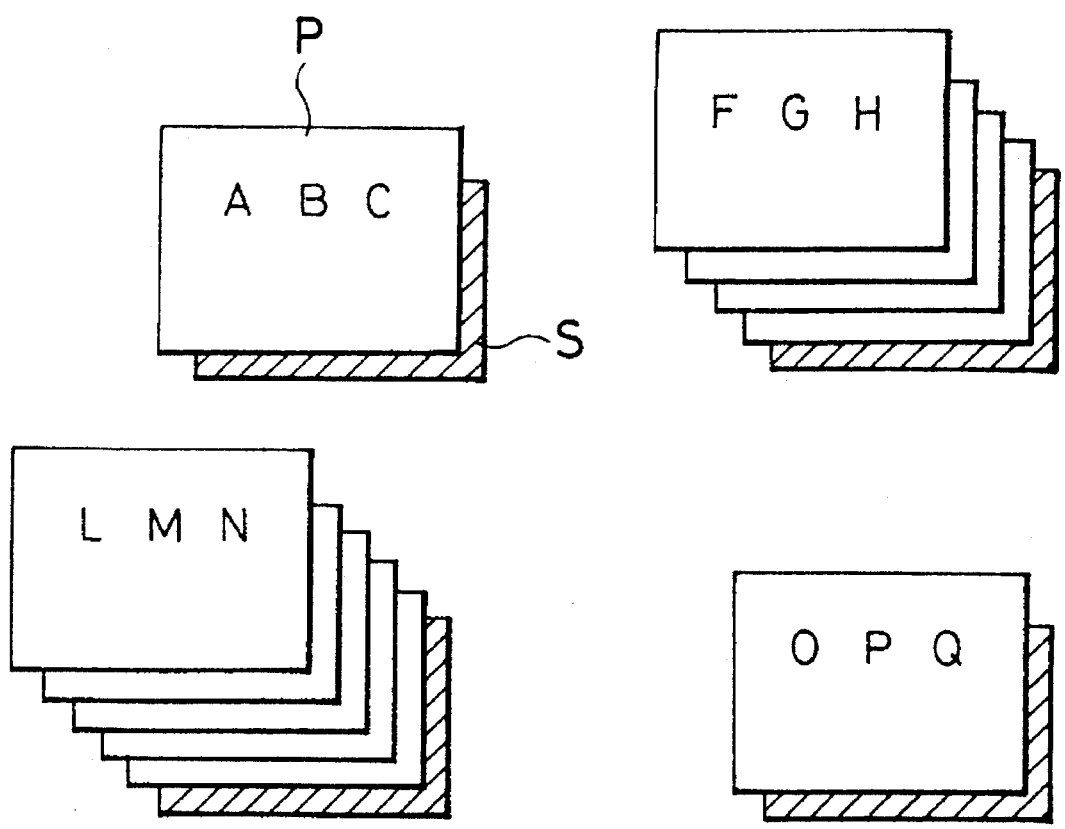
FIG. 79 is a view showing an example in which plural planar figures on different pages are arranged and displayed in this another planar figure display system.

If a display system shown in FIG. 78 is used, images on respective pages are stacked with each other in a direction in which light is irradiated onto these images. Therefore, the size of a shadow is unchanged and the images on the pages are seen in a state in which these images are shifted from each other. Accordingly, as shown in FIG. 79, when the number of pages is changed, the display position of an image on a first page is changed.

Figure 80:
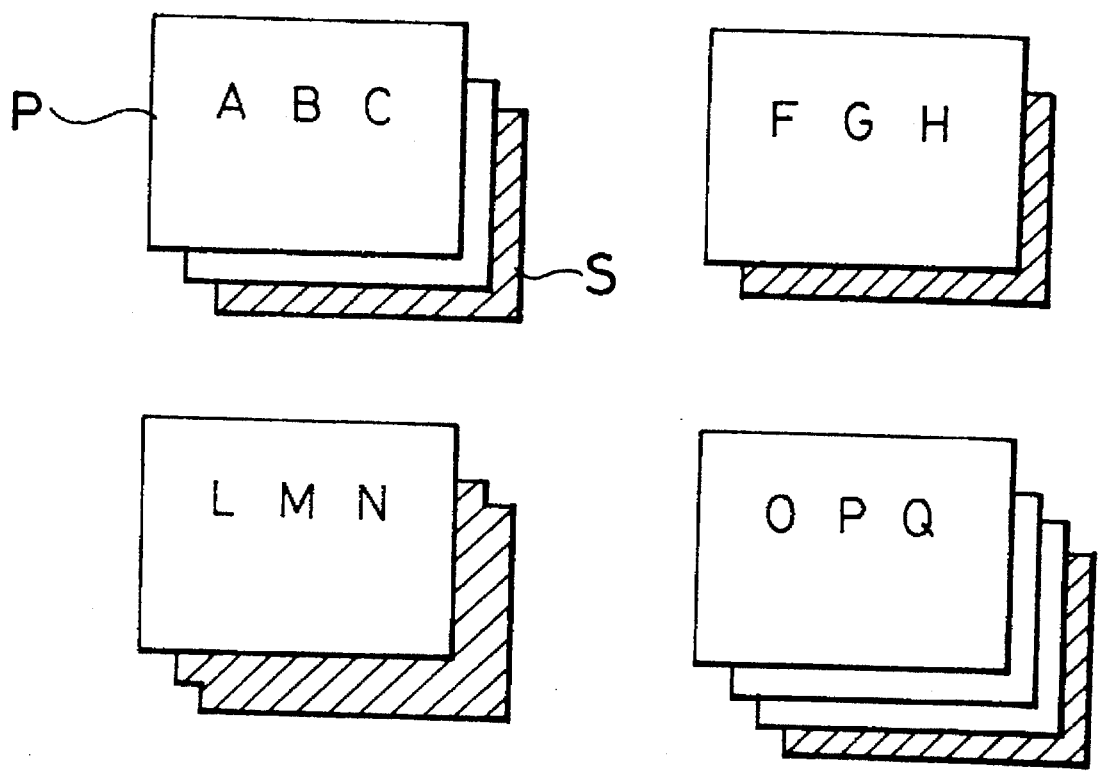
FIG. 80 is a view similar to FIG. 79 and showing a case in which the planar figure display system in FIG. 78 is improved.

However, if images are moved according to the number of pages in a direction reverse to a direction in which light is irradiated onto the images on all the pages, it is possible to display these images such that no position of an image on a first page is changed irrespective of the number of pages as shown in FIG. 80.

Figure 82:
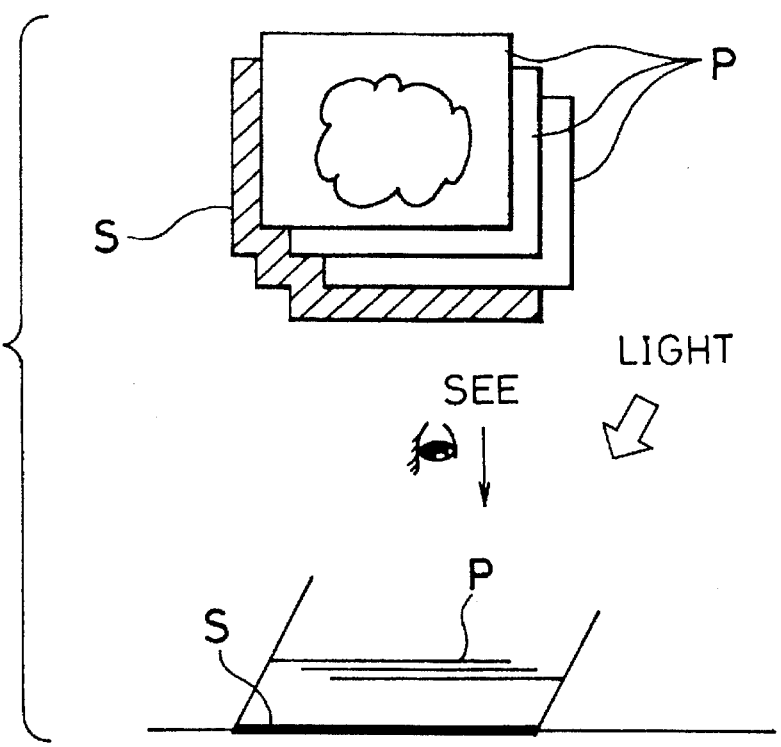
FIG. 82 is a view for explaining the principle of another different planar figure display system.

As shown in FIG. 81, images on lower pages can be seen when these images are shifted from each other. In this case, no position of an image on a first page is changed. Further, as shown in FIG. 82, when light is irradiated onto images from a slanting direction reverse to a direction for shifting the images on pages from each other, a shadow is displayed with respect to an image on each of the pages.

Characters or images showing a page group are obtained simultaneously when these display operations are performed. Characters or images showing a page group may be obtained before and after these display operations are performed. These characters and images are preferably displayed in positions of an image picture on a first page.

Further, the number of pages is obtained every page group and the above display operations are preferably performed in conformity with the number of pages.

If the above-mentioned display systems are used, a "quantity" such as the number of pages can be represented by the size of a shadow and the position of animage on a first page is unchanged. Accordingly, no image picture on the first page overlaps an image picture on an adjacent first page even when the number of pages is increased. Accordingly, it is possible to simplify display processings.

If images on respective pages are shifted from each other and are displayed such that these images are partially seen, a "quantity" as the number of pages can be represented more concretely and three-dimensionally.

Further, if characters or images showing a page group are displayed on the first page, it is easy to discriminate page groups from each other.

Explanation about Techniques Relative to this Invention

In an electronic file using an image for retrieval, no image for retrieval is made at the following times.

(1) No image for retrieval is made when the capacity of a memory medium is saved.

(2) No image for retrieval is made when no image for retrieval is used in retrieval.

(3) No image for retrieval is made when no original image is suitable for formation of the image for retrieval.

(4) No image for retrieval is made when an error in operation is caused and no retrieving image can be made.

(5) No image for retrieval is made when an image processor is limited so that no retrieving image can be made.

At these times, it is necessary to know validness and invalidness of the image for retrieval so as not to display an unsuitable image for retrieval in error. Further, when the image for retrieval is invalid. it is necessary to inform an operator of this invalid image.

In the electronic file having such an image for retrieval, valid and invalid information of the image for retrieval are provided as follows.

1) Information of the image for retrieval is "invalid" when it is indicated that the retrieving image information is set to be invalid while this information is registered.

2) Information of the image for retrieval is invalid at a registering time when this information is set to be invalid by a default value.

3) Information of the image for retrieval is invalid at a registering time by an image processor which does not make the image for retrieval.

4) Information of the image for retrieval is invalid when no image for retrieval can be remade at an updating time since no original image can be read.

When the image for retrieval is invalid at a display time thereof, the following contents are displayed on the screen.

1) White paper is displayed.

2) A pattern is displayed.

3) A message is displayed.

Figure 83:
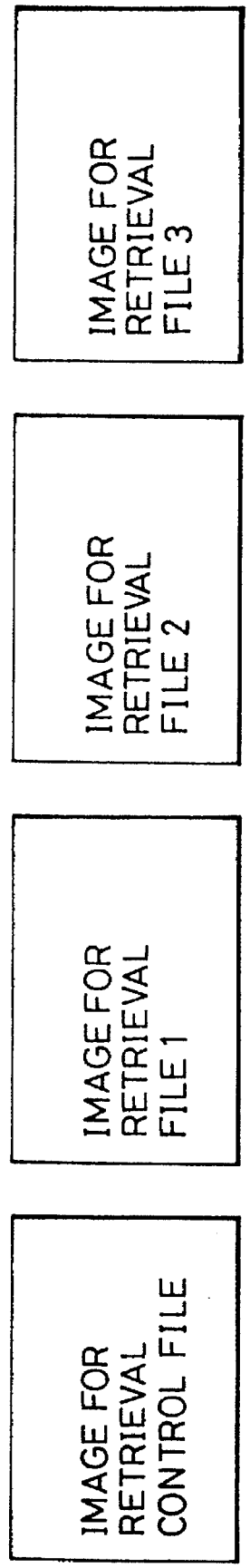

These display contents will next be described more concretely. When a document is registered in the above electronic filing apparatus, an image for retrieval and an original image are registered. At a retrieving time, a plurality of images for retrieval are displayed on the screen. The original image is displayed with respect to a in image selected from the plural images for retrieval. In this case, as shown in FIG. 83, electronic files are constructed by a control file of the images for retrieval and plural files of the images for retrieval.

Figure 84:
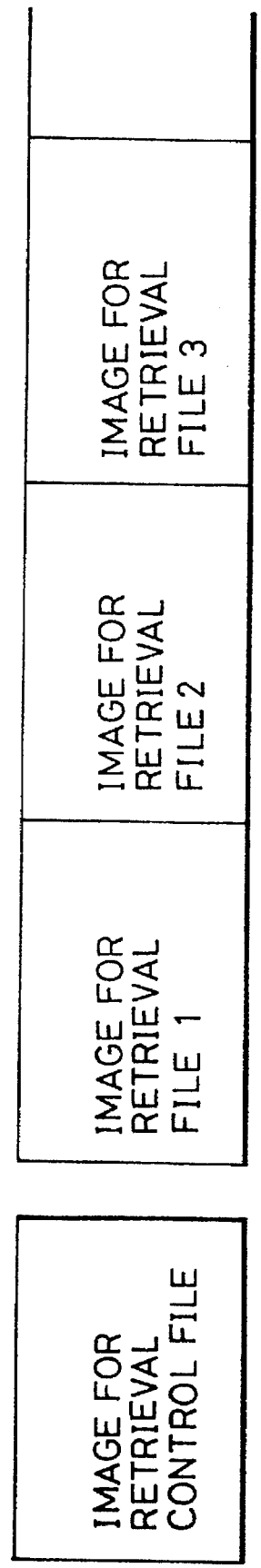
FIG. 84 is an explanatory view showing another constructional example of the image file.

As shown in FIG. 84, the plural images for retrieval may be stored to a common file of the images for retrieval. Otherwise, as shown in FIG. 85, all of a control section of the images for retrieval and the plural images for retrieval may be stored to a common file of the images for retrieval.

In each of the above cases, the control file of the images for retrieval or the control section of the images for retrieval has valid and invalid information of each of the images for retrieval. When an image for retrieval is written, this image is set to be valid. In contrast to this, when the image for retrieval is deleted, this image is set to be invalid.

Therefore, when only an original image is written at a registering time of the image for retrieval, the image for retrieval is invalid as it is. In contrast to this, when the image for retrieval is written at this registering time, the image for retrieval is valid.

As shown in FIG. 86, when picture images on plural pages are set to one document and an image on a first page is set to an image for retrieval and is then deleted, a new image for retrieval must be made from an original image on a second page. At this time, there is a case in which no new image can be made by a difference in resolution, etc. In this case, the image for retrieval is also set to be invalid.

When the image for retrieval is invalid at a display time, white paper, a pattern, a message, etc. are displayed on the screen to inform an operator of this invalid image.

If the operator knows this invalid state of the image for retrieval, it is possible to register documents at a high speed and save a memory capacity and cope with an error in operation of the electronic filing apparatus. Further, the documents can be registered even when an image processor unable to make an image for retrieval is used and no image for retrieval can be made. Further, it is possible to inform an operator that the image for retrieval is invalid.

In a known electronic filing system, the results of document retrieval are displayed by characters such as document names, keywords, etc. inputted in advance at a registering time. For example, FIG. 87 shows an example of this display.

However, in such a method for displaying the retrieving results, when there is a similar document name, it is necessary to sequentially display and confirm contents of this document. However, it takes time and labor to display and confirm such contents. Therefore, if an image portion of the document retrieving results is also displayed together with characters thereof, it is easy for an operator to find an object document.

Namely, an image on a page of an object document is also displayed together with characters in a method for displaying retrieved results in an electronic filing apparatus having at least, an image reading section, an image storing section of read data and a display section of read and stored data.

In this case, images on plural pages of the object document are preferably reduced in size at a registering or retrieving time such that these images can be displayed on the screen. Further, it is preferable for an operator to arbitrarily designate a plurality of pages displayed at the retrieving time.

In the present invention, normal document names, etc. are displayed and images such as document covers are also displayed on the screen.

In document retrieval, an operator can be more easily understand an image of a document if this document is especially registered by the operator and this document image is displayed on the screen.

Accordingly, it is possible for the operator to rapidly recognize an object document from both a document name and the displayed image.

Figure 88:
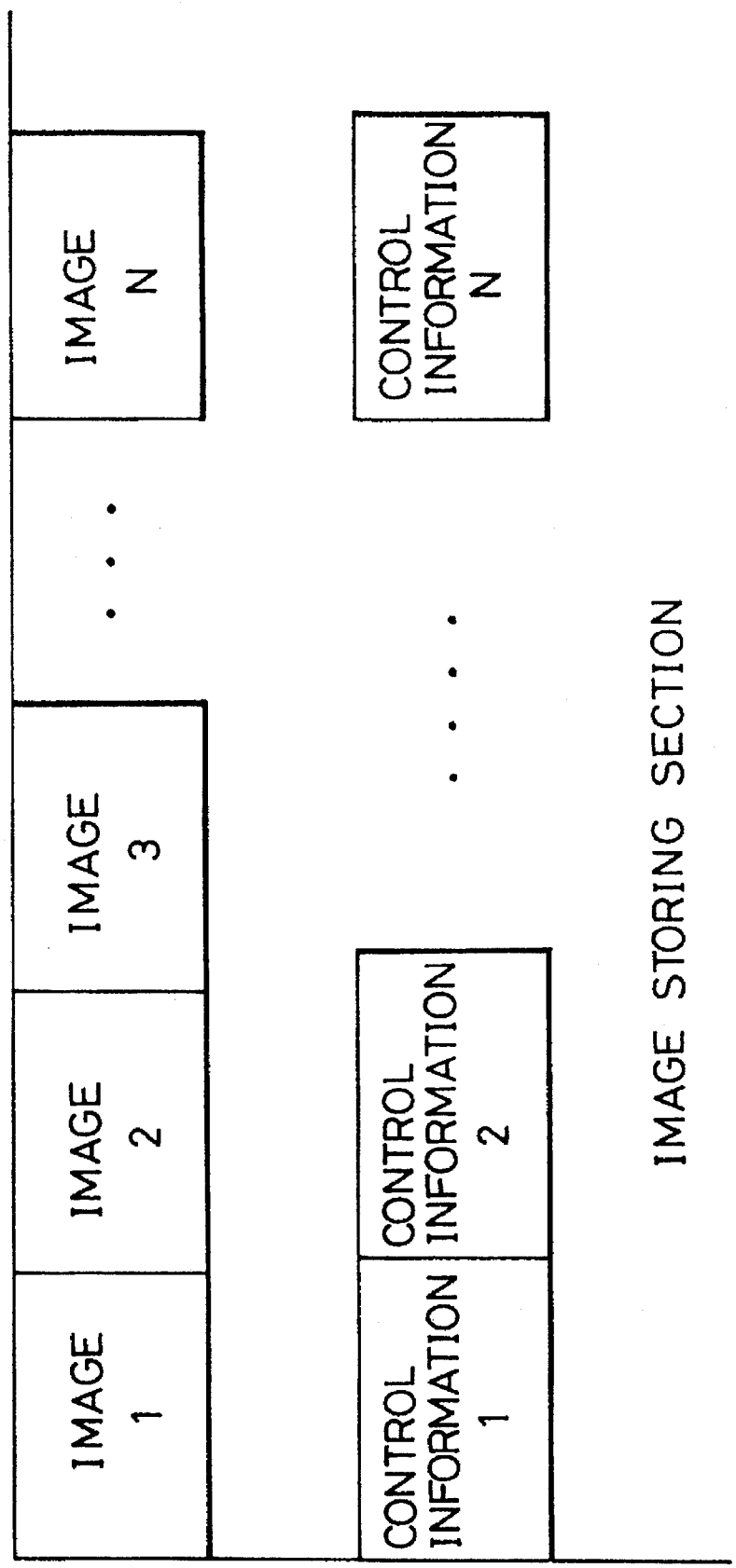
FIG. 88 is an explanatory view showing a constructional example of an image file in the electronic filing apparatus of the present invention.

When an image is stored to a memory in the electronic filing apparatus, as shown in FIG. 88, control information is added to a displayed image and is stored to an image storing section of a magnetooptic disk, etc. In addition to the document name, keywords, etc. inputted by an operator, pointer information, etc. indicative of a storing position of the document in the image storing section are simultaneously written to the memory although no operator can see the pointer information, etc.

Figure 89A:
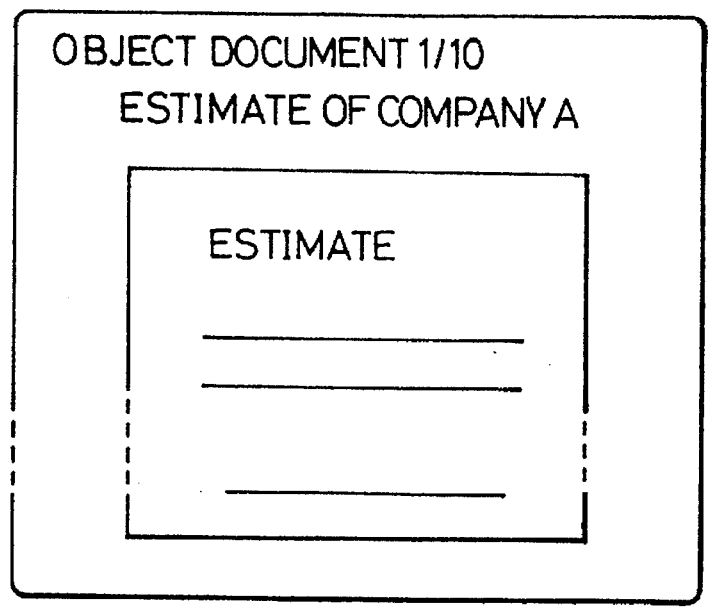
FIGS. 89a and 89b are views showing examples of different document retrieving results in this embodiment.
Figure 89B:
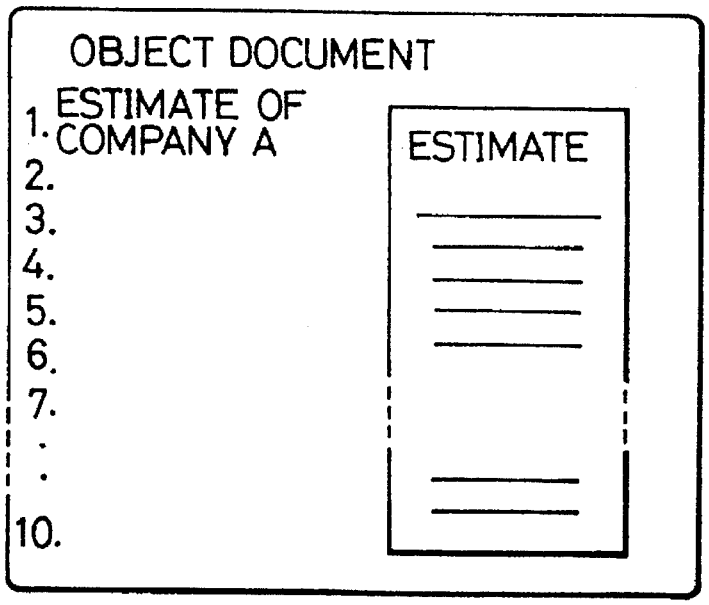

At a time of the document retrieval, an object document is retrieved from retrieving information according to an operation designated by a user. The user gets access to the image storing section on the basis of the pointer information with respect to an image corresponding to the object document. As shown in FIGS. 89a and 89b, images and characters are simultaneously displayed with respect to the display of retrieved results.

There is no special limit of a method for displaying images and characters such as a layout of pictures, etc. In this case, characters and images may be switched and displayed on the screen every one object document. Further, plural character information of an object document may be displayed and image information of the object document may be sequentially displayed.

As shown in FIG. 90, when an image is reduced in size from the size of a displayed picture and plural documents are displayed together with character information, many document images can be confirmed at one time so that retrieving efficiency is further improved. In this case, the above image can be reduced in size by a method for thinning out pixels, a method for calculating this reduction size from proximate pixel information, etc.

Thus, an image is reduced in size at an image registering time and can be stored to the image storing section together with character information and control information. Thus, the character information and the image reduced in size at the registering time are read out of the image storing section at an image retrieving time so that plural documents can be displayed as one picture on the screen at a high speed.

A page number displayed at the retrieving time is preferably registered as control information in document unit. In this case, an object page is read on the basis of this page number information at the retrieving time and an image on this object page is displayed.

If such a display system is used, an operator can rapidly recognize an object document from both a document name and a document image at the document retrieving time if this document is especially registered by the operator.

As mentioned above, in an electronic filing apparatus of the present invention, operability of an operator is greatly improved. Any operator can arbitrarily select a method for electronically filing documents and fit for the operator so that the documents can be filed simply and efficiently.

Namely, the electronic filing apparatus of the present invention has a box sorting-retrieving system using first information control means, a calendar or diary sorting-retrieving system using second information control means, and a card sorting-retrieving system using third information control means. These three sorting-retrieving systems are arbitrarily selected by an operator at any time. Thus, when read information is registered, the read information can be sorted and then retrieved.

The operator can also sort the read information by a sorting-retrieving method selected when the read information is registered. Further, the sorted information is automatically added, or the read information is temporarily sorted by a sorting-retrieving method unselected by the operator. Accordingly, these information can be processed without any problems when another sorting-retrieving system is selected later.

Further, when a box is displayed, the number of sorted documents can be displayed by the thickness of a figurative pattern of the box or the number of overlapped boxes. When calendar information is displayed, the number of sorted documents can be displayed by the number of bar patterns within a date column of the calendar information, When a card is displayed, the number of sorted documents can be displayed by the number of clip patterns added to a card pattern or modificative patterns replaced with the clip patterns. Accordingly, an operator can know the number of documents sorted every sorting divisional section so that it is convenient for the operator to operate the electronic filing apparatus.

When document information read by information reading means is registered, a reduced image on a first or designated page of this document can be displayed in a window on the screen of a display means. Thus, it is possible to confirm an image listed and displayed when this document is retrieved.

When the registered document information is retrieved and one of sorting divisional sections such as a box, a date column, an information card, etc. is designated, a reduced image on a first of designated page of each of documents sorted and registered to this sorting divisional section is listed and displayed on the screen of the display means. Accordingly, it is possible to easily and rapidly find a desirable document.

When no reduced image on the first page of each of all the documents sorted to the designated sorting divisional section can be displayed as one picture on the screen, it is possible to switch and display reduced images such that pages of the documents are sequentially turned every predetermined number. At this time, while one button of a mouse is pushed, a switching speed of the above reduced images can be gradually increased. In contrast to this, when another button of the mouse is pushed, a switching operation of the above reduced images can be interrupted.

Further, a modificative pattern showing a shadow, a document thickness or the number of overlapped document sheets can be added to a contour portion of the reduced image on the first page of each of the above listed and displayed documents. Thus, it is possible to show the number of pages of each of the documents.

When any one of reduced images on one pages of the documents listed and displayed on the screen is selected, a document image on each of pages of a document having information on this selected page is displayed at an approximately equal magnification or is enlarged. This document image is displayed from a first page in a page order. Accordingly, an operator can confirm all pages of a retrieved document and can also read the contents of a document image on a required page of the retrieved document.

In this case, while one button of the mouse is pushed, the switching speed of a document image on a displayed page can be gradually increased. In contrast to this, when another button of the mouse is pushed, a switching operation of the document image on the displayed page can be interrupted.

No keyboard is required in this electronic filing apparatus. Further, all operations of the electronic filing apparatus can be started and performed by simply connecting the mouse to the electronic filing apparatus and selectively designating patterns of icons, characters, buttons or keys for selecting various kinds of operations and functions displayed on the screen by a mouse cursor.

A help icon having a specific mark is displayed in a displayed picture at any time. When this help icon is selectively designated by the mouse, explanatory information relative to operations at this time is displayed in a window on the screen. Accordingly, an operator can perform operations in accordance with this explanatory information even when no operator can understand a method for operating the electronic filing apparatus in use. Therefore, it is not necessary to find an instruction manual, etc. and read a required explanatory description of this instruction manual.

Further, a series of images similar to those at a real operating time can be sequentially displayed on the display screen together with a movement of the mouse cursor so as to show operating procedures and functions of this electronic filing apparatus. Accordingly, it is very convenient for a user to know functions and operations in demonstration and at a delivering time of the electronic filing apparatus. Further, the user can know operating methods and functions of this electronic filing apparatus while the user see displayed pictures without reading an instruction manual of the electronic filing apparatus.

If a compact magnetooptic disk is used as a memory medium of this electronic filing apparatus, information of many documents can be stored to the compact disk. When the electronic filing apparatus is commonly used for plural persons, it is convenient for each of the persons to have a personal memory medium such as a personal magnetooptic disk, etc.

When a printer such as a laser printer is connected to the electronic filing apparatus, it is possible to print all of read information, information to be registered, registered information, retrieved information, information displayed on the screen, etc. in accordance with necessity.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic filing apparatus, comprising:
   information reading means for reading a document and image information;
   registering means for sorting the read information provided by the information reading means and registering the sorted information in a memory medium;
   retrieving means for retrieving the registered information; and
   display means for displaying the read information provided by the information reading means, information to be registered by said registering means, the registered information provided by said registering means, and the retrieved information provided by said retrieving means,
   the registering means including:
   first information control means for sorting the read information provided by said information reading means into at least one of a plurality of boxes;
   second information control means for sorting the read information provided by said information reading means by calendar information including year, month, and day;
   third information control means for sorting the read information provided by said information reading means onto at least one of a plurality of information cards; and
   selection means for selecting said first, second and third information control means in accordance with a user request,
   wherein the read information provided by said information reading means is registered irrespective of a selecting state of said selective means by associating said first, second and third information control means with each other.

2. An electronic filing apparatus as claimed in claim 1, wherein said second information control means comprises:
   means for storing the calendar information for a predetermined period and updating a current date based on the calendar information every time one day has passed; and
   means for automatically sorting and registering the read information using the current date when said second information control means is not selected at a registering time of the read information.

3. An electronic filing apparatus as claimed in claim 2, wherein said first information control means comprises:
   a temporary sorting box for temporarily sorting information; and
   means for automatically sorting and registering the read information into said temporary sorting box when said first information control means is not selected at a registering time of the read information.

4. An electronic filing apparatus as claimed in claim 2, wherein said third information control means comprises:
   a temporary sorting information card for temporarily sorting information; and
   means for automatically sorting and registering the read information to said temporary sorting information card when said third information control means is not selected at a registering time of the read information.

5. An electronic filing apparatus as claimed in claim 1, wherein said first information control means includes:
   means for displaying each of said plurality of boxes on a screen of said display means in a figurative pattern having a predetermined shape; and
   means for changing a modifying pattern added to said figurative pattern in accordance with a number of documents sorted into each of the plurality of boxes.

6. An electronic filing apparatus as claimed in claim 5, wherein the modifying pattern added to said figurative pattern by the means for changing shows one of a shadow, a document thickness, and a number of overlapped document sheets, and the modifying pattern is added to the figurative pattern without changing a display position of the basic pattern.

7. An electronic filing apparatus as claimed in claim 6, wherein said second information control means includes:
   means for displaying said calendar information on a screen of said display means in a table form containing columns and rows of table entries; and
   means for displaying a number of bar patterns within the table entries in accordance with a number of documents corresponding to each date.

8. An electronic filing apparatus as claimed in claim 7, wherein said information control means further includes means for displaying a symbol indicative of a schedule of at least one of a conference, and a business trip in the table entries.

9. An electronic filing apparatus as claimed in claim 8, wherein said third information control means includes:

means for displaying said at least one information card on a screen of said display means in a rectangular pattern having image information; and means for adding a different number of clip patterns to said rectangular pattern in accordance with a number of documents sorted to said at least one information card.

10. An electronic filing apparatus as claimed in claim 9, wherein said registering means has means for displaying a reduced image of a page of the document read by said information reading means in a window on the screen of said display means when information of this document is registered.

11. An electronic filing apparatus as claimed in claim 10, wherein said registering means has list display means for listing and displaying a reduced image of a document sorted and registered to a sorting divisional section on the screen of said display means when the sorting divisional section is designated for retrieval of information of the desirable document.

12. An electronic filing apparatus as claimed in claim 11, wherein said list display means has page turning means for sequentially switching and displaying the reduced image when no reduced image on one page of each of all documents sorted into the designated sorting divisional section can be displayed in one picture on the screen of said display means.

13. An electronic filing apparatus as claimed in claim 12, wherein said page turning means sequentially switches and displays automatically the reduced image of one page of each of the documents sorted into said designated sorting divisional section on the screen of said display means; and said page turning means has means for gradually increasing a switching speed of said reduced image display while one button of a mouse for inputting operational commands is pushed, and interrupting the sequential switching when another button of the mouse is pushed.

14. An electronic filing apparatus as claimed in claim 13, wherein said list display means includes means for adding the modifying pattern showing the of a shadow, a document thickness and the number of overlapped document sheets to a contour portion of said reduced image on one page in accordance with a number of pages of the document.

15. An electronic filing apparatus as claimed in claim 14, wherein said means for adding adds the modifying pattern without changing a display position of said reduced image.

16. An electronic filing apparatus as claimed in claim 15, wherein said sorting divisional section is constructed by one of a box, calendar information and an information card.

17. An electronic filing apparatus as claimed in claim 15, wherein said retrieving means includes means for displaying a document image on the display means, and for displaying on the display means in an order beginning with the first page, when a document on the screen of said display means is selected, pages of the document at an approximately equal magnification.

18. An electronic filing apparatus as claimed in claim 17, further comprising:

progressing means connected to the mouse which has means for generating moving data of a mouse cursor by rotating a track ball and has a pair of buttons for inputting selecting and canceling commands of operations and functions of the electronic filing apparatus; and the progressing means starts all operations of the electronic filing apparatus by displaying said mouse cursor and at least one of patterns of icons, characters, buttons and keys for selecting various kinds of operations and functions on the screen of said display means, and selectively designating any one of said patterns by said mouse.

19. An electronic filing apparatus as claimed in claim 18, further comprising:

means for displaying a help icon having a specific mark on the screen of said display means at any time, and when the help icon is selectively designated by said mouse, the means for displaying the help icon displays explanatory information relative to operations of the electronic filing apparatus in a window on the screen of the display means.

20. An electronic filing apparatus as claimed in claim 19, wherein said memory medium is a magnetooptic disk.

21. An electronic filing apparatus as claimed in claim 1, further comprising:

a printer for printing the read information provided by said information reading means, information to be registered by said registering means, the registered information provided by said registering means, the retrieved information provided by said retrieving means, and the displayed information provided by said display means.

22. An electronic filing apparatus as claimed in claim 1, wherein the third information control means comprises means for creating the plurality of cards using image information read by the information reading means.

* * * * *

UNITED STATES PATENT AND TRADEMARK OFFICE
CERTIFICATE OF CORRECTION

PATENT NO.     : 5,649,188
DATED          : July 15, 1997
INVENTOR(S)    : Keiichi Nomura et al.

It is certified that error appears in the above-identified patent and that said Letters Patent is hereby corrected as shown below:

Column 44,
Line 44, change "selective" to -- selection --.

Signed and Sealed this

Twenty-third Day of September, 2003

JAMES E. ROGAN
*Director of the United States Patent and Trademark Office*